(12) United States Patent
Takeda et al.

(10) Patent No.: US 8,502,937 B2
(45) Date of Patent: Aug. 6, 2013

(54) PROTECTIVE FILM FOR POLARIZERS

(75) Inventors: Jun Takeda, Minami-ashigara (JP); Hiromichi Tachikawa, Minami-ashigara (JP); Masaya Suzuki, Minami-ashigara (JP); Mamoru Sakurazawa, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 12/412,735

(22) Filed: Mar. 27, 2009

(65) Prior Publication Data

US 2009/0244705 A1 Oct. 1, 2009

(30) Foreign Application Priority Data

Mar. 31, 2008 (JP) ................................. 2008-090131
Sep. 17, 2008 (JP) ................................. 2008-238457

(51) Int. Cl.
*G02F 1/1335* (2006.01)

(52) U.S. Cl.
USPC ............................. 349/96; 349/117; 349/118

(58) Field of Classification Search
USPC .................... 349/117–119, 96; 428/532–536
See application file for complete search history.

(56) References Cited

U.S. PATENT DOCUMENTS

| | | | | |
|---|---|---|---|---|
| 7,038,744 B2 * | 5/2006 | Kuzuhara et al. | ............... | 349/96 |
| 7,184,112 B2 * | 2/2007 | Kuzuhara et al. | ............... | 349/96 |
| 7,388,636 B2 * | 6/2008 | Yano | .............................. | 349/117 |
| 2006/0093759 A1 * | 5/2006 | Fukagawa | .................... | 428/1.31 |
| 2008/0049323 A1 | 2/2008 | Sugiyama et al. | | |

FOREIGN PATENT DOCUMENTS

| | | | |
|---|---|---|---|
| JP | 2002-022956 | * | 1/2002 |
| JP | 2006-89529 A | | 4/2006 |
| JP | 2006-111842 A | | 4/2006 |
| JP | 2006-259494 | * | 9/2006 |
| JP | 2006-282987 A | | 10/2006 |
| JP | 2007-003679 A | | 1/2007 |
| JP | 2007-108641 A | | 4/2007 |
| JP | 2007-301847 A | | 11/2007 |
| JP | 2008-052262 A | | 3/2008 |

OTHER PUBLICATIONS

Japanese Office Action dated Mar. 12, 2013, issued in corresponding Japanese Patent Application No. 2008-238457, and English language translation of Office Action. (5 pages).

Japanese Office Action dated Jun. 11, 2013, issued in corresponding Japanese Patent Application No. 2008-238457, and English language translation of Office Action. (3 pages).

* cited by examiner

*Primary Examiner* — Kevin R Kruer

(74) *Attorney, Agent, or Firm* — Buchanan Ingersoll & Rooney PC

(57) ABSTRACT

A protective film for polarizers, including a cellulose resin having an acyl substituent with from 2 to 4 carbon atoms and having a degree of acyl substitution of from 2.1 to 2.7, which satisfies $25 \leq Re \leq 100$ and $50 \leq Rth \leq 300$ and in which the cellulose resin contributes to expression of at least 40% of the Re in the film.

18 Claims, No Drawings

PROTECTIVE FILM FOR POLARIZERS

BACKGROUND OF THE INVENTION

1. Field of the Invention

The present invention relates to a protective film for polarizers. In particular, the invention relates to a protective film for polarizers, in which the amount of the additive is reduced.

2. Description of the Related Art

Heretofore, films comprising a cellulose resin (e.g., cellulose acylate resin) as the main ingredient are used as protective films for polarizers (See Patent References JP-A 2006-89529, JP-A 2006-111842 and JP-A 2007-108641). For making them have a retardation, the films are stretched or a retardation enhancer is added thereto. However, the stretching is problematic in point of the cost, as requiring an additional working step. Addition of a retardation enhancer is also problematic in that the saponification liquid for use in the saponification step in film production is often contaminated.

SUMMARY OF THE INVENTION

The invention is to solve the above-mentioned problems, and its object is to provide a protective film for polarizers, which can be produced under the condition of a low draw ratio in stretching the film or under the condition of hardly contaminating the saponification liquid in the saponification step in producing the film.

Taking the above-mentioned problems into consideration, the present inventors have assiduously studied and, as a result, have found that when a cellulose resin having a low degree of substitution with all acyl groups is used and when the cellulose resin contributes to optical expression of at least 40% of the Re in the film, then a protective film for polarizers having sufficient optical properties for protective films for polarizers can be obtained, and have completed the invention. Specifically, the inventors have found the following facts: A cellulose resin having a low degree of acyl substitution has a high refractive index intrinsic to cellulose resin. Accordingly, when such a cellulose resin is used in forming a film, the contribution of Re of the cellulose resin to the overall Re of the film increases. As a result, the draw ratio in stretching the film of such a cellulose resin can be lowered, and the temperature dependence of the film can be thereby reduced. Concretely, the inventors have solved the above-mentioned problems, providing the invention that comprises the following constitutions:

(1) A protective film for polarizers, comprising a cellulose resin having an acyl substituent with from 2 to 4 carbon atoms and having a degree of acyl substitution of from 2.1 to 2.7, which satisfies $25 \leq Re \leq 100$ and $50 \leq Rth \leq 300$ wherein Re means retardation in the plane of the film and Rth means retardation in the thickness direction of the film, and in which the cellulose resin contributes to optical expression of at least 40% of the Re in the film.

(2) The protective film for polarizers of (1), wherein the degree of acyl substitution is from 2.3 to 2.6.

(3) The protective film for polarizers of (1) or (2), which satisfies the following formula:

$$Re_2/d_2 \geq Re_1/d_1 \times 0.4$$

wherein $Re_1$ and $d_1$ each mean Re and the thickness, respectively, of the protective film as produced to have a thickness of 80 μm and stretched by 20% at 180° C.; $Re_2$ and $d_2$ each mean Re and the thickness, respectively, of the film as produced to have a thickness of 80 μm with no addition of an additive contributing to optical expression thereto and stretched by 20% at 180° C.; $20 \mu m \leq d_1 \leq 120 \mu m$, and $20 \mu m \leq d_2 \leq 120 \mu m$.

(4) The protective film for polarizers of any one of (1) to (3), which contains from 5 to 25% by weight of at least one Rth regulator.

(5) The protective film for polarizers of (4), wherein the Rth regulator is an ester plasticizer.

(6) The protective film for polarizers of (4) or (5), wherein the Rth regulator is at least one selected from the group consisting of phosphate plasticizers, phthalate plasticizers and glycol ester plasticizers.

(7) The protective film for polarizers of any one of (1) to (6), which contains at least one Re enhancer in an amount of from 0.5% by weight to 10% by weight.

(8) The protective film for polarizers of any one of (1) to (7), which has a water content of at most 3%.

(9) The protective film for polarizers of any one of (1) to (8), wherein the difference between Rth of the film kept in an environment at 25° C. and 10% RH for 2 hours (Rth(10% RH)) and Rth of the film kept in an environment at 25° C. and 80% RH for 2 hours (Rth(80% RH)), (ΔRth) is at most 20 nm.

(10) The protective film for polarizers of any one of (1) to (9), which contains a release promoter in an amount of from 0.001 to 1% by weight.

(11) The protective film for polarizers of any one of (1) to (10), which has a thickness of from 30 to 60 μm.

(12) The protective film for polarizers of any one of (1) to (11), which further contains a matting agent.

(13) The protective film for polarizers of any one of (1) to (12), wherein the amount of bright dot defects is at most 10 dots/m².

(14) The protective film for polarizers of any one of (1) to (13), wherein the residual solvent amount is less than 70% by mass.

(15) The protective film for polarizers of any one of (1) to (14), wherein the draw ratio in stretching the film is from 1.1 to 1.5 times.

(16) The protective film for polarizers of any one of (1) to (15), wherein the difference between the haze of the film and the haze of the unstretched film, Δhaze is at most 0.5.

(17) The protective film for polarizers of any one of (1) to (16), which is produced by once winding up the unstretched film and then stretching it in a separate step.

The protective film for polarizers of the invention is such that the cellulose resin of the film contributes to optical expression of at least 40% of the Re in the film, and therefore the film is highly stable and can be produced at low costs. In particular, in the saponification step, when the film stability is higher, then the saponification liquid is less contaminated and the frequency of exchanging the saponification liquid can be reduced.

BEST MODE OF CARRYING OUT THE INVENTION

Description will now be made in detail of the cellulose acylate optical film according to the present invention. Although the following description of its structural features may often be made on the basis of typical embodiments of the present invention, it is to be understood that the present invention is not limited to any such embodiment. It is also to be noted that every numerical range as herein expressed by employing the words "from" and "to", or simply the word "to", or the symbol "~" is supposed to include the lower and upper limits thereof as defined by such words or symbol, unless otherwise noted.

The protective film for polarizers of the invention is characterized in that comprising a cellulose resin having an acyl substituent with from 2 to 4 carbon atoms and having a degree of acyl substitution of from 2.1 to 2.7, which satisfies $25 \leq Re \leq 100$ and $50 \leq Rth \leq 300$ and in which the cellulose contributes to optical expression of at least 40% of the Re in the film.

$Re(\lambda)$ and $Rth(\lambda)$ represent, herein, the retardation in the plane and the retardation in the thickness direction, respectively, at a wavelength of $\lambda$. $Re(\lambda)$ is measured with KOBRA21ADH or WR (by Oji Scientific Instruments) while allowing light having the wavelength of $\lambda$ nm to enter in the normal direction of a film.

With the in-plane slow axis (determined by KOBRA 21ADH or WR) taken as the inclination axis (rotation axis) of the sample (in case where the sample has no slow axis, the rotation axis of the sample may be in any in-plane direction of the sample), $Re(\lambda)$ of the sample is measured at 6 points in all thereof, up to $+50°$ relative to the normal line direction of the sample at intervals of $10°$, by applying a light having a wavelength of $\lambda$ nm from the inclined direction of the sample.

With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulae (1) and (2).

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

By inputting the value of these average refraction indices and thickness, KOBRA 21ADH or WR computes nx, ny, nz. From the computed nx, ny, nz, $Nz=(nx-nz)/(nx-ny)$ is computed further.

Re as referred to herein means that the component or the process is a factor of Re expression. Specifically, for Re expression, generally employed is a method of stretching a film or adding an Re enhancer to a film. In the invention, however, Re expression does not depend on these only, but is characterized in that at least 40% of Re expression is given by the cellulose resin that constitutes the film. Preferably, the protective film for polarizers of the invention satisfies the following formula:

$$Re_2/d_2 \geq Re_1/d_1 \times 0.4$$

wherein $Re_1$ and $d_1$ each mean Re and the thickness, respectively, of the protective film as produced to have a thickness of 80 μm and stretched by 20% at 180° C.; $Re_2$ and $d_2$ each mean Re and the thickness, respectively, of the film as produced to have a thickness of 80 μm with no addition of an additive contributing to optical expression thereto and stretched by 20% at 180° C.; $20\ \mu m \leq d_1 \leq 120\ \mu m$, and $20\ \mu m \leq d_2 \leq 120\ \mu m$.

The additive contributing to optical expression as referred to herein includes an Re enhancer, an Rth regulator, a plasticizer, a release promoter, etc.

Specifically, the protective film for polarizers of the invention may contain various additives contributing to optical expression, such as an Re enhancer, an Rth regulator, etc., but preferably, its Re ($Re_1$) containing them and its Re ($Re_2$) not containing them satisfy the above-mentioned formula.

The contribution to optical expression of Re is preferably at least 45%.

(Cellulose Resin)

Not specifically defined, the cellulose resin for use in the invention may be any one having a degree of total acyl substitution is from 2.1 to 2.7. The cellulose resin is preferably cellulose acylate; and the starting cellulose for the acylate includes cotton linter and wood pulp (broadleaf pulp, coniferous pulp), etc. Any cellulose acylate obtained from any of such a starting cellulose may be used. As the case may be, a mixture of different cellulose acylates may also be used herein. The details of the starting material cellulose are described, for example, in "Plastic Material Lecture (17), $$Re(\theta) = \left[ nx - \frac{ny \times nz}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (1)$$

The above Re ($\theta$) represents the retardation in a direction that inclines in the degree of $\theta$ from the normal direction; and d is a thickness of the film.

$$Rth = \{(nx+ny)/2 - nz\} \times d \quad (2)$$

In this, the mean refractive index n is needed as a parameter, and it is measured with an Abbe refractometer (Atago's Abbe Refractometer 2-T).

Re is preferably $35 \leq Re \leq 80$, more preferably $40 \leq Re \leq 60$.

Rth preferably satisfies $50 \leq Rth \leq 300$, more preferably $80 \leq Rth \leq 150$. Having Rth falling within the range, a retardation film for VA having a more reduced color shift can be produced.

In the protective film for polarizers of the invention, the cellulose resin contributes to optical expression of at least 40% of Re in the film. Contributing to optical expression of Cellulosic Resin" (written by Marusawa, Uda, published by Nikkan Kogyo Shinbun-sha, 1970); Hatsumei Kyokai Disclosure Bulletin 2001-1745 (pp. 7-8); and "Encyclopedia of Cellulose (p. 523)" (edited by the Society of Cellulose of Japan, published by Asakura Shoten, 2000).

(Cellulose Ester)

Description will first be made in detail of the cellulose acylate preferably used for the purpose of the present invention. The glucose units having a β-1, 4 bond and forming the cellulose have free hydroxyl groups in the 2-, 3- and 6-positions thereof. The cellulose acylate is a polymer obtained by esterifying a part or all of those hydroxyl groups. Its acyl substitution degree means the total of the esterification degrees of cellulose in the 2-, 3- and 6-positions (an esterification degree of 100% meaning a substitution degree of 1).

The degree of total acyl substitution, or that is, DS2+DS3+DS6 is preferably from 2.3 to 2.6, more preferably from 2.35 to 2.55, even more preferably from 2.40 to 2.50. DS6/(DS2+DS3+DS6) is preferably from 0.08 to 0.66, more preferably from 0.15 to 0.60, even more preferably from 0.20 to 0.45. DS2 is a degree of acyl substitution at the 2-positioned hydroxyl group in glucose unit (hereinafter this may be referred to as "degree of 2-position acyl substitution"); DS3 is a degree of acyl substitution at the 3-positioned hydroxyl group (hereinafter this may be referred to as "degree of 3-position acyl substitution"); and DS6 is a degree of acyl substitution at the 6-positioned hydroxyl group (hereinafter this may be referred to as "degree of 6-position acyl substitution"). DS6/(DS2+DS3+DS6) is a proportion of the degree of 6-position acyl substitution to the degree of total acyl substitution, and this may be hereinafter referred to as "proportion of 6-position acyl substitution".

Only one acyl group or two or more different acyl groups may be used in the film of the invention. Preferably, the film of the invention has an acyl substituent having from 2 to 4 carbon atoms. When two or more different acyl groups are used, preferably, one of them is an acetyl group, and the acyl group having from 2 to 4 carbon atoms is preferably a propionyl group or a butyryl group. The sum total of the degree of substitution at the 2-positioned, 3-positioned and 6-positioned hydroxyl groups with an acetyl group is represented by DSA; and the sum total of the degree of substitution at the 2-positioned, 3-positioned and 6-positioned hydroxyl groups with a propionyl group or a butyryl group is represented by DSB. Preferably, DSA+DSB is from 2.3 to 2.6. More preferably, DSA+DSB is from 2.35 to 2.55, and DSB is from 0.10 to 1.70. Further preferably, DSA+DSB is from 2.40 to 2.50, and DSB is from 0.5 to 1.2. Preferably, DSA and DSB are so planned as to fall within the above-mentioned range, as giving a film with little fluctuation in the values Re and Rth thereof in a varying environmental humidity.

Also preferably, at least 28% of DSB is for the substituent of the 6-positioned hydroxyl group, more preferably at least 30% of DSB is for the substituent of the 6-positioned hydroxyl group, even more preferably at least 31% of DSB is for the substituent of the 6-positioned hydroxyl group, still more preferably at least 32% of DSB is for the substituent of the 6-positioned hydroxyl group. For the film of the type, a solution of good solubility can be prepared, and in particular, a good solution in a chlorine-free organic solvent can be produced. In addition, a solution having a low viscosity and having good filterability can be produced.

The acyl substituent having 2 or more carbon atoms may be aliphatic groups or allyl groups, and are not particularly limited. They may be an alkylcarbonyl ester of cellulose, an alkenylcarbonyl ester of cellulose, an aromatic carbonyl ester of cellulose or an aromatic alkylcarbonyl ester of cellulose. These esters may have a substituent. Preferable examples of the substituents include a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexanecarbonyl group, an oleoyl group, a benzoyl group, a naphthylcarbonyl group and a cinnamoyl group. A propionyl group, a butanoyl group, a dodecanoyl group, an octadecanoyl group, a tert-butanoyl group, an oleoyl group, a benzoyl group, a naphthylcarbonyl group and a cinnamoyl group are more preferred, and a propionyl group and a butanoyl group are particularly preferred.

In acylation of cellulose, when an acid anhydride or an acid chloride is used as the acylating agent, the organic solvent as the reaction solvent may be an organic acid, such as acetic acid, or methylene chloride or the like.

When the acylating agent is an acid anhydride, the catalyst is preferably an protic catalyst such as sulfuric acid; and when the acylating agent is an acid chloride (e.g., $CH_3CH_2COCl$), a basic compound may be used as the catalyst.

A most popular industrial production method for a mixed fatty acid ester of cellulose comprises acylating cellulose with a fatty acid corresponding to an acetyl group and other acyl groups (e.g., acetic acid, propionic acid, valeric acid, etc.), or with a mixed organic acid ingredient containing their acid anhydride.

The cellulose ester for use in the invention can be produced, for example, according to the method described in JP-A 10-45804.

[Additive]

As additives to the cellulose acylate film in the invention, widely employable are known high-molecular additives and low-molecular additives. The additive content may be from 1 to 35% by mass of the cellulose resin, preferably from 4 to 30% by mass, more preferably from 10 to 25% by mass. When the additive content is less than 1% by mass, then the film could not be resistant to temperature and humidity change; but when the additive content is more than 30% by mass, then the film may whiten, and in addition, its physical properties may be poor.

The additives for use in the invention are ingredients that are added to the optical film of the invention for the purpose of enhancing the functions of the film, and their content in the film is at least 1% by mass. In other words, impurities and residual solvents are not the additive in the invention.

In the invention, the content of the high-molecular additive is preferably from 4 to 30% by mass of the cellulose resin, more preferably from 10 to 25% by mass.

In the invention, two or more additives may be used so far as the value Δsp can be within a predetermined range. Use of two or more different types of additives is advantageous in that the optical properties, the film elasticity, the film brittleness and the web handlability are all satisfied.

(High-Molecular Additive)

The high-molecular additive for use in the film of the invention is a compound having a repetitive unit therein, and preferably has a number-average molecular weight of from 700 to 10000. The high-molecular additive is used for the purpose of accelerating the solvent evaporation speed or for reducing the residual solvent amount in film formation according to a solution casting method. In addition, the additive is useful also in film formation according to a melt casting method, for preventing coloration and film strength reduction. Further, adding such a high-molecular additive to the film of the invention is effective from the viewpoint of improving the quality of the film, for example, for enhancing the mechanical properties of the film, for imparting softness and water absorption resistance to the film and for reducing the water vapor permeability of the film.

The high-molecular additive for use in the film of the invention more preferably has a number-average molecular weight from 700 to less than 10000, further preferably from 800 to 8000, further more preferably from 800 to 5000, particularly preferably 1000 to 5000. The high-molecular additive having a number-average molecular weight in such range has higher compatibility with the cellulose acylate.

The high-molecular additive may be selected from polyester-type polymers, styrene polymers, acrylic polymers and their copolymers, preferably aliphatic polyesters, aromatic polyesters, acrylic polymers and styrene polymers. Also preferably, the additive contains at least one polymer having a negative intrinsic birefringence of, for example, styrene polymers and acrylic polymers.

Polyester-Type Polymers:

The polyester-type polymers for use in the film of the invention is one produced by reaction of a mixture of an aliphatic dicarboxylic acid having from 2 to 20 carbon atoms and an aromatic dicarboxylic acid having from 8 to 20 carbon atoms, and a diol selected from the group consisting of aliphatic diols having from 2 to 12 carbon atoms, alkyl ether diols having from 4 to 20 carbon atoms and aromatic diols having from 6 to 20 carbon atoms, and both ends of the reaction product may be as such, or may be blocked by further reaction with a monocarboxylic acid or a monoalcohol. The terminal blocking may be effected for the reason that the absence of a free carboxylic acid in the plasticizer is effective for the storability of the plasticizer. The dicarboxylic acid for the polyester plasticizer for use in the invention is preferably an aliphatic dicarboxylic having from 4 to 20 carbon atoms, or an aromatic dicarboxylic acid having from 8 to 20 carbon atoms.

The aliphatic dicarboxylic acids having from 2 to 20 carbon atoms preferably for use in the film of the invention include, for example, oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid.

The aromatic dicarboxylic acids preferably for use in the film of the invention having from 8 to 20 carbon atoms include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid and 2,6-naphthalene dicarboxylic acid etc.

More preferred aliphatic dicarboxylic acids in these are malonic acid, succinic acid, maleic acid, fumaric acid, glutaric acid, adipic acid, azelaic acid, 1,4-cyclohexanedicarboxylic acid. More preferred aromatic dicarboxylic acids in these are phthalic acid, terephthalic acid, isophthalic acid, 1,5-naphthalene dicarboxylic acid and 1,4-naphthalene dicarboxylic acid. Particularly preferred dicarboxylic acids are succinic acid, glutaric acid and adipic acid and particularly preferable aromatic dicarboxylic acids are phthalic acid, terephthalic acid and isophthalic acid.

In the present invention, at least one kind of above-mentioned aliphatic dicarboxylic acid and at least one kind of the aromatic dicarboxylic acid are used in combination. The combination of these acids is not limited and several kinds of each ingredient may be used in combination.

The diol and the aromatic diol used for the high-molecular additive are selected, for example, from aliphatic diols having from 2 to 20 carbon atoms, alkyl ether diols having from 4 to 20 carbon atoms, and aromatic diols having from 6 to 20 carbon atoms.

Examples of the aliphatic diol having from 2 to 20 carbon atoms include an alkyldiol and an aliphatic diol. For example, an ethandiol, 1,2-propandiol, 1,3-propandiol, 1,2-butandiol, 1,3-butandiol, 2-methyl-1,3-propandiol, 1,4-butandiol, 1,5-pentandiol, 2,2-dimethyl-1,3-propandiol (neopentyl glycol), 2,2-diethyl-1,3-propandiol (3,3-dimethylpentane), 2-n-buthyl-2-ethyl-1,3-propandiol (3,3-dimethylolheptane), 3-methyl-1,5-pentandiol, 1,6-hexandiol, 2,2,4-trimethyl-1,3-pentandiol, 2-ethyl-1,3-hexandiol, 2-methyl-1,8-octandiol, 1,9-nonandiol, 1,10-decandiol, 1,12-octadecandiol, etc. One or more of these glycols may be used either singly or as combined mixture.

Specific examples of preferred aliphatic diols include an ethandiol, 1,2-propandiol, 1,3-propandiol, 1,2-butandiol, 1,3-butandiol, 2-methyl-1,3-propandiol, 1,4-butandiol, 1,5-pentandiol, 3-methyl-1,5-pentandiol, 1,6-hexandiol, 1,4-cyclohexandiol, 1,4-cyclohexandimethanol. Particularly preferred examples include ethandiol, 1,2-propandiol, 1,3-propandiol, 1,2-butandiol, 1,3-butandiol, 1,4-butandiol, 1,5-pentandiol, 1,6-hexandiol, 1,4-cyclohexandiol, 1,4-cyclohexanedimethanol.

Specific examples of preferred alkyl ether diols having from 4 to 20 carbon atoms are polytetramethylene ether glycol, polyethylene ether glycol and polypropylene ether glycol, and combinations of these. The average degree of polymerization is not limited in particular, and it is preferably from 2 to 20, more preferably 2 to 10, further preferably from 2 to 5, especially preferably from 2 to 4. As these examples, Carbowax resin, Pluronics resin and Niax resin are commercially available as typically useful polyether glycols.

Specific examples of aromatic diols having from 6 to 20 carbon atoms, not limited, include Bisphenol A, 1,2-hydroxybenzene, 1,3-hydroxybenzene, 1,4-hydroxybenzene, 1,4-dimethylolbenzene, and preferably include bisphenol A, 1,4-hydroxybenzene and 1,4-dimethylolbenzene.

In the invention, especially preferred is a high-molecular additive of which the terminal is blocked with an alkyl group or an aromatic group. The terminal protection with a hydrophobic functional group is effective against aging at high temperature and high humidity, by which the hydrolysis of the ester group is retarded.

Preferably, the polyester plasticizer in the invention is protected with a monoalcohol residue or a monocarboxylic acid residue in order that both ends of the polyester plasticizer are not a carboxylic acid or a hydroxyl group. In this case, the monoalcohol residue is preferably a substituted or unsubstituted monoalcohol residue having from 1 to 30 carbon atoms, including, for example, aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, oleyl alcohol; and substituted alcohols such as benzyl alcohol, 3-phenylpropanol.

Alcohol residues for terminal blocking that are preferred for use in the invention are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, benzyl alcohol, more preferably methanol, ethanol, propanol, isobutanol, cyclohexyl alcohol, 2-ethylhexyl alcohol, isononyl alcohol, benzyl alcohol.

In blocking with a monocarboxylic acid residue, the monocarboxylic acid for use as the monocarboxylic acid residue is preferably a substituted or unsubstituted monocarboxylic acid having from 1 to 30 carbon atoms. It may be an aliphatic monocarboxylic acid or an aromatic monocarboxylic acid. Preferred aliphatic monocarboxylic acids are described. They include acetic acid, propionic acid, butanoic acid, caprylic acid, caproic acid, decanoic acid, dodecanoic acid, stearic acid, oleic acid. Preferred aromatic monocarboxylic acids are, for example, benzoic acid, p-tert-butylbenzoic acid, orthotoluic acid, metatoluic acid, paratoluic acid, dimethylbenzoic acid, ethylbenzoic acid, normal-propylbenzoic acid, aminobenzoic acid, acetoxybenzoic acid. One or more of these may be used either singly or as combined.

The high-molecular additive for use in the invention may be easily produced according to any of a thermal melt condensation method of polyesterification or interesterification of the above-mentioned dicarboxylic acid and diol and/or monocarboxylic acid or monoalcohol for terminal blocking, or according to an interfacial condensation method of an acid chloride of those acids and a glycol in an ordinary manner. The polyester additives are described in detail in Koichi Murai's "Additives, Their Theory and Application" (by Miyuki Publishing, first original edition published on Mar. 1, 1973). The materials described in JP-A 05-155809, 05-155810, 05-197073, 2006-259494, 07-330670, 2006-342227, 2007-003679 are also usable herein.

Specific examples of the polyester-type polymers for use in the invention are shown below, to which, however, the polyester-type polymers for the invention should not be limited.

TABLE 1

| | Dicarboxylic acid | | | Diol | | | Number |
|---|---|---|---|---|---|---|---|
| | Aromatic dicarboxylic acid | Aliphatic dicarboxylic acid | Dicarboxylic acid ratio (Mol %) | Aliphatic diol | Diol ratio (Mol %) | Ends of polymer | average molecular weight |
| P-1 | — | AA | 100 | Ethandiol | 100 | Hydroxyl group | 1000 |
| P-2 | — | AA | 100 | Ethandiol | 100 | Hydroxyl group | 2000 |
| P-3 | — | AA | 100 | Propandiol | 100 | Hydroxyl group | 2000 |
| P-4 | — | AA | 100 | Butandiol | 100 | Hydroxyl group | 2000 |
| P-5 | — | AA | 100 | Hexandiol | 100 | Hydroxyl group | 2000 |
| P-6 | — | AA/SA | 60/40 | Ethandiol | 100 | Hydroxyl group | 900 |
| P-7 | — | AA/SA | 60/40 | Ethandiol | 100 | Hydroxyl group | 1500 |
| P-8 | — | AA/SA | 60/40 | Ethandiol | 100 | Hydroxyl group | 1800 |
| P-9 | — | SA | 100 | Ethandiol | 100 | Hydroxyl group | 1500 |
| P-10 | — | SA | 100 | Ethandiol | 100 | Hydroxyl group | 2300 |
| P-11 | — | SA | 100 | Ethandiol | 100 | Hydroxyl group | 6000 |
| P-12 | — | SA | 100 | Ethandiol | 100 | Hydroxyl group | 1000 |
| P-13 | PA | SA | 50/50 | Ethandiol | 100 | Hydroxyl group | 1000 |
| P-14 | PA | SA | 50/50 | Ethandiol | 100 | Hydroxyl group | 1800 |
| P-15 | PA | AA | 50/50 | Ethandiol | 100 | Hydroxyl group | 2300 |
| P-16 | PA | SA/AA | 40/30/30 | Ethandiol | 100 | Hydroxyl group | 1000 |
| P-17 | PA | SA/AA | 50/20/30 | Ethandiol | 100 | Hydroxyl group | 1500 |
| P-18 | PA | SA/AA | 50/30/20 | Ethandiol | 100 | Hydroxyl group | 2600 |
| P-19 | TPA | SA | 50/50 | Ethandiol | 100 | Hydroxyl group | 1000 |
| P-20 | TPA | SA | 50/50 | Ethandiol | 100 | Hydroxyl group | 1200 |
| P-21 | TPA | AA | 50/50 | Ethandiol | 100 | Hydroxyl group | 2100 |
| P-22 | TPA | SA/AA | 40/30/30 | Ethandiol | 100 | Hydroxyl group | 1000 |
| P-23 | TPA | SA/AA | 50/20/30 | Ethandiol | 100 | Hydroxyl group | 1500 |
| P-24 | TPA | SA/AA | 50/30/20 | Ethandiol | 100 | Hydroxyl group | 2100 |
| P-25 | PA/TPA | AA | 15/35/50 | Ethandiol | 100 | Hydroxyl group | 1000 |
| P-26 | PA/TPA | AA | 20/30/50 | Ethandiol | 100 | Hydroxyl group | 1000 |
| P-27 | PA/TPA | SA/AA | 15/35/20/30 | Ethandiol | 100 | Hydroxyl group | 1000 |
| P-28 | PA/TPA | SA/AA | 20/30/20/30 | Ethandiol | 100 | Hydroxyl group | 1000 |
| P-29 | PA/TPA | SA/AA | 10/50/30/10 | Ethandiol | 100 | Hydroxyl group | 1000 |
| P-30 | PA/TPA | SA/AA | 5/45/30/20 | Ethandiol | 100 | Hydroxyl group | 1000 |
| P-31 | — | AA | 100 | Ethandiol | 100 | Acetyl ester residue | 1000 |
| P-32 | — | AA | 100 | Ethandiol | 100 | Acetyl ester residue | 2000 |
| P-33 | — | AA | 100 | Propandiol | 100 | Acetyl ester residue | 2000 |
| P-34 | — | AA | 100 | Butandiol | 100 | Acetyl ester residue | 2000 |
| P-35 | — | AA | 100 | Hexandiol | 100 | Acetyl ester residue | 2000 |
| P-36 | — | AA/SA | 60/40 | Ethandiol | 100 | Acetyl ester residue | 900 |

TABLE 2

| | Dicarboxylic acid | | | Diol | | | Number |
|---|---|---|---|---|---|---|---|
| | Aromatic dicarboxylic acid | Aliphatic dicarboxylic acid | Dicarboxylic acid ratio (Mol %) | Aliphatic diol | Diol ratio (Mol %) | Ends of polymer | average molecular weight |
| P-37 | — | AA/SA | 60/40 | Ethandiol | 100 | Acetyl ester residue | 1000 |
| P-38 | — | AA/SA | 60/40 | Ethandiol | 100 | Acetyl ester residue | 2000 |
| P-39 | — | SA | 100 | Ethandiol | 100 | Acetyl ester residue | 1000 |
| P-40 | — | SA | 100 | Ethandiol | 100 | Acetyl ester residue | 3000 |
| P-41 | — | SA | 100 | Ethandiol | 100 | Acetyl ester residue | 5500 |
| P-42 | — | SA | 100 | Ethandiol | 100 | Acetyl ester residue | 1000 |
| P-43 | PA | SA | 50/50 | Ethandiol | 100 | Acetyl ester residue | 1000 |
| P-44 | PA | SA | 50/50 | Ethandiol | 100 | Acetyl ester residue | 1500 |
| P-45 | PA | AA | 50/50 | Ethandiol | 100 | Acetyl ester residue | 2000 |
| P-46 | PA | SA/AA | 40/30/30 | Ethandiol | 100 | Acetyl ester residue | 1000 |
| P-47 | PA | SA/AA | 33/33/34 | Ethandiol | 100 | Benzoic acid residue | 1000 |
| P-48 | PA | SA/AA | 50/20/30 | Ethandiol | 100 | Acetyl ester residue | 1500 |
| P-49 | PA | SA/AA | 50/30/20 | Ethandiol | 100 | Acetyl ester residue | 2000 |
| P-50 | TPA | SA | 50/50 | Ethandiol | 100 | Acetyl ester residue | 1000 |
| P-51 | TPA | SA | 50/50 | Ethandiol | 100 | Acetyl ester residue | 1500 |
| P-52 | TPA | SA | 45/55 | Ethandiol | 100 | Acetyl ester residue | 1000 |
| P-53 | TPA | AA | 50/50 | Ethandiol | 100 | Acetyl ester residue | 2200 |
| P-54 | TPA | SA | 35/65 | Ethandiol | 100 | Acetyl ester residue | 1000 |

TABLE 2-continued

| | Dicarboxylic acid | | | Diol | | | Number |
| | Aromatic dicarboxylic acid | Aliphatic dicarboxylic acid | Dicarboxylic acid ratio (Mol %) | Aliphatic diol | Diol ratio (Mol %) | Ends of polymer | average molecular weight |
|---|---|---|---|---|---|---|---|
| P-55 | TPA | SA/AA | 40/30/30 | Ethandiol | 100 | Acetyl ester residue | 1000 |
| P-56 | TPA | SA/AA | 50/20/30 | Ethandiol | 100 | Acetyl ester residue | 1500 |
| P-57 | TPA | SA/AA | 50/30/20 | Ethandiol | 100 | Acetyl ester residue | 2000 |
| P-58 | TPA | SA/AA | 20/20/60 | Ethandiol | 100 | Acetyl ester residue | 1000 |
| P-59 | PA/TPA | AA | 15/35/50 | Ethandiol | 100 | Acetyl ester residue | 1000 |
| P-60 | PA/TPA | AA | 25/25/50 | Ethandiol | 100 | Acetyl ester residue | 1000 |
| P-61 | PA/TPA | SA/AA | 15/35/20/30 | Ethandiol | 100 | Acetyl ester residue | 1000 |
| P-62 | PA/TPA | SA/AA | 20/30/20/30 | Ethandiol | 100 | Acetyl ester residue | 1000 |
| P-63 | PA/TPA | SA/AA | 10/50/30/10 | Ethandiol | 100 | Acetyl ester residue | 1000 |
| P-64 | PA/TPA | SA/AA | 5/45/30/20 | Ethandiol | 100 | Acetyl ester residue | 1000 |
| P-65 | PA/TPA | SA/AA | 5/45/20/30 | Ethandiol | 100 | Acetyl ester residue | 1000 |
| P-66 | IPA | AA/SA | 20/40/40 | Ethandiol | 100 | Acetyl ester residue | 1000 |
| P-67 | 2,6-NPA | AA/SA | 20/40/40 | Ethandiol | 100 | Acetyl ester residue | 1200 |
| P-68 | 1,5-NPA | AA/SA | 20/40/40 | Ethandiol | 100 | Acetyl ester residue | 1200 |
| P-69 | 1,4-NPA | AA/SA | 20/40/40 | Ethandiol | 100 | Acetyl ester residue | 1200 |
| P-70 | 1,8-NPA | AA/SA | 20/40/40 | Ethandiol | 100 | Acetyl ester residue | 1200 |
| P-71 | 2,8-NPA | AA/SA | 20/40/40 | Ethandiol | 100 | Acetyl ester residue | 1200 |

In Table 1 and Table 2, PA is phthalic acid, TPA is terephthalic acid, IPA is isophthalic acid, AA is adipic acid, SA is succinic acid, 2,6-NPA is 2,6-naphthalenedicarboxylic acid, 2,8-NPA is 2,8-naphthalenedicarboxylic acid, 1,5-NPA is 1,5-naphthalenedicarboxylic acid, 1,4-NPA is 1,4-naphthalenedicarboxylic acid, 1,8-NPA is 1,8-naphthalenedicarboxylic acid.

Styrene Polymer:

The styrene polymer preferably has a structural unit derived from an aromatic vinyl monomer, represented by the following formula (1):

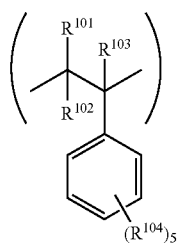

(1)

wherein $R^{101}$ to $R^{104}$ each independently represent a hydrogen atom, a halogen atom, a substituted or unsubstituted hydrocarbon group having from 1 to 30 carbon atoms and optionally having a linking group containing any of an oxygen atom, a sulfur atom, a nitrogen atom or a silicon atom, or a polar group; $R^{104}$ may be all the same atom or group, or may be different atoms or groups, or may bond to each other to form a carbon ring or a hetero ring (the carbon ring or the hetero ring may have a monocyclic structure or may be condensed with any other ring to form a polycyclic structure).

The specific examples of the aromatic vinyl monomer include styrene; alkyl-substituted styrenes such as α-methylstyrene, β-methylstyrene, p-methylstyrene; halogen-substituted styrenes such as 4-chlorostyrene, 4-bromostyrene; hydroxystyrenes such as p-hydroxystyrene, α-methyl-p-hydroxystyrene, 2-methyl-4-hydroxystyrene, 3,4-dihydroxystyrene; vinyl benzyl alcohols; alkoxy-substituted styrenes such as p-methoxystyrene, p-tert-buthoxystyrene, m-tert-buthoxystyrene; vinylbenzoic acids such as 3-vinylbenzoic acid, 4-vinylbenzoic acid; vinylbenzoic acid esters such as methyl-4-vinylbenzoate, ethyl-4-vinylbenzoate; 4-vinylbenzyl acetate; 4-acetoxystyrene; amidostyrenes such as 2-butylamidostyrene, 4-methylamidostyrene, p-sulfoneamidostyrene; aminostyrenes such as 3-aminostyrene, 4-aminostyrene, 2-isopropenyl aniline, vinylbenzyldimethylamine; nitrostyrenes such as 3-nitrostyrene, 4-nitrostyrene; cyanostyrenes such as 3-cyanostyrene, 4-cyanostyrene; vinyl phenyl acetonitrile; arylstyrenes such as phenylstyrene; indene; however, the aromatic vinyl monomers usable in the invention should not be limited to these specific examples. Two or more these aromatic vinyl monomers may be used as monomers for copolymerization. In these, styrene and α-methylstyrene are preferable because they are easily available from industry with a reasonable cost.

Acryl Polymer:

The acryl polymer preferably has a structural unit derived from an acrylic ester monomer represented by the following formula (2):

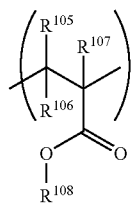

(2)

wherein $R^{105}$ to $R^{108}$ each independently represent a hydrogen atom, a halogen atom, a substituted or unsubstituted hydrocarbon group having from 1 to 30 carbon atoms and optionally having a linking group containing any of an oxygen atom, a sulfur atom, a nitrogen atom or a silicon atom, or a polar group.

The specific examples of the acrylic ester monomer include, for example, methyl acrylate, ethyl acrylate, propyl acrylate(i-, n-), butyl acrylate(n-, i-, s-, tert-), pentyl acrylate (n-, i-, s-), hexyl acrylate(n-, i-), heptyl acrylate(n-, i-), octyl acrylate(n-, i-), nonyl acrylate(n-, i-), myristyl acrylate(n-, i-), 2-ethylhexyl acrylate, ε-caprolactone acrylate, 2-hydroxyethyl acrylate, 2-hydroxypropyl acrylate, 3-hydroxypropyl acrylate, 4-hydroxybutyl acrylate, 2-hydroxybutyl acrylate, 2-methoxyethyl acrylate, 2-ethoxyethyl acrylate, phenyl acrylate, phenyl methacrylate, 2- or 4-chlorophenyl acrylate, 2- or 4-chlorophenyl methacrylate, 2-, 3- or 4-ethoxycarbonylphenyl acrylate, 2-, 3 or 4-ethoxycarbonylphenyl methacrylate, o-, m- or p-tolyl acrylate, o-, m- or p-tolyl methacrylate, benzyl acrylate, benzyl methacrylate, phenetyl acrylate, phenetyl methacrylate, 2-nathtyl acrylate, cyclohexyl acrylate, cyclohexyl methacrylate, 4-methylcyclohexyl acrylate, 4-methylcyclohexyl methacrylate, 4-ethylcyclohexyl acrylate, 4-ethylcyclohexyl methacrylate, and one obtained by changing acrylate to methacrylate in the above esters; however, the present invention should not be limited to these specific examples. Two or more these aromatic vinyl monomers may be used as monomers for copolymerization. In these, methyl acrylate, ethyl acrylate, propyl acrylate(i-, n-), butyl acrylate (n-, i-, s-, tert-), pentyl acrylate (n-, i-, s-), hexyl acrylate (n-, i-) or one obtained by changing acrylate to methacrylate in these esters are preferable because they are easily available from industry with a reasonable cost.

Copolymer:

The copolymer preferably includes at least one kind of a structural unit derived from an aromatic vinyl monomer represented by the following formula (1) and one kind of a structural unit derived from an acrylic ester monomer, represented by the following formula (2):

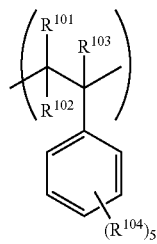

(1)

wherein $R^{101}$ to $R^{104}$ each independently represent a hydrogen atom, a halogen atom, a substituted or unsubstituted hydrocarbon group having from 1 to 30 carbon atoms and optionally having a linking group containing any of an oxygen atom, a sulfur atom, a nitrogen atom or a silicon atom, or a polar group; $R^{104}$ may be all the same atom or group, or may be different atoms or groups, or may bond to each other to form a carbon ring or a hetero ring (the carbon ring or the hetero ring may have a monocyclic structure or may be condensed with any other ring to form a polycyclic structure).

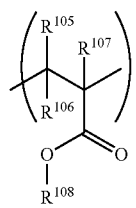

(2)

wherein $R^{105}$ to $R^{108}$ each independently represent a hydrogen atom, a halogen atom, a substituted or unsubstituted hydrocarbon group having from 1 to 30 carbon atoms and optionally having a linking group containing any of an oxygen atom, a sulfur atom, a nitrogen atom or a silicon atom, or a polar group.

Other structures than the above-mentioned ones for constituting the copolymerization composition are preferably those excellent in the copolymerizability with the above-mentioned monomers. Their examples include acid anhydrides such as maleic anhydride, citraconic anhydride, cis-1-cyclohexene-1,2-dicarboxylic acid anhydride, 3-methyl-cis-1-cyclohexene-1,2-dicarboxylic acid anhydride, 4-methyl-cis-1-cyclohexene-1,2-dicarboxylic acid anhydride, etc.; nitrile group-containing radical-polymerizing monomers such as acrylonitrile, methacrylonitrile, etc.; amide bond-containing radical-polymerizing monomers such as acrylamide, methacrylamide, trifluoromethanesulfonylaminomethyl (meth)acrylate, etc.; aliphatic acid vinyl esters such as vinyl acetate, etc.; chlorine-containing radical-polymerizing monomers such as vinyl chloride, vinylidene chloride, etc.; conjugated diolefins such as 1,3-butadiene, isoprene, 1,4-dimethylbutadiene, etc., to which, however, the invention should not be limited. Of those, especially preferred are styrene-acrylic acid copolymers, styrene-maleic anhydride copolymers, styrene-acrylonitrile copolymers.

(Low-Molecular Additive)

The low-molecular additive includes an Rth controller/regulator, a degradation inhibitor, a UV inhibitor, a release promoter, other plasticizer, IR absorbent, etc. These may be solid or oily. In other words, they are not specifically defined in point of the melting point or the boiling point thereof. For example, for the additive, a UV absorbent having a melting point of 20° C. or lower and a UV absorbent having a melting point of 20° C. or higher may be mixed, or degradation inhibitors may also be mixed in the same manner.

IR absorbent dyes are described in, for example, JP-A 2001-194522. The time at which the additive is added may be in any stage in the step of preparing the cellulose acylate solution (dope); however, the additive may be added in the final stage of the dope preparation step. Not specifically defined, the amount of the material to be added may be any one capable expressing the function thereof.

(Rth Regulator)

The film of the invention may include Rth regulators.

Example of the Rth regulator is one compound represented by the following formulae (4) to (8-4), however it is not limited.

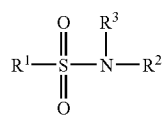

(4)

wherein $R^1$ represents an alkyl group or an aryl group, and each of $R^2$ and $R^3$ represent, independently from each other, a hydrogen atom, an alkyl group or an aryl group. The total number of carbon atoms of $R^1$, $R^2$ and $R^3$ is 10 or more.

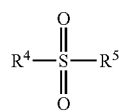

(5)

wherein each of $R^4$ and $R^5$ represent, independently from each other, an alkyl group or an aryl group. The total number of carbon atoms of $R^4$ and $R^5$ is 10 or more.

In the formula (5), the respective alkyl and aryl groups may have a substituent. As a substituent, a fluorine atom, an alkyl group, an aryl group, an alkoxy group, a sulfone group and a sulfonamido group are preferred, and an alkyl group, an aryl group, an alkoxy group, a sulfone group and a sulfonamido group are particularly preferred. The alkyl group may be of straight chain, branched chain or cycle. Number of carbon atoms thereof is preferably 1-25, more preferably 6-25, particularly preferably 6-20 (for example, a methyl group, an ethyl group, a propyl group, an isopropyl group, a butyl group, an isobutyl group, a tert-butyl group, an amyl group, an isoamyl group, a tert-amyl group, a hexyl group, a cyclohexyl group, a heptyl group, an octyl group, a bicyclooctyl group, a nonyl group, an adamantyl group, a decyl group, a tert-octyl group, an undecyl group, a dodecyl group, a tridecyl group, a tetradecyl group, a pentadecyl group, a hexadecyl group, a heptadecyl group, an octadecyl group, a nonadecyl group and a didecyl group). Number of carbon atoms of the aryl group is preferably 6-30, particularly preferably 6-24 (for example, a phenyl group, a biphenyl group, a terphenyl group, a naphthyl group, a binaphthyl group and a triphenylphenyl group). Preferable examples of the compound represented by the formula (4) or (5) are shown below, however the invention is not restricted to these specific examples.

A-1

A-2

A-3

A-4

A-5

A-6

A-7

-continued

A-8
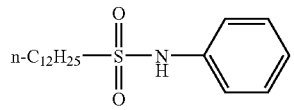

A-9
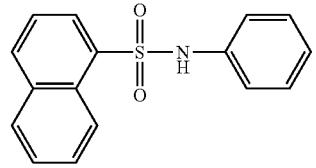

A-10
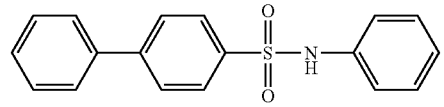

A-11
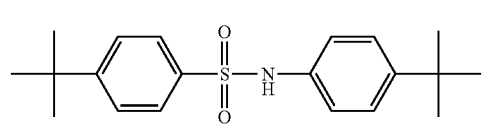

A-12
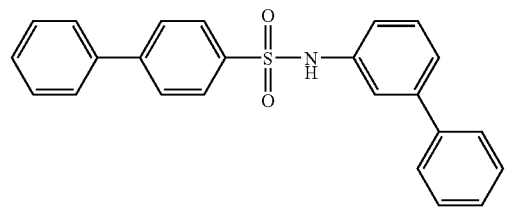

A-13
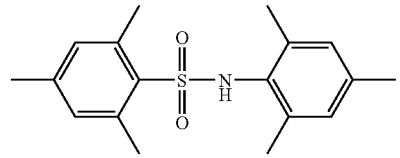

A-14
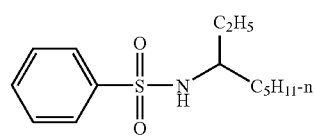

A-15
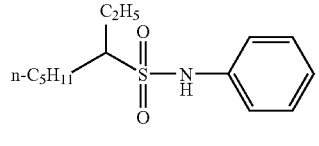

A-16
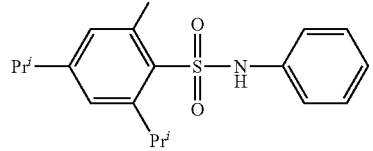

A-17
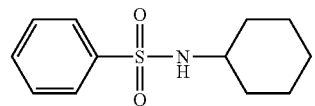

-continued
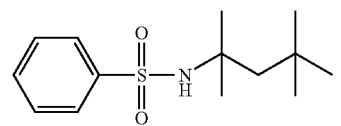
A-18
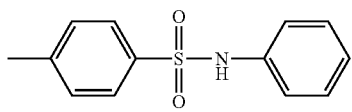
A-19
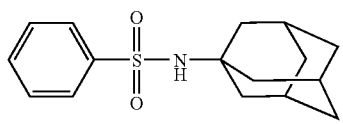
A-20
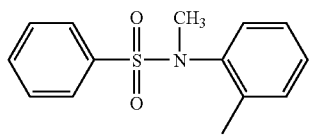
A-21
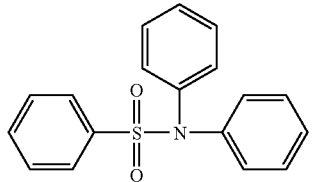
A-22
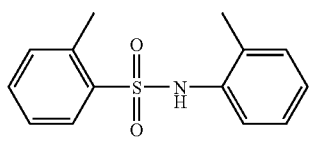
A-23
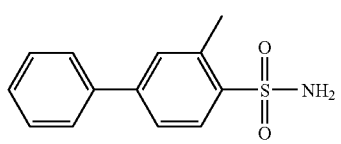
A-24
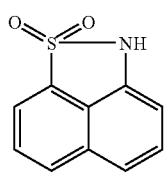
A-25
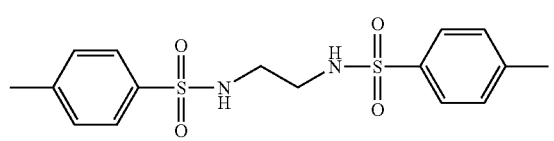
A-26
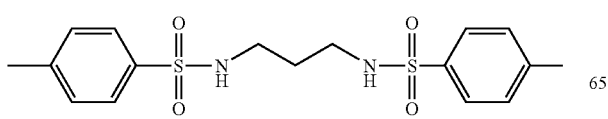
A-27
-continued
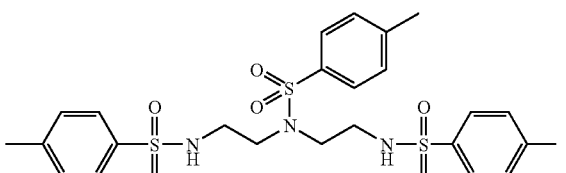
A-28
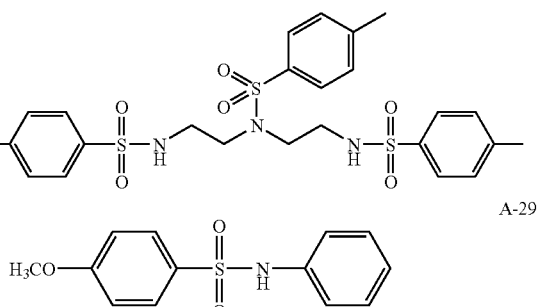
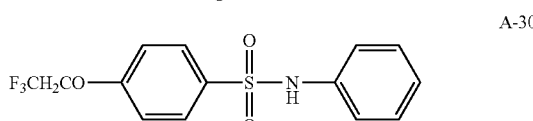
A-29
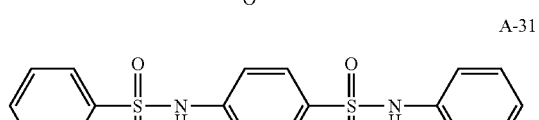
A-30
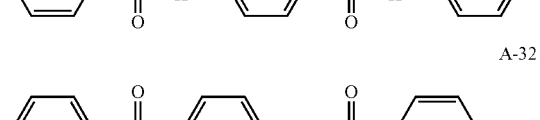
A-31
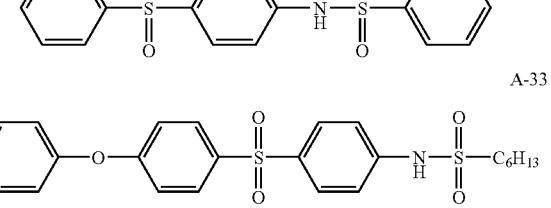
A-32
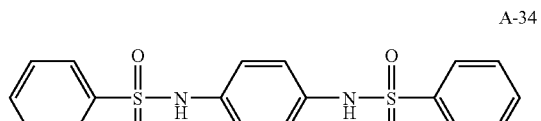
A-33
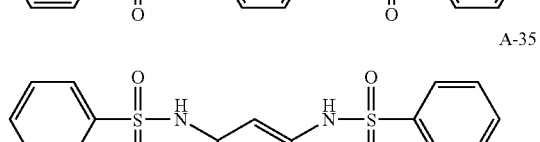
A-34
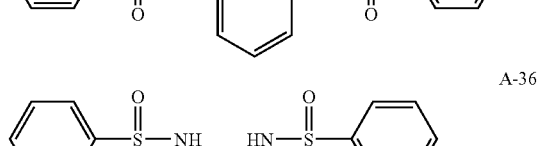
A-35
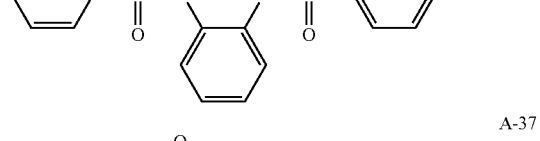
A-36
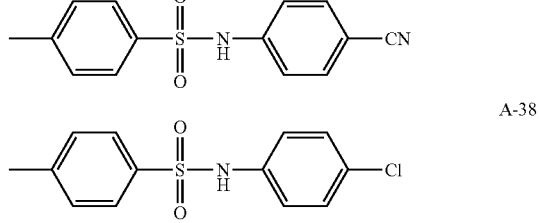
A-37
A-38

A-39
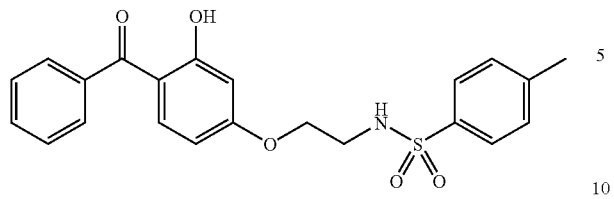
A-40
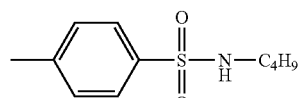
A-41
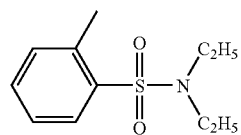
A-42
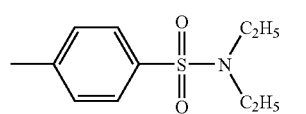
A-43
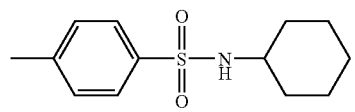
A-44
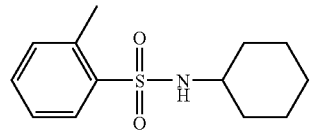
A-45
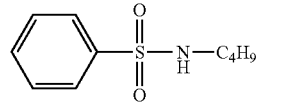
A-46
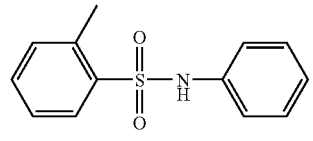
A-47
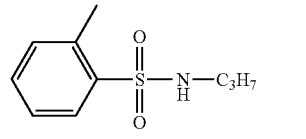
A-48
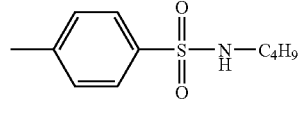
A-49
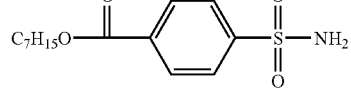
A-50
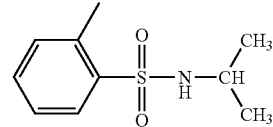
A-51
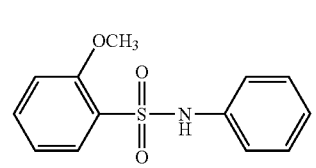
B-1
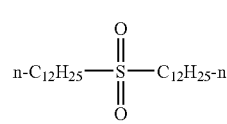
B-2
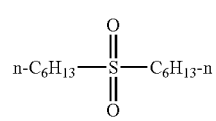
B-3
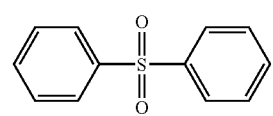
B-4
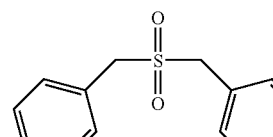
B-5
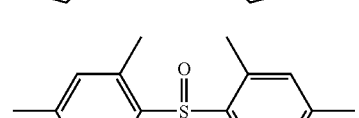
B-6
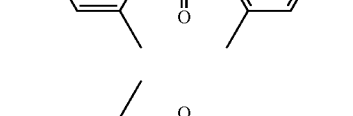
B-7
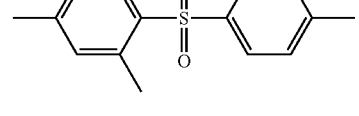
B-8
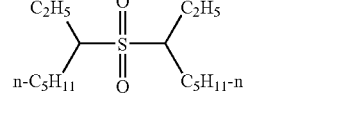
B-9
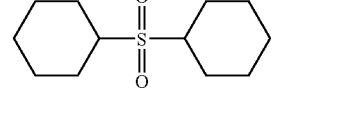

B-10
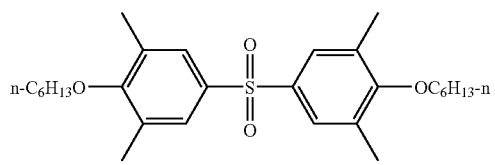
B-11
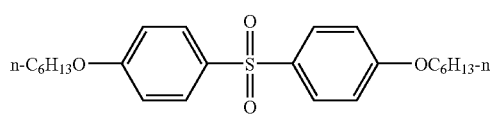
B-12
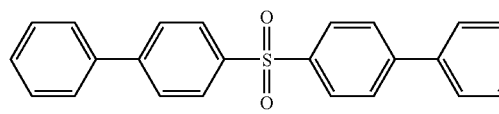
B-13
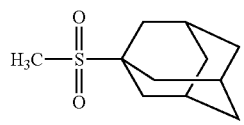
B-14
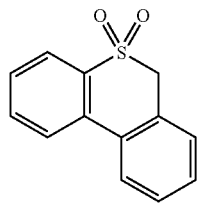
B-15
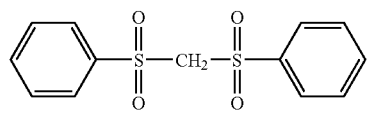
B-16
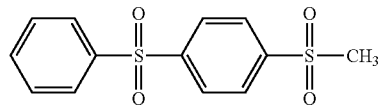
B-17
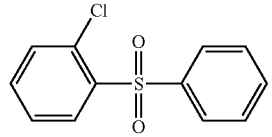
B-18
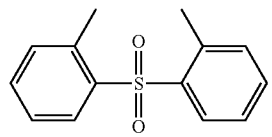
B-19
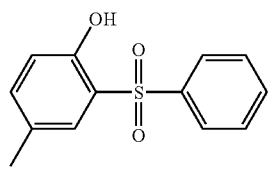
B-20
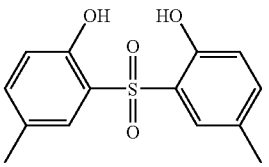
B-21
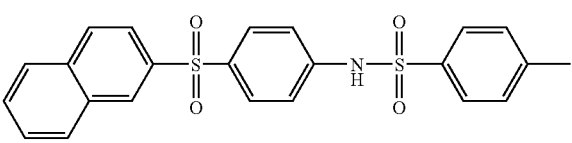
B-22
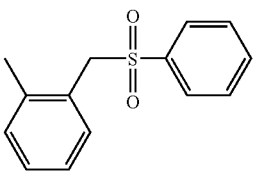
B-23
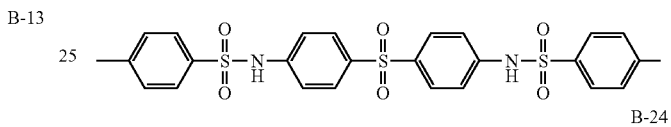
B-24
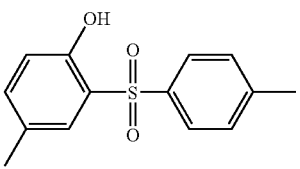
B-25
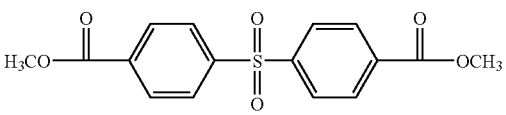
B-26
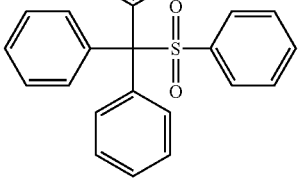
B-27
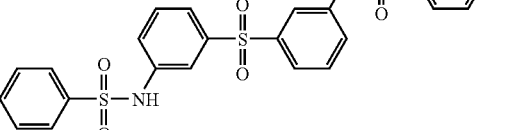
B-28
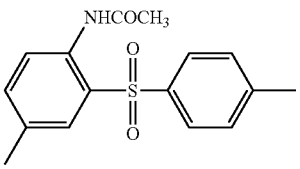

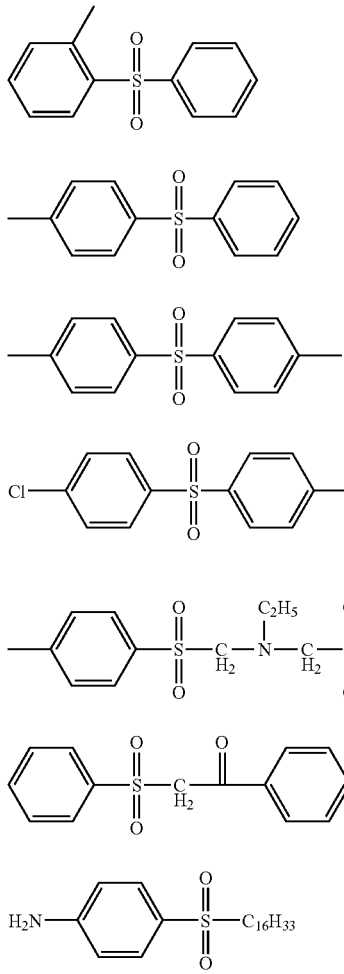

The compound of formula (7) is described in detail hereinunder.

(7)

In the formula (7), each of $R^{21}$, $R^{22}$ and $R^{23}$ represent, independently from each other, an alkyl group. The alkyl group may be a straight chain, branched chain or cycle. Preferably, $R^{21}$ is a cyclic alkyl group, and more preferably at least one of $R^{22}$ or $R^{23}$ is an cyclic alkyl group. Number of carbon atoms thereof is preferably 1-20, more preferably 1-15, most preferably 1-12. As a cyclic alkyl group, a cyclohexyl group is particularly preferred.

The alkyl group and aryl group of the formulae (6) and (7) may have a substituent. Examples of the substituent include, preferably, a halogen atom (for example, chlorine, bromine, fluorine and iodine), an alkyl group, an aryl group, an alkoxy group, an aryloxy group, an acyl group, an alkoxycarbonyl group, an aryloxycarbonyl group, an acyloxy group, a sulfonylamino group, a hydroxyl group, a cyano group, an amino group and an acylamino group, more preferably a halogen atom, an alkyl group, an aryl group, an alkoxy group, an aryloxy group, a sulfonylamino group and an acylamino group, particularly preferably an alkyl group, an aryl group, a sulfonylamino group and an acylamino group.

Preferable examples of the compound represented by the formulae (6) and (7) are shown below, however compounds usable in the invention are not restricted to these specific examples.

The compounds of formula (4) or formula (5) may be produced according to the following methods.

The compound of formula (4) may be produced through condensation of a sulfonyl chloride derivative and an amine derivative. The compound of formula (5) may be produced through oxidation or a sulfide or Friedel-Crafts reaction of an aromatic compound and a sulfonic acid chloride.

The compound of formula (6) is described in detail hereinunder.

(6)

$$R^{11}-\overset{O}{\underset{\|}{C}}-\underset{|}{N}-R^{12}$$
$$\phantom{R^{11}-\overset{O}{\underset{\|}{C}}-}R^{13}$$

Wherein $R^{11}$ represents an aryl group. Each of $R^{12}$ and $R^{13}$ represent, independently from each other, an alkyl group or an aryl group, and at least one of $R^{12}$ or $R^{13}$ is an aryl group. Where $R^{12}$ is an aryl group $R^{13}$ may be an alkyl group or an aryl group, more preferably an alkyl group. The alkyl group may be a straight chain, branched chain or cycle, and number of carbon atoms thereof is preferably 1-20, more preferably 1-15, most preferably 1-12. Number of carbon atoms of the alkyl group is preferably 6-36, more preferably 6-24.

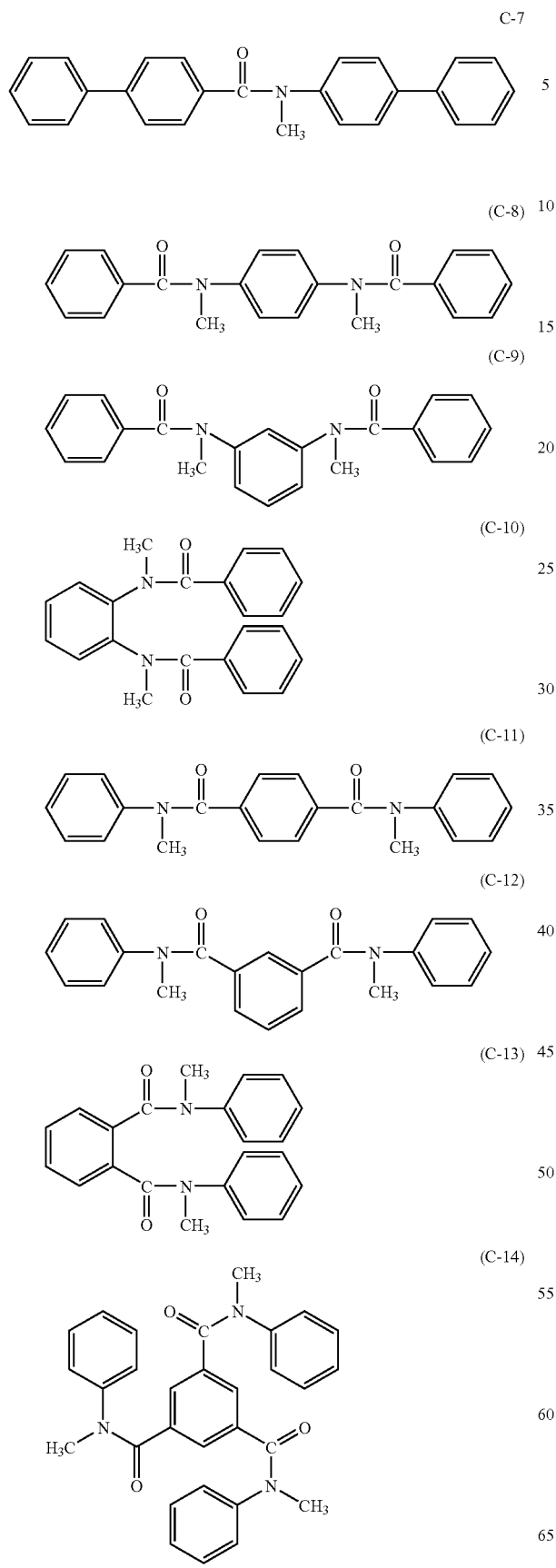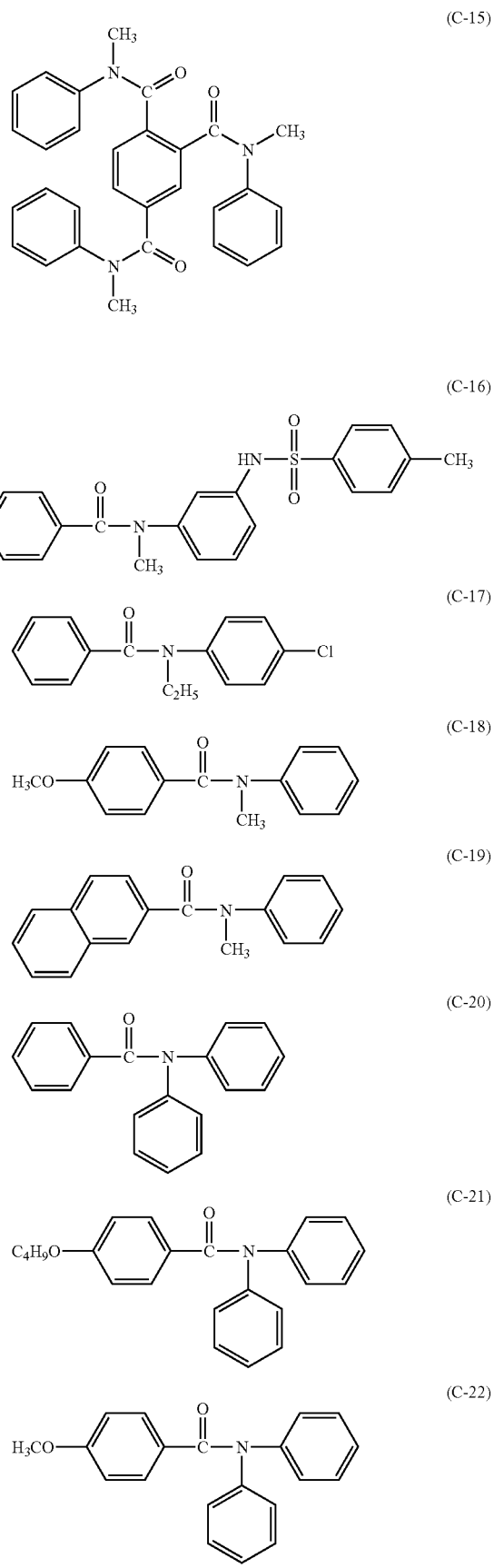

(C-23)
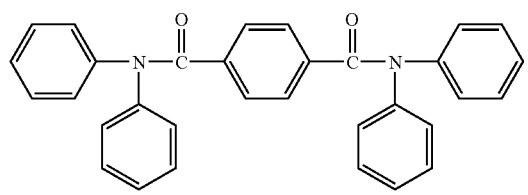
(C-24)
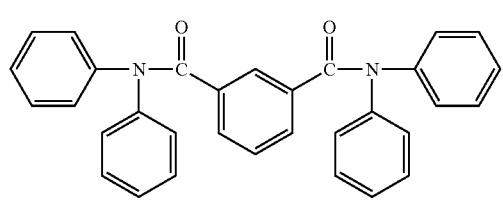
(C-25)
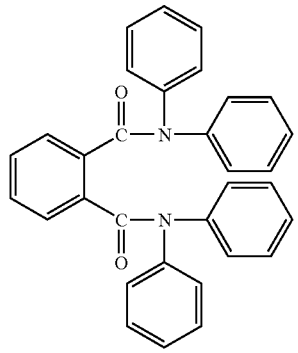
(C-26)
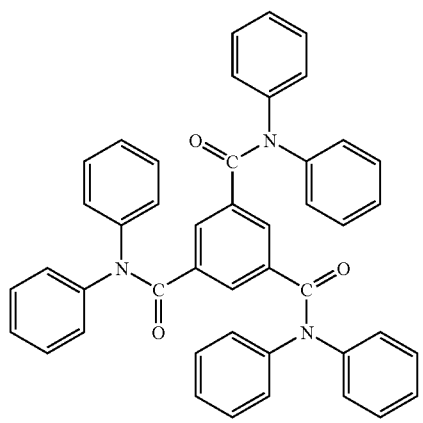
(C-27)
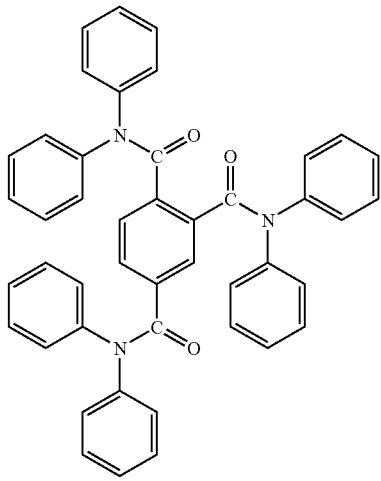
(C-28)
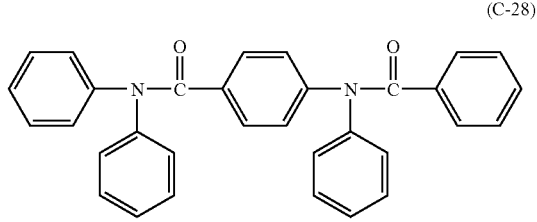
(D-1)
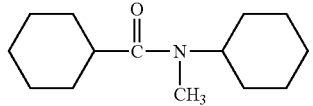
(D-2)
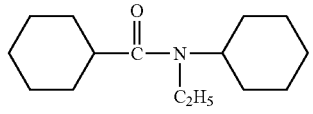
(D-3)
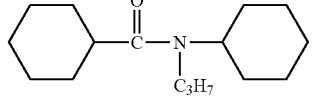
(D-4)
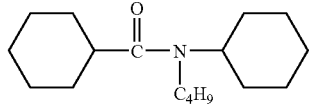
(D-5)
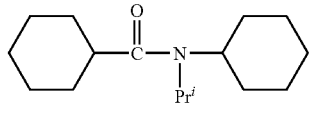
(D-6)
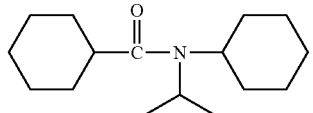
(D-7)
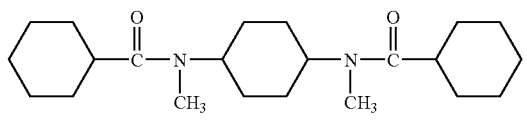

-continued
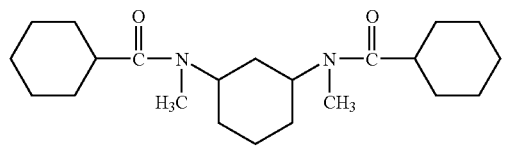
(D-8)
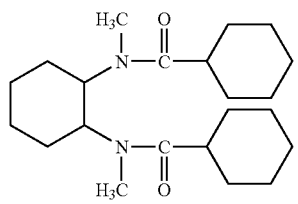
(D-9)
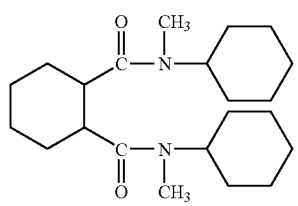
(D-10)
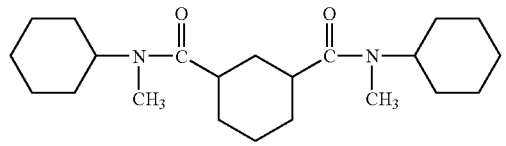
(D-11)
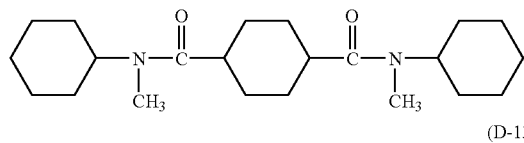
(D-12)
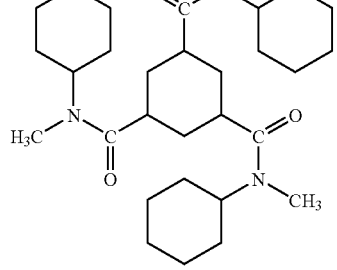
(D-13)
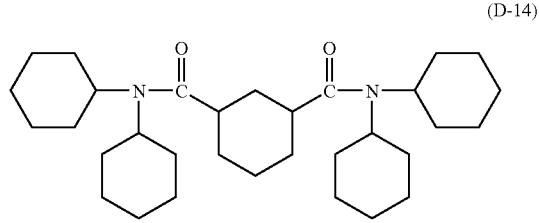
(D-14)
-continued
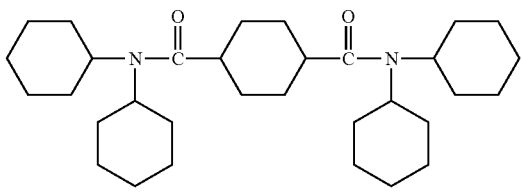
(D-15)
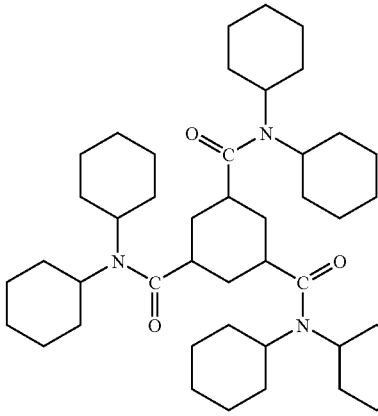
(D-16)
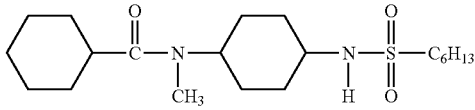
(D-17)
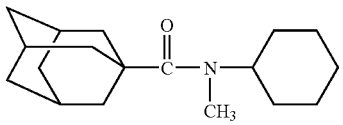
(D-18)
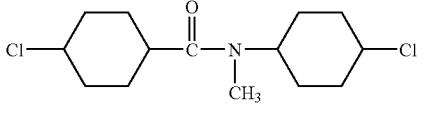
(D-19)
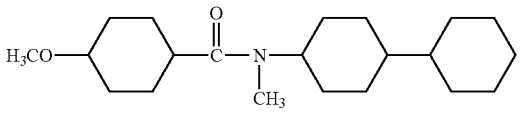
(D-20)
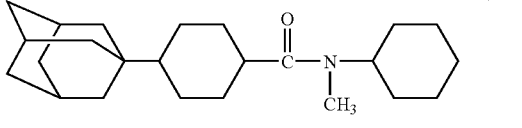
(D-21)
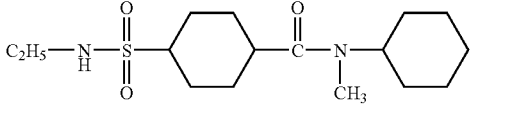
(D-22)
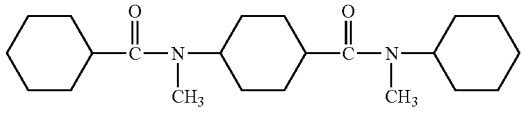
(D-23)

-continued

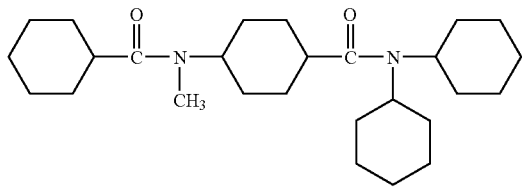

(D-24)

The compound of formula (8) is described in detail hereinunder.

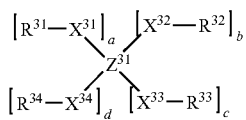

(8)

In the above formula (8), $R^{31}$, $R^{32}$, $R^{33}$ and $R^{34}$ each represent a hydrogen atom, a substituted or unsubstituted aliphatic group, or a substituted or unsubstituted aromatic group, preferably an aliphatic group. The aliphatic group may be linear, branched or cyclic, but is preferably cyclic. As the substituent that the aliphatic group and the aromatic group may have, mentioned are the substituents T given hereinunder; however, the groups are preferably unsubstituted.

$X^{31}$, $X^{32}$, $X^{33}$ and $X^{34}$ each represent a divalent linking group to be formed by at least one group selected from a single bond, —CO— and —$NR^{35}$— ($R^{35}$ represents a substituted or unsubstituted aliphatic group, or a substituted or unsubstituted aromatic group, and is preferably an unsubstituted one and/or an aliphatic group). The combination of $X^{31}$, $X^{32}$, $X^{33}$ and $X^{34}$ is not specifically defined, but is preferably selected from —CO— and —$NR^{35}$—. a, b, c and d each indicate an integer of 0 or more, and are preferably 0 or 1. a+b+c+d is 2 or more, preferably from 2 to 8, more preferably from 2 to 6, even more preferably from 2 to 4. $Z^{31}$ represents a (a+b+c+d)-valent organic group (excluding cyclic ones). The valence of $Z^{31}$ is preferably from 2 to 8, more preferably from 2 to 6, even more preferably from 2 to 4, most preferably 2 or 3. The organic group is a group of an organic compound.

As the compound of above formula (8), the compound of formula (8-1) is preferable.

$$R^{311}—X^{311}-Z^{311}-X^{312}—R^{312}$$ (8-1)

In the above formula (8-1), $R^{311}$ and $R^{312}$ each represent a substituted or unsubstituted aliphatic group, or a substituted or unsubstituted aromatic group, preferably an aliphatic group. The aliphatic group may be linear, branched or cyclic, but is preferably cyclic. As the substituent that the aliphatic group and the aromatic group may have, mentioned are the substituents T given hereinunder; however, the groups are preferably unsubstituted. $X^{311}$ and $X^{312}$ each independently represent —$CONR^{313}$— or $NR^{314}CO$—; $R^{313}$ and $R^{314}$ each represent a substituted or unsubstituted aliphatic group, or a substituted or unsubstituted aromatic group, and are preferably an unsubstituted one and/or an aliphatic group. $Z^{311}$ represents a divalent organic group (excluding cyclic ones) formed of one or more groups selected from —O—, —S—, —SO—, —$SO_2$—, —CO—, —$NR^{315}$— ($R^{315}$ represents a substituted or unsubstituted aliphatic group, or a substituted or unsubstituted aromatic group, and are preferably an unsubstituted one and/or an aliphatic group), an alkylene group and an arylene group. The combination for $Z^{311}$ is not specifically defined, for which preferred are those selected from —O—, —S—, —$NR^{315}$— and an alkylene group, more preferred are those selected from —O—, —S— and an alkylene group.

As the compound of above formula (8-1), the compound of formulae (8-2) to (8-4) is preferable.

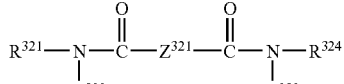

(8-2)

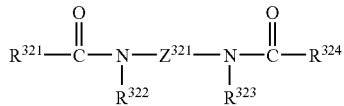

(8-3)

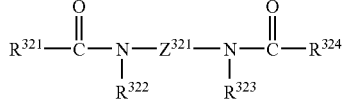

(8-4)

In the above formula (8-2) to (8-4), $R^{321}$, $R^{322}$, $R^{323}$, and $R^{324}$ each represent a substituted or unsubstituted aliphatic group, or a substituted or unsubstituted aromatic group, preferably an aliphatic group. The aliphatic group may be linear, branched or cyclic, but is preferably cyclic. As the substituent that the aliphatic group and the aromatic group may have, mentioned are the substituents T given hereinunder; however, the groups are preferably unsubstituted. $Z^{321}$ represents a divalent organic group (excluding cyclic ones) formed of one or more groups selected from —O—, —S—, —SO—, —$SO_2$—, —CO—, —$NR^{325}$— ($R^{325}$ represents a substituted or unsubstituted aliphatic group, or a substituted or unsubstituted aromatic group, and are preferably an unsubstituted one and/or an aliphatic group), an alkylene group and an arylene group. The combination for $Z^{321}$ is not specifically defined, for which preferred are those selected from —O—, —S—, —$NR^{325}$— and an alkylene group, more preferred are those selected from —O—, —S— and an alkylene group, and most preferred are those selected from —O—, —S— and an alkylene group.

The substituted or unsubstituted aliphatic group is described in detail hereinunder. The aliphatic group may be a straight chain, a branch chain, or a circle, and numbers of the carbon atoms thereof is preferably 1-25, more preferably 6-25, and particularly preferably 6-20. Specific examples of the aliphatic group include, for example, methyl group, ethyl group, n-propyl group, isopropyl group, cyclopropyl group, n-butyl group, isobutyl group, tert-butyl group, amyl group, isoamyl group, tert-amyl group, n-hexyl group, cyclohexyl group, n-heptyl group, n-octyl group, bicyclooctyl group, adamantyl group, n-decyl group, tert-octyl group, dodecyl group, hexadecyl group, octadecyl group, didecyl group, etc.

The aromatic group is described in detail hereinunder.

The aromatic group may be an aromatic hydrocarbon group or an aromatic hetero ring group, and more preferably an aromatic hydrocarbon group. As the aromatic hydrocarbon group, number of carbon atoms thereof is preferably 6-24, further preferably 6-12. As an example of an aromatic hydrocarbon group, for example, benzene, naphthalene, anthracene, biphenyl, terphenyl, etc. As an aromatic hydrocarbon group, benzene, naphthalene and biphenyl are particularly preferable. As the aromatic hetero ring group, one containing at least one of an oxygen atom, a nitrogen atom, or a sulfur atom is preferable. As a specific example of the hetero ring, for example, furan, pyrrole, thiophene, imidazole, pyrazole, pyridine, and pyrazine, triazol, triazine, indole, indazole, purine, thiazoline, thiadiazol, oxazoline, oxazal, oxadiazole, quinoline, isoquinoline, phthalazine, naphthyridine, quinoxaline, quinazoline, cinnoline, pteridine, acridine, phenanthroline, phenazine, tetrazol, benzimidazole, benzoxazol, benzthiazol, benztriazol, tetrazaindene, etc. As the aromatic hetero ring group, pyridine, triazine and quinoline are particularly preferable.

The substituent T is described in detail hereinunder.

Examples of the substituent T include an alkyl group (including, preferably, 1-20 carbon atoms, more preferably 1-12 carbon atoms, particularly preferably 1-8 carbon atoms, such as a methyl group, an ethyl group, an isopropyl group, a tert-butyl group, a n-octyl group, a n-decyl group, a n-hexadecyl group, a cyclopropyl group, a cyclopentyl group and a cyclohexyl group), an alkenyl group (including, preferably, 2-20 carbon atoms, more preferably 2-12 carbon atoms, particularly preferably 2-8 carbon atoms, such as a vinyl group, an allyl group, a 2-butenyl group and a 3-pentenyl group), an alkynyl group (including, preferably, 2-20 carbon atoms, more preferably 2-12 carbon atoms, particularly preferably 2-8 carbon atoms, such as a propagyl group and a 3-pentynyl group), an aryl group (including, preferably, 6-30 carbon atoms, more preferably 6-20 carbon atoms, particularly preferably 6-12 carbon atoms, such as a phenyl group, a p-methylphenyl group and a naphthyl group), amino group (including, preferably, 0-20 carbon atoms, more preferably 0-10 carbon atoms, particularly preferably 0-6 carbon atoms, such as an amino group, a methylamino group, a dimethylamino group, a diethylamino group and a dibenzylamino group), an alkoxy group (including, preferably, 1-20 carbon atoms, more preferably 1-12 carbon atoms, particularly preferably 1-8 carbon atoms, such as a methoxy group, an ethoxy group and a butoxy group), an aryloxy group (including, preferably, 6-20 carbon atoms, more preferably 6-16 carbon atoms, particularly preferably 6-12 carbon atoms, such as a phenyloxy group and a 2-naphthyloxy group), an acyl group (including, preferably, 1-20 carbon atoms, more preferably 1-16 carbon atoms, particularly preferably 1-12 carbon atoms, such as an acetyl group, a benzoyl group, a formyl group and a pivaloyl group), an alkoxycarbonyl group (including, preferably, 2-20 carbon atoms, more preferably 2-16 carbon atoms, particularly preferably 2-12 carbon atoms, such as a methoxycarbonyl group and an ethoxycarbonyl group), an aryloxycarbonyl group (including, preferably, 7-20 carbon atoms, more preferably 7-16 carbon atoms, and particularly preferably 7-10 carbon atoms, such as a phenyloxycarbonyl group), an acyloxy group (including, preferably, 2-20 carbon atoms, more preferably 2-16 carbon atoms, particularly preferably 2-10 carbon atoms, such as an acetoxy group and a benzoyloxy group), an acylamino group (including, preferably, 2-20 carbon atoms, more preferably 2-16 carbon atoms, particularly preferably 2-10 carbon atoms, such as an acetylamino group and a benzoylamino group), an alkoxycarbonylamino group (including, preferably, 2-20 carbon atoms, more preferably 2-16 carbon atoms, particularly preferably 2-12 carbon atoms, such as a methoxycarbonylamino group), an aryloxycarbonylamino group (including, preferably, 7-20 carbon atoms, more preferably 7-16 carbon atoms, particularly preferably 7-12 carbon atoms, such as a phenyloxycarbonylamino group), a sulfonylamino group (including, preferably, 1-20 carbon atoms, more preferably 1-16 carbon atoms, particularly preferably 1-12 carbon atoms, such as a methanesulfonylamino group and a benzenesulfonylamino group), a sulfamoyl group (including, preferably, 0-20 carbon atoms, more preferably 0-16 carbon atoms, particularly preferably 0-12 carbon atoms, such as a sulfamoyl group, a methylsulfamoyl group, a dimethylsulfamoyl group and a phenylsulfamoyl group), a carbamoyl group (including, preferably, 1-20 carbon atoms, more preferably 1-16 carbon atoms, particularly preferably 1-12 carbon atoms, such as a carbamoyl group, a methylcarbamoyl group, a diethylcarbamoyl group and a phenylcarbamoyl group), an alkylthio group (including, preferably, 1-20 carbon atoms, more preferably 1-16 carbon atoms, particularly preferably 1-12 carbon atoms, such as a methylthio group and an ethylthio group), an arylthio group (including, preferably, 6-20 carbon atoms, more preferably 6-16 carbon atoms, particularly preferably 6-12 carbon atoms, such as a phenylthio group), a sulfonyl group (including, preferably, 1-20 carbon atoms, more preferably 1-16 carbon atoms, particularly preferably 1-12 carbon atoms, such as a mesyl group and a tosyl group), a sulfinyl group (including, preferably, 1-20 carbon atoms, more preferably 1-16 carbon atoms, particularly preferably 1-12 carbon atoms, such as a methanesulfinyl group and a benzenesulfinyl group), an ureide group (including, preferably, 1-20 carbon atoms, more preferably 1-16 carbon atoms, and particularly preferably 1-12 carbon atoms, such as an ureide group, a methylureide group and a phenylureide group), a phosphoric amide group (including, preferably, 1-20 carbon atoms, more preferably 1-16 carbon atoms, particularly preferably 1-12 carbon atoms, such as a diethylphosphoric amide group and a phenylphosphoric amide group), a hydroxyl group, a mercapto group, a halogen atom (such as a fluorine atom, a chlorine atom, a bromine atom, an iodine atom and etc.), a cyano group, a sulfo group, a carboxyl group, a nitro group, a hydroxamic acid group, a sulfino group, a hydrazino group, an imino group, a heteroring group (including, preferably, 1-30 carbon atoms, more preferably 1-12 carbon atoms, wherein examples of the hetero atom include a nitrogen atom, an oxygen atom and a sulfur atom, and specific examples include an imidazolyl group, a pyridyl group, a quinolyl group, a furyl group, a piperidyl group, a morphorino group, a benzoxysazolyl group, a benzimidazolyl group and a benzothiazolyl group), and a silyl group (including, preferably, 3-40 carbon atoms, more preferably 3-30 carbon atoms, particularly preferably 3-24 carbon atoms, such as a trimethylsilyl group and a triphenylsilyl group). These substituents may further have a substituent. When there are two substituents or more, they may be same with or different from each other. Further, when possible, they may be linked with each other to form a ring.

Preferable examples of the compound represented by the formula (8) are shown below, however compounds usable in the invention are not restricted to these specific examples.

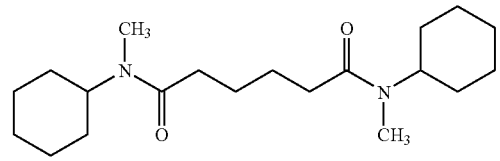

(EA-1)

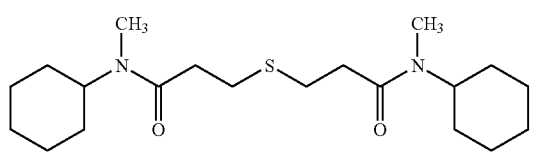
(EA-2)
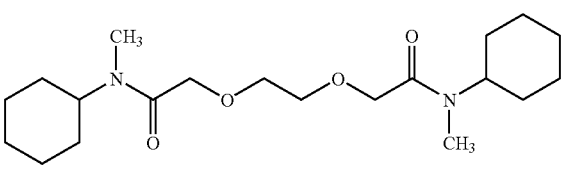
(EA-9)
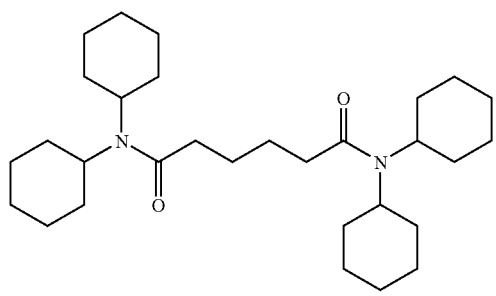
(EA-3)
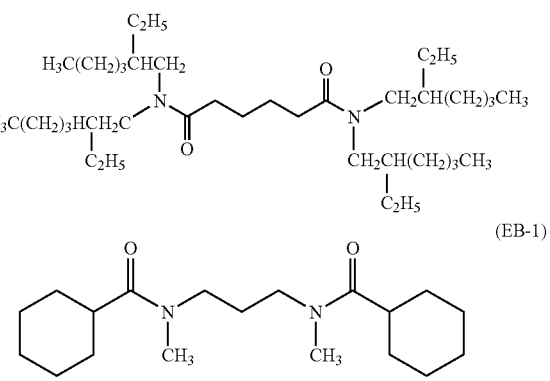
(EA-10)
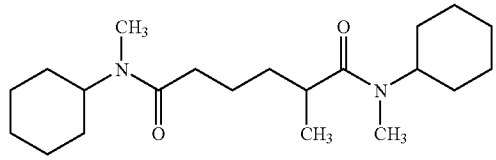
(EA-4)
(EB-1)
(EB-2)
(EA-5)
(EB-3)
(EA-6)
(EB-4)
(EA-7)
(EB-5)
(EC-1)
(EA-8)
(EC-2)

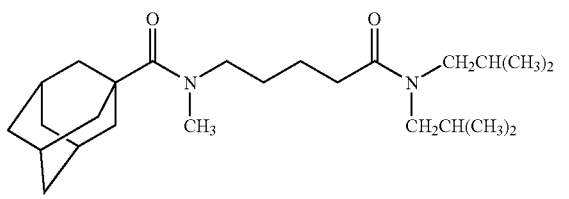

(EC-3)

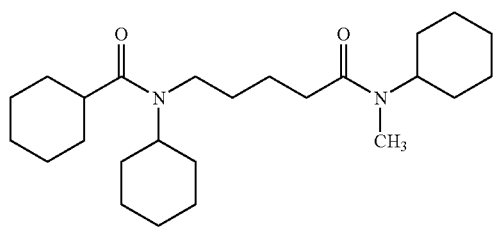

(EC-4)

The compounds of formula (6), formula (7) and formula (8) may be obtained through dehydrating condensation of carboxylic acids and amines or substitution reaction between carboxylic acid chloride derivatives and amine derivatives, using a condensing agent (e.g., dicyclohexylcarbodiimide (DCC) or the like).

In the invention, the film may contain the Rth regulator in an amount of from 5 to 25% by weight of the cellulose resin, preferably from 10 to 20% by mass. Containing the Rth regulator, the film may be stretched to have a further higher Re, a lower Rth and a lower Nz factor (Nz=Rth/Re+0.5). When the amount thereof to be added is at most 25% by mass, the additive may exhibit improved miscibility with the cellulose resin and may prevent the film from whitening. In case where two or more different types of Rth regulators are used as combined, preferably, the total amount thereof falls within the above range. Not overstepping the scope and the sprit of the invention, any other known ones than those of the above-mentioned formulae (4) to (8-4) are also usable as the Rth regulator in the invention. For example, ester plasticizers are usable, and preferred are compounds which are more hydrophobic than a cellulose acylate. Examples include phosphate esters such as triphenylphosphate (TPP), tricresylphosphate, cresyldiphenylphosphate, octyldiphenylphosphate, diphenylbiphenylphosphate, trioctylphosphate, tributylphosphate and butylphenyl diphenylphosphate (BDP); phthalate esters such as diethylphthalate, dimethoxyethylphthalate, dimethylphthalate, dioctylphthalate, dibutylphthalate and di-2-ethylhexylphthalate; glycolic acid esters such as triacetin, tributyrin, butylphthalyl butylglycolate, ethylphthalyl ethylglycolate, methylphthalyl ethylglycolate and butylphthalyl butylglycolate, which are preferably used solely or in combination. In these, at least one kind of the known placticizer selected from phosphate esters, phthalate esters and glycolic acid esters is preferable, and one containing phosphate esters is more preferable. Plasticizers may be used solely or in combination with two or more types of these, whenever necessary.

(Aliphatic Polyalcohol Ester)

The film of the invention preferably contains an aliphatic polyalcohol ester as a plasticizer produced from a aliphatic polyalcohol and one or more kind of monocarboxylic acid from the view point of high stability of optical property and dimension etc.

The aliphatic polyalcohol ester is described in detail hereinunder.

The aliphatic polyalcohol ester for use in the invention is produced from a di- or more valent-aliphatic polyalcohol and one or more kind of monocarboxylic acid.

The aliphatic polyalcohol for use in the invention is an di- or more valent-aliphatic polyalcohol, and preferably represented by the below formula (3):

$$R^{91}-(OH)m \qquad (3)$$

wherein $R^{91}$ represents the n-valent aliphatic organic group, n represents 2 or more positive integers, OH group represents alcoholic or phenolic hydroxyl, m preferably represents 2-20.

In the n-valent aliphatic organic group in the formula (3), examples of the divalent group include an alkylene group (for example, a methylene group, an ethylene group, a trimethylene group, a tetramethylene group, a propylene group, an ethylethylene group, a pentamethylene group, a hexamethylene group, etc.), an alkenylene group (for example, a vinylene group, a propenylene group, a ethenylene group, etc.), an alkynylene group (for example, a ethynylene group, 3-pentynylene group, etc.), a cycloalkylene group (for example, 1,4-cyclohexanediyl group, etc.), etc.

In the n-valent aliphatic organic group in the formula (3), examples of the trivalent group include, for example, an ethantriyl group, a propantriyl group, a butantriyl group, a pentantriyl group, a hexantriyl group, a heptantriyl group, an octantriyl group, a nonantriyl group, a decantriyl group, a undecantriyl group, a dodecantriyl group, a cyclohexantriyl group, a cyclopentantriyl group, a benzentriyl group and a naphthalentriyl group, and 1,2,3-propantriyl group, etc.

In the n-valent aliphatic organic group of the formula (3), examples of the tetravalent group include, for example, a propandiylidene group, a 1,3-propandiyl-2-ylidene group, a butandiylidene group, a pentandiylidene group, a hexandiylidene group, a heptandiylidene group, an octandiylidene group, a nonandiylidene group, a decandiylidene group, an undecandiylidene group, a dodecandiylidene group, a cyclohexandiylidene group, a cyclopentandiylidene group, a benzentetrayl group and a naphthalentetrayl group, etc.

Moreover, the above-mentioned n-valent aliphatic organic group may have a further substituent, and as a substituent, for example, an alkyl group (for example, a methyl group, an ethyl group, a butyl group, a pentyl group a 2-methoxy ethyl group, a trifluoromethyl group, 2-ethylhexyl group, etc.), an aryl group (for example, a phenyl group, a naphthyl group, etc.), an alkoxyl group (For example, a methoxy group, an ethoxy group, a buthoxy group, etc.), an alkoxycarbonyl group (For example, a methoxycarbonyl group, an i-propoxycarbonyl group etc.), an acyloxy group (for example, an acetyloxy group, an ethylcarbonyloxy group, etc.), a carbamoyl group (for example, a methylcarbamoyl group, an ethylcarbamoyl group, a buthylcarbamoyl group, a phenylcarbamoyl group, etc.), a sulfamoyl group (for example, a sulfamoyl group, a methylsulfamoyl group, and a dimethylsulfamoyl group, a phenylsulfamoyl group, etc.), an alkylthio group (for example, a methylthio group, an ethylthio group, an octylthio group, etc.), an arylthio group (for example, a phenylthio group, p-trylthio group, etc.), an amino groups (for example, an amino group, a methylamino group, a diethylamino group, a methoxyethylamino group, etc.), an acylamino group (for example, an acetylamino group, a chroloacetylamino group, a propionylamino group, a benzoylamino group, a trifluoroacetylamino group, etc.), an alkylureid group (for example, a methylureid group, an ethylureid group, a methoxyethylureid group, a dimethylureid group, etc.), an arylureid group (for example, a phenylureid group etc.), an alkylsulfonamide group (for example, a methanesulfonamide group, an ethanesulfonamide group, a butanesulfonamide group, a trifluoromethylsulfonamide group, 2,2,2-trifluoroethylsulfonamide group, etc.,), an arylsulfonamide group (for example, a phenylsulfonamide group, a tolylsulfonamide group, etc.), an alkylaminosulfonylamino group (for example, a methylaminosulfonylamino group, an ethylaminosulfonylamino group, etc.), an arylaminosulfonylamino group, (For example, a phenylaminosulfonylamino group, etc.), a hydroxyl group, a cyano group, a nitro group and a heterocyclic group (for example, a pyridyl group, a pyrimidyl group, a pyradyl group, a pyrrolyl group, an indolyl group, a pyrazolyl group, an imidazolyl group, a furyl group, an oxazolyl group, a thiazolyl group, a quinolyl group, a thienyl group, etc.).

As a preferable example of the aliphatic polyalcohol includes, for example, adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, a dibuthylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, etc. are used.

In these, triethylene glycol, tetraethylene glycol, dipropylene glycol, tripropylene glycol, sorbitol, trimethylolpropane, and xylitol are used particularly preferably.

As the monocarmoxylic acid for use for producing the aliphatic polyalcohol ester in the invention, well-known aliphatic monocarboxylic acid, alicyclic monocarboxylic acid and aromatic monocarboxylic acid, etc. can be used with no limitation, alicyclic monocarboxylic acid and aromatic monocarboxylic acid is preferably used from the view point of the improvement in permeability of a cellulose ester film and the sustainability thereof.

As the aliphatic monocarboxylic acid, a straight chain or branched chain aliphatic acid having 1-32 carbon atoms can be used preferably. Number of the carbon atoms thereof is further preferably 1-20, particularly preferably 1-10. Acetic acid is preferably included since compatibility with cellulose ester increases where acetic acid is contained, and it is also preferable to mix and use acetic acid and other monocarboxylic acid.

Preferable examples of the monocarboxylic acid are shown below, however the present invention is not restricted to these examples.

Preferable examples of the compound represented by the formula (8) are shown below, however compounds usable in the invention are not limited to these examples.

As the preferable aliphatic monocarboxylic acid, a saturated aliphatic acid such as acetic acid, propionic acid, butyric acid, valeric acid, caproic acid, enanthic acid, caprylic acid, pelargonic acid, capric acid, 2-ethylhexane carboxylic acid, undecylic acid, lauric acid, tridecyl acid, myristic acid, pentadecylic acid, pulmitic acid, heptadecyl acid, stearic acid, nonadecanoic acid, arachic acid, behenic acid, lignoceric acid, cerinic acid, heptacosanoic acid, montanic acid, melissic acid, lacceric acid, etc.; an unsaturated aliphatic acid such as undecylenic acid, oleic acid, sorbic acid, linoleic acid, linolenic acid, and arachidonic acid, etc. are used. These may have a further substituent.

As an example of the preferable alicyclic monocarboxylic acid, cyclopentanecarboxylic acid, cyclohexanecarboxylic acid, cyclooctanecarboxylic acid, or those derivatives are used.

As an example of the preferable aromatic monocarboxylic acid, one substituted an alkyl group into the benzene ring of benzoic acid such as benzoic acid, toluic acid, etc.; an aromatic monocarboxylic acid which has two or more benzene rings such as biphenylcarboxylic acid, naphthalene carboxylic acid, and tetralin carboxylic acid, or those derivatives can be used. particularly benzoic acid is preferable. In addition, the aromatic ring of the aromatic monocarboxylic acid may have a substituent.

Molecular Weight of Aliphatic Polyalcohol Ester:

Not specifically defined, the molecular weight of the polyalcohol ester for use in the invention is preferably from 300 to 1500, more preferably from 350 to 750. From the viewpoint of the sustainability thereof, the ester preferably has a larger molecular weight; but from the viewpoint of the moisture permeability and the compatibility with cellulose, the molecular weight of the ester is preferably smaller.

The molecular weight of the aliphatic polyalcohol ester may be measured, using a commercially-available GPC (gel permeation chromatography) device.

One or more different types of carboxylic acids may constitute the aliphatic polyalcohol ester for use in the invention. The OH groups in the aliphatic polyalcohol may be all esterified, or a part of the OH groups may remain as they are not esterified. Preferably, the ester has at least 3 aromatic rings or cycloalkyl rings in the molecule.

As an example of the aromatic ring, aromatic hydrocarbon ring (for example, a benzene ring, a naphthalene ring, a biphenyl ring, a p-terphenyl ring, a diphenylmethane ring, a triphenylmethane ring, a bibenzyl ring, a stilbene ring, an indene ring, a tetralin ring, an anthracene ring, a phenanthrene ring, etc.); and aromatic hetero ring, for example, a furan ring, a pyrrole ring, a pyrazole ring, an imidazole ring, an oxazole ring, a thiazol ring, a 1,2,3-oxadiazole ring, a 1,2,3-triazole ring, a 1,2,4-triazole ring, a 1,3,4-thiaziazole ring, a pyridine ring, a pyridazine ring, a pyrimidine ring, a pyrazine ring, s-triazine ring, a benzofuran ring, an indole ring, a benzothiophene ring, a benzimidazole ring, a benzothiazole ring, a purine ring, a quinoline ring, an isoquinoline ring, etc. are used.

As an example of the cycloalkyl ring, for example, a cyclopentane ring, a cyclohexane ring, a cyclooctane ring, etc. are used.

The aliphatic polyalcohol ester for use in the invention is described in detail hereinunder, however this invention is not limited by these examples.

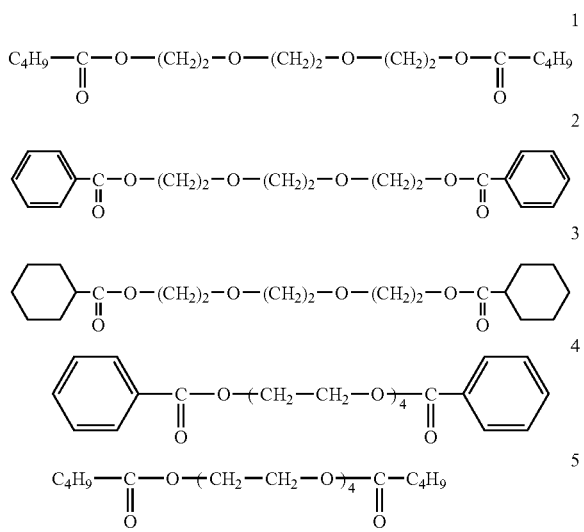

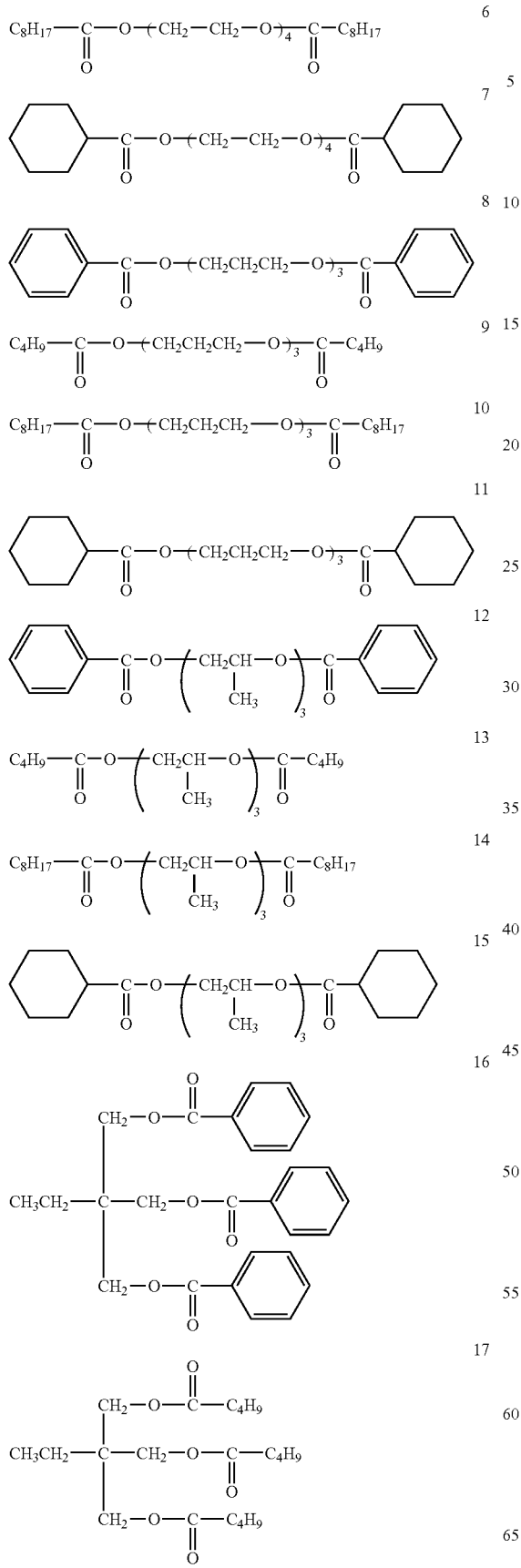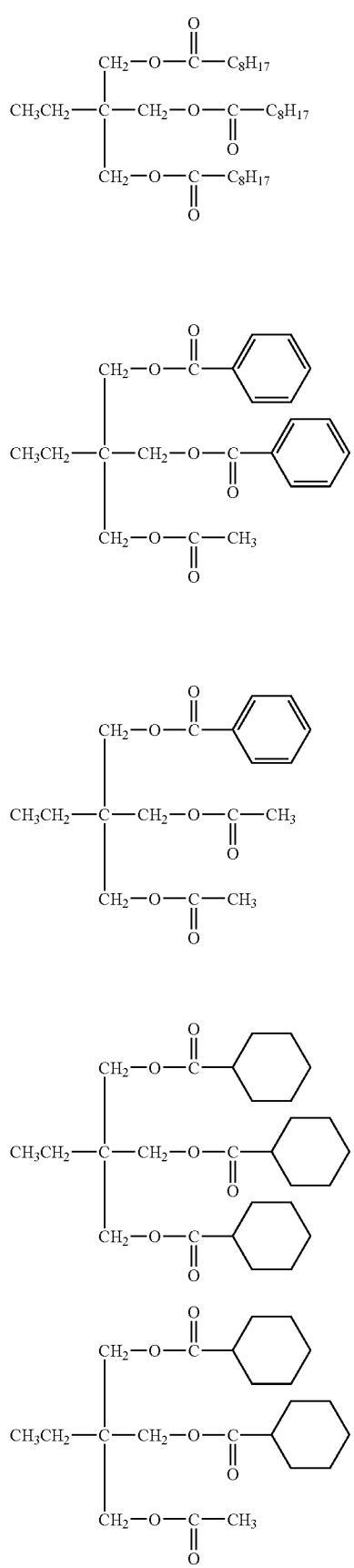

23
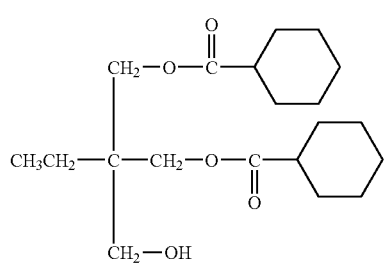
24
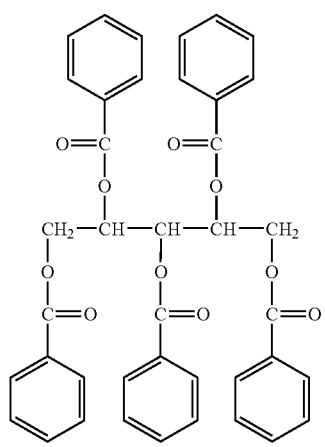
25
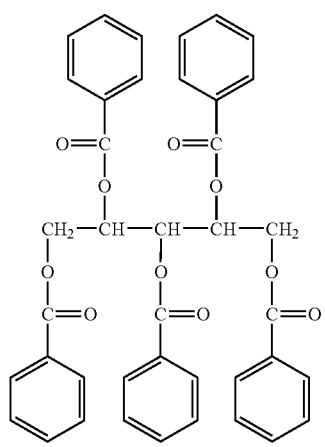
26
27
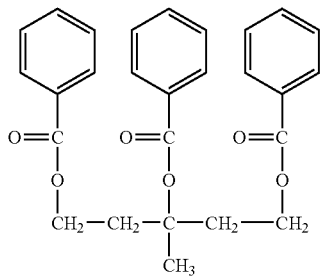
28
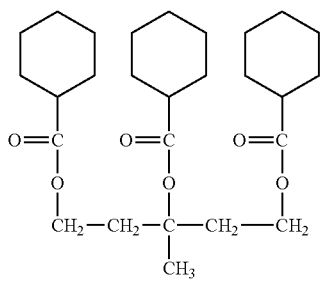
29
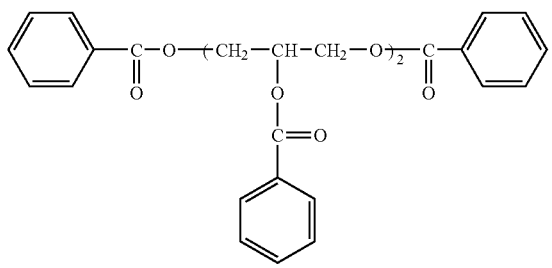
30
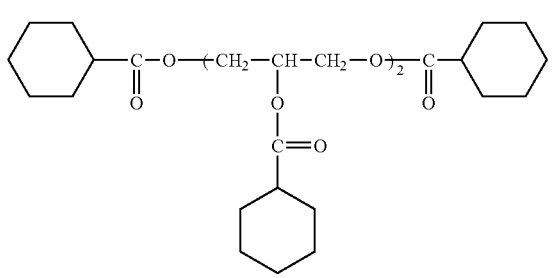
31
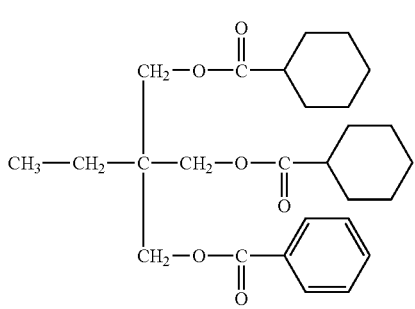

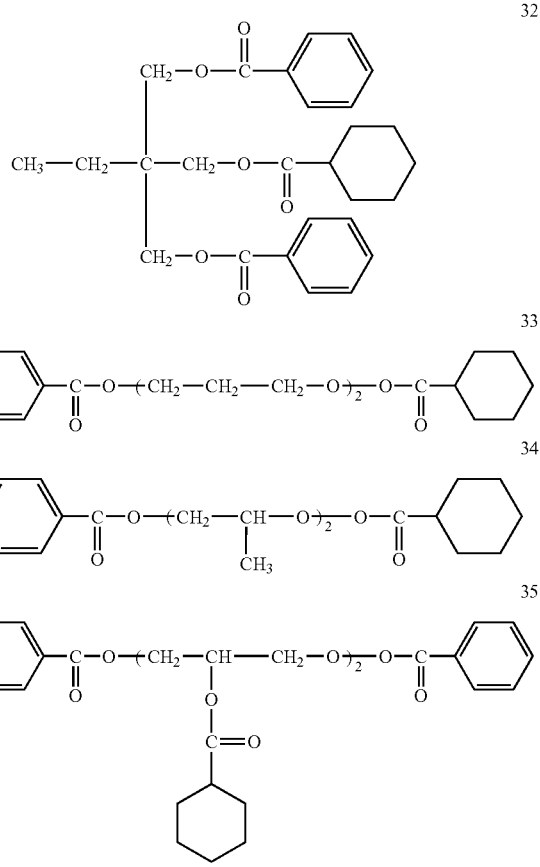

The aliphatic polyalcohol ester is preferably used or added in an amount of 3-30% by weight, further preferably 5-25% by weight, particularly preferably 5-20% by weight with respect to the weight of the film.

(Re Enhancer)

The film of the invention may contain a retardation enhancer. The retardation enhancer may be in the film, for example, in an amount of from 0.5 to 10% by weight, more preferably from 2 to 6% by weight. Containing a retardation enhancer, the film may exhibit a high Re when stretched in a high draw ratio. The type of the retardation enhancer is not specifically defined, including, for example, rod-shaped or discotic compounds. As the above-described rod-shaped or discotic compound, compound having at least two aromatic rings can be preferably used for the retardation enhancer.

The addition amount of a Re enhancer composed of a rod-shaped compound is preferably 0.5-10 parts by mass, more preferably 2-6 parts by mass relative to 100 parts by mass of a polymer component containing cellulose acylate.

The range of amount of a discotic retardation enhancer is preferably 0.5-10 parts by mass, more preferably 1-8 parts by mass, further preferably 2-6 parts by mass relative to 100 parts by mass of the polymer component containing cellulose acylate.

Two or more kinds of retardation enhancers may be used simultaneously.

The aforementioned retardation enhancer preferably has the maximum absorption in the wave length range of 250-400 nm, and preferably has no substantial absorption in the visible light region.

Description will be given about the discotic compound. As the discotic compound, a compound having at least two aromatic rings can be employed.

In the specification, an "aromatic ring" includes an aromatic heteroring, in addition to an aromatic hydrocarbon ring.

The aromatic hydrocarbon ring is particularly preferably a 6-membered ring (that is, benzene ring). Generally, the aromatic heteroring is an unsaturated heteroring. The aromatic heteroring is preferably a 5-membered ring, 6-membered ring or a 7-membered ring, more preferably a 5-membered ring or a 6-membered ring. Generally, the aromatic heteroring has the largest number of double bonds. As hetero atoms, a nitrogen atom, an oxygen atom and a sulfur atom are preferred, and a nitrogen atom is particularly preferred. Examples of the aromatic heteroring include a furan ring, a thiophene ring, a pyrrole ring, an oxazole ring, an iso-oxazole ring, a thiazole ring, an iso-thiazole ring, an imidazole ring, a pyrazole ring, a furazane ring, a triazole ring, a pyran ring, a pyridine ring, a pyridazine ring, a pyrimidine ring, a pyrazine ring and a 1,3,5-triazine ring.

As the aromatic ring, a benzene ring, a condensed benzene ring, biphenol and a 1,3,5-triazine ring are used preferably, and, in particular, a 1,3,5-triazine ring is preferably used. Specifically, compounds, for example, disclosed in JP-A-2001-166144 are used preferably as a discotic compound.

Number of aromatic rings included in the retardation enhancer is preferably 2-20, more preferably 2-12, furthermore preferably 2-8, most preferably 2-6.

Bond relation of two aromatic rings can be classified into following cases (since an aromatic ring, a spiro bond can not be formed): (a) formation of a condensed ring, (b) formation of a direct bond by a single bond, and (c) formation of a bond via a linking group. The bond relation may be any one of (a)-(c).

Examples of the (a) condensed ring (a condensed ring of two or more of aromatic rings) include an indene ring, a naphthalene ring, an azulene ring, a fluorene ring, a phenanthrene ring, an anthracene ring, an acenaphthylene ring, an biphenylene ring, a naphthacene ring, a pyrene ring, an indole ring, an iso-indole ring, a benzofuran ring, a benzothiophene ring, an indolizine ring, a benzoxazole ring, a benzothiazole ring, a benzoimidazole ring, a benzotriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxthine ring, a phenoxazine ring and a thianthrene ring. A naphthalene ring, an azulene ring, an indole ring, a benzoxazole ring, a benzothiazole ring, a benzoimidazole ring, benzotriazole ring and a quinoline ring are preferred.

The single bond of (b) is preferably a carbon-carbon bond between two aromatic rings. Two aromatic rings may be bonded by two or more of single bonds to form an aliphatic ring or a non-aromatic heteroring between the two aromatic rings.

The linking group of (c) also bonds, preferably, to carbon atoms of the two aromatic rings. The linking group is preferably an alkylene group, an alkenylene group, an alkynylene group, —CO—, —O—, —NH—, —S— or combinations thereof. Examples of the linking group composed of the combination are shown below. In this connection, the relation of right and left in the following examples of linking group may be reversed.

c1: —CO—O—
c2: —CO—NH—
c3: -alkylene-O—
c4: —NH—CO—NH—
c5: —NH—CO—O—
c6: —O—CO—O— c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have a substituent.

Examples of the substituent include a halogen atom (F, Cl, Br, I), a hydroxyl group, a carboxyl group, a cyano group, an amino group, a nitro group, a sulfo group, a carbamoyl group, a sulfamoyl group, an ureide group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfoneamide group, an aliphatic-substituted amino group, an aliphatic-substituted carbamoyl group, an aliphatic-substituted sulfamoyl group, an aliphatic-substituted ureide group and a non-aromatic heterocyclic group.

Number of carbon atoms of the alkyl group is preferably 1-8. A chain alkyl group is preferred to a cyclic alkyl group, and a strait-chain alkyl group is particularly preferred. The alkyl group may further have a substituent (for example, a hydroxyl group, a carboxyl group, an alkoxy group, an alkyl-substituted amino group). Examples of the alkyl group (including the substituted alkyl group) include a methyl group, an ethyl group, a n-butyl group, a n-hexyl group, a 2-hydroxyethyl group, a 4-carboxybutyl group, a 2-methoxyethyl group and 2-diethylaminoethyl group.

Number of carbon atoms of the alkenyl group is preferably 2-8. A chain alkenyl group is preferred to a cyclic alkenyl group, and a straight-chain alkenyl group is particularly preferred. The alkenyl group may further have a substituent. Examples of the alkenyl group include a vinyl group, an aryl group and a 1-hexenyl group.

Number of carbon atoms of the alkynyl group is preferably 2-8. A chain alkynyl group is preferred to a cyclic alkynyl group, and a straight-chain alkynyl group is particularly preferred. The alkynyl group may further have a substituent. Examples of the alkynyl group include an ethynyl group, a 1-butynyl group and a 1-hexynyl group.

Number of carbon atoms of the aliphatic acyl group is preferably 1-10. Examples of the aliphatic acyl group include an acetyl group, a propanoyl group and a butanoyl group.

Number of carbon atoms of the aliphatic acyloxy group is preferably 1-10. Example of the aliphatic acyloxy group include an acetoxy group.

Number of carbon atoms of the alkoxy group is preferably 1-8. The alkoxy group may further have an substituent (for example, an alkoxy group). Examples of the alkoxy group (including a substituted alkoxy group) include a methoxy group, an ethoxy group, a butoxy group and a methoxyethoxy group.

Number of carbon atoms of the alkoxycarbonyl group is preferably 2-10. Examples of the alkoxycarbonyl group include a methoxycarbonyl group and an ethoxycarbonyl group.

Number of carbon atoms of the alkoxycarbonylamino group is preferably 2-10. Examples of the alkoxycarbonylamino group include a methoxycarbonylamino group and an ethoxycarbonylamino group.

Number of carbon atoms of the alkylthio group is preferably 1-12. Examples of the alkylthio group include a methylthio group, an ethylthio group and an octylthio group.

Number of carbon atoms of the alkylsulfonyl group is preferably 1-8. Examples of the alkylsulfonyl group include a methanesulfonyl group and an ethanesulfonyl group.

Number of carbon atoms of the aliphatic amide group is preferably 1-10. Example of the aliphatic amide group includes an acetamide group.

Number of carbon atoms of the aliphatic sulfonamido group is preferably 1-8. Examples of the aliphatic sulfonamido group include a methane sulfonamido group, a butane sulfonamido group and a n-octane sulfonamido group.

Number of carbon atoms of the aliphatic-substituted amino group is preferably 1-10. Examples of the aliphatic-substituted amino group include a dimethylamino group, a diethylamino group and a 2-carboxyethylamino group.

Number of carbon atoms of the aliphatic-substituted carbamoyl group is preferably 2-10. Examples of the aliphatic-substituted carbamoyl group include a methylcarbamoyl group and a diethylcarbamoyl group.

Number of carbon atoms of the aliphatic-substituted sulfamoyl group is preferably 1-8. Examples of the aliphatic-substituted sulfamoyl group include a methylsulfamoyl group and a diethylsulfamoyl group.

Number of carbon atoms of the aliphatic-substituted ureide group is preferably 2-10. Example of the aliphatic-substituted ureide group includes a methylureide group.

Examples of the non-aromatic heterocyclic group include a piperidino group and a morphorino group.

Molecular weight of the retardation enhancer composed of the discotic compound is preferably 300-800.

A compound represented by following formula (I) is preferably used for the discotic compound.

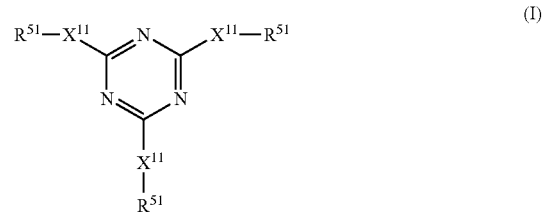

In the above formula (I):

$R^{51}$ each independently represents an aromatic ring or a hetero ring having a substituent at any of the ortho-, meta- and para-positions.

$X^{11}$ each independently represents a single bond or —$NR^{52}$—. $R^{52}$ each independently represents a hydrogen atom, or a substituted or unsubstituted alkyl, alkenyl, aryl or heterocyclic group.

The aromatic ring represented by $R^{51}$ is preferably a phenyl ring or a naphtyl ring, particularly preferably a phenyl ring. The aromatic ring represented by $R^{51}$ may have at least one substituent in any one of substitution positions. For the example of the above-mentioned substituent, a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl substituted sulfamoyl group, an alkenyl substituted sulfamoyl group, an aryl substituted sulfamoyl group, a sulfoneamide group, a carbamoyl group, an alkyl substituted carbamoyl group, an alkenyl substituted carbamoyl group, an aryl substituted carbamoyl group, an amide group, an alkylthio group, an alkenylthio group, an arylthio group and an acyl group are included.

The hetero ring for $R^{51}$ is preferably aromatic. The aromatic hetero ring is generally an unsaturated hetero ring, and is preferably a hetero ring having maximum double bonds. The hetero ring is preferably a 5-membered ring, a 6-membered ring or a 7-membered ring, more preferably a 5-membered ring or a 6-membered ring, most preferably a 5-membered ring. The hetero atom constituting the hetero ring is preferably a nitrogen atom, a sulfur atom or an oxygen atom, more preferably a nitrogen atom. The aromatic hetero ring is especially preferably a pyridine ring (as the heterocyclic group, a 2-pyridyl or 4-pyridyl group). The heterocyclic group may have a substituent. Examples of the substituent for the heterocyclic group may be the same as those mentioned hereinabove for the substituent of the aryl moiety.

The heterocyclic group in a case where $X^{11}$ is a single bond is preferably a heterocyclic group having a chemical bond at the nitrogen atom. The heterocyclic group having a chemical bond at the nitrogen atom is preferably a 5-membered ring, a 6-membered ring or a 7-membered ring, more preferably a 5-membered ring or a 6-membered ring, most preferably a 5-membered ring. The heterocyclic group may have plural nitrogen atoms. The heterocyclic group may have any other hetero atom (e.g., O, S) than the nitrogen atom. Examples of the heterocyclic group having a chemical bond at the nitrogen atom are shown below.

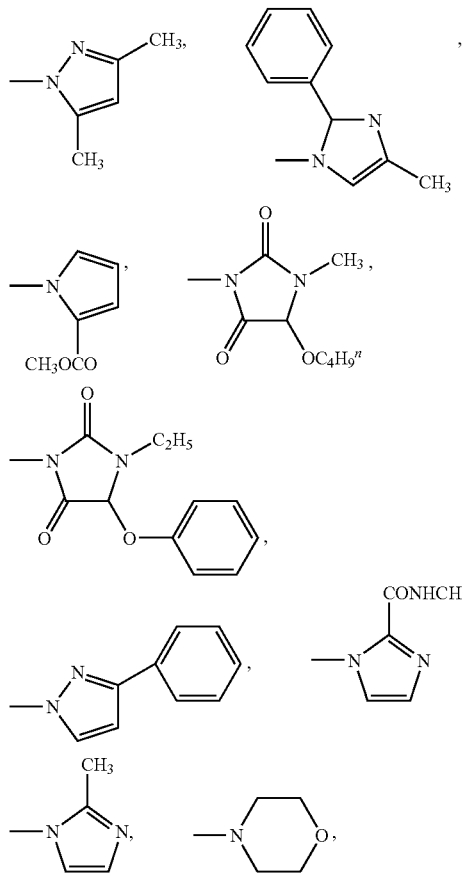

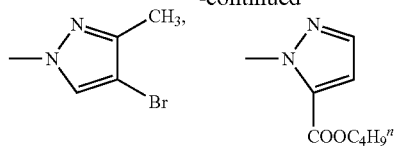

The alkyl group represented by $R^{52}$ may be an cyclo alkyl group or a chain alkyl group, preferably a chain alkyl group. A straight chain alkyl group is more preferred to a branched chain alkyl group. Number of the carbon atoms of the alkyl group is preferably 1-30, more preferably 1-20, further preferably 1-10, further more preferably 1-8, and most preferably 1-6. The alkyl group may have a substituent. An example of the substituent includes a halogen atom, an alkoxy group (for example, a methoxy group, a ethoxy group) and an acyloxy group (for example, a acryloxy group, a methacryloxy group).

The alkenyl group represented by $R^{52}$ may be an cyclo alkenyl group or a chain alkenyl group, preferably a chain alkenyl group. A straight chain alkenyl group is more preferred to a branched chain alkyl group. Number of the carbon atoms of the alkyl group is preferably 2-30, more preferably 2-20, further preferably 2-10, further more preferably 2-8, and most preferably 2-6. The alkenyl group may have a substituent. As the substituents, those for the above-mentioned alkyl group can be used.

The aromatic ring group and heterocyclic group represented by $R^{52}$ and their preferable groups are as described in $R^{51}$ above. The aromatic ring group and the heterocyclic group may have a substituent further, and examples of the substituent are the same as those for $R^{51}$.

As a discotic compound, the triphenylene compound represented by the following formula (II) can also be used preferably.

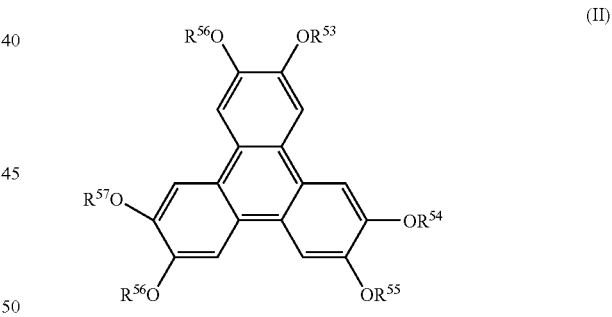

(II)

In the formula (II), $R^{53}$, $R^{54}$, $R^{55}$, $R^{56}$, $R^{57}$ and $R^{58}$ represent independently a hydrogen atom or a substituent.

Examples of each of the substituent represented by $R^{53}$, $R^{54}$, $R^{55}$, $R^{56}$, $R^{57}$ and $R^{58}$ include an alkyl group (including, preferably, 1-40 carbon atoms, more preferably 1-30 carbon atoms, particularly preferably 1-20 carbon atoms, such as a methyl group, an ethyl group, an isopropyl group, a tert-butyl group, a n-octyl group, a n-decyl group, a n-hexadecyl group, a cyclopropyl group, a cyclopentyl group and a cyclohexyl group), an alkenyl group (including, preferably, 2-40 carbon atoms, more preferably 2-30 carbon atoms, particularly preferably 2-20 carbon atoms, such as a vinyl group, an aryl group, a 2-butenyl group and a 3-pentenyl group), an alkynyl group (including, preferably, 2-40 carbon atoms, more preferably 2-30 carbon atoms, particularly preferably 2-20 carbon atoms, such as a propagyl group and a 3-pentynyl group), an aryl group (including, preferably, 6-30 carbon atoms, more preferably 6-20 carbon atoms, particularly preferably 6-12 carbon atoms, such as a phenyl group, a p-methylphenyl group and a naphthyl group), substituted or unsubstituted amino group (including, preferably, 0-40 carbon atoms, more preferably 0-30 carbon atoms, particularly preferably 0-20 carbon atoms, such as an unsubstituted amino group, a methyl amino group, a dimethylamino group, a diethylamino group and an anilino group),
an alkoxy group (including, preferably, 1-40 carbon atoms, more preferably 1-30 carbon atoms, particularly preferably 1-20 carbon atoms, such as a methoxy group, an ethoxy group and a butoxy group), an aryloxy group (including, preferably, 6-40 carbon atoms, more preferably 6-30 carbon atoms, particularly preferably 6-20 carbon atoms, such as a phenyloxy group and a 2-naphthyloxy group), an acyl group (including, preferably, 1-40 carbon atoms, more preferably 1-30 carbon atoms, particularly preferably 1-20 carbon atoms, such as an acetyl group, a benzoyl group, a formyl group and a pivaloyl group), an alkoxycarbonyl group (including, preferably, 2-40 carbon atoms, more preferably 2-30 carbon atoms, particularly preferably 2-20 carbon atoms, such as a methoxycarbonyl group and an ethoxycarbonyl group), an aryloxycarbonyl group (including, preferably, 7-40 carbon atoms, more preferably 7-30 carbon atoms, and particularly preferably 7-20 carbon atoms, such as a phenyloxycarbonyl group), an acyloxy group (including, preferably, 2-40 carbon atoms, more preferably 2-30 carbon atoms, particularly preferably 2-20 carbon atoms, such as an acetoxy group and a benzoyloxy group),
an acylamino group (including, preferably, 2-40 carbon atoms, more preferably 2-30 carbon atoms, particularly preferably 2-20 carbon atoms, such as an acetylamino group and a benzoylamino group), an alkoxycarbonylamino group (including, preferably, 2-40 carbon atoms, more preferably 2-30 carbon atoms, particularly preferably 2-20 carbon atoms, such as a methoxycarbonylamino group), an aryloxycarbonyl amino group (including, preferably, 7-40 carbon atoms, more preferably 7-30 carbon atoms, and particularly preferably 7-20 carbon atoms, such as a phenyloxycarbonylamino group), a sulfonylamino group (including, preferably, 1-40 carbon atoms, more preferably 1-30 carbon atoms, particularly preferably 1-20 carbon atoms, such as a methanesulfonylamino group and a benzenesulfonylamino group), a sulfamoyl group (including, preferably, 0-40 carbon atoms, more preferably 0-30 carbon atoms, particularly preferably 0-20 carbon atoms, such as a sulfamoyl group, a methylsulfamoyl group, a dimethylsulfamoyl group and a phenylsulfamoyl group), a carbamoyl group (including, preferably, 1-40 carbon atoms, more preferably 1-30 carbon atoms, particularly preferably 1-20 carbon atoms, such as a carbamoyl group, a methylcarbamoyl group, a diethylcarbamoyl group and a phenylcarbamoyl group),
an alkylthio group (including, preferably, 1-40 carbon atoms, more preferably 1-30 carbon atoms, particularly preferably 1-20 carbon atoms, such as a methylthio group, an ethylthio group, propylthio group, butylthio group, pentylthio group, hexylthio group, heptylthio group and octylthio group), an arylthio group (including, preferably, 6-40 carbon atoms, more preferably 6-30 carbon atoms, particularly preferably 6-20 carbon atoms, such as a phenylthio group), a sulfonyl group (including, preferably, 1-40 carbon atoms, more preferably 1-30 carbon atoms, particularly preferably 1-20 carbon atoms, such as a mesyl group and a tosyl group), a sulfinyl group (including, preferably, 1-40 carbon atoms, more preferably 1-30 carbon atoms, particularly preferably 1-20 carbon atoms, such as a methanesulfinyl group and a benzenesulfinyl group), an ureide group (including, preferably, 1-40 carbon atoms, more preferably 1-30 carbon atoms, particularly preferably 1-20 carbon atoms, such as an ureide group, a methylureide group and a phenylureide group), a phosphoric amide group (including, preferably, 1-40 carbon atoms, more preferably 1-30 carbon atoms, particularly preferably 1-20 carbon atoms, such as a diethylphosphoric amide group and a phenylphosphoric amide group), a hydroxyl group, a mercapto group, a halogen atom (such as a fluorine atom, a chlorine atom, a bromine atom, an iodine atom), a cyano group, a sulfo group, a carboxyl group, a nitro group, a hydroxamic acid group, a sulfino group, a hydrazino group, an imino group, a heteroring group (including, preferably, 1-30 carbon atoms, more preferably 1-12 carbon atoms, wherein examples of the hetero atom include a nitrogen atom, an oxygen atom and a sulfur atom, and specific examples include an imidazolyl group, a pyridyl group, a quinolyl group, a furyl group, a piperidyl group, a morphorino group, a benzoxysazolyl group, a benzimidazolyl group, a benzothiazolyl group and 1,3,5-triazyl group), and a silyl group (including, preferably, 3-40 carbon atoms, more preferably 3-30 carbon atoms, particularly preferably 3-24 carbon atoms, such as a trimethylsilyl group and a triphenylsilyl group). These substituents may further have a substituent. When there are two substituents or more, they may be same with or different from each other. Further, when possible, they may be linked with each other to form a ring.

As the substituent represented by $R^{53}$, $R^{54}$, $R^{55}$, $R^{56}$, $R^{57}$ and $R^{58}$ is preferably an alkyl group, an aryl group, a substituted or unsubstituted amino group, an alkoxy group, an alkylthio group or a halogen atoms.

Preferable examples of the compound represented by the formula (II) are shown below, however compounds usable in the invention are not restricted to these specific examples.

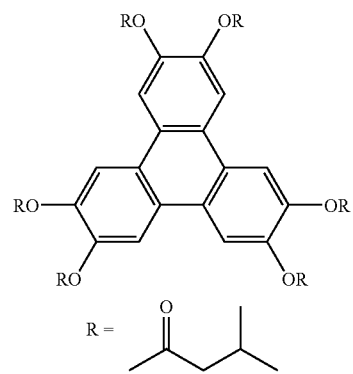

V-1

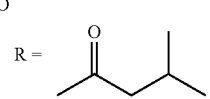

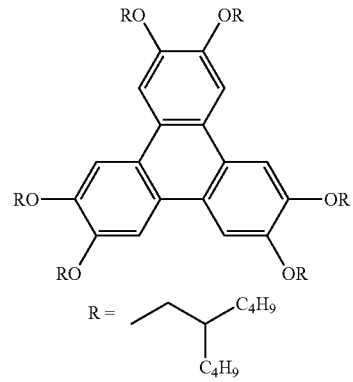

V-2

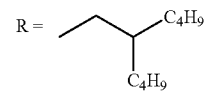

V-3
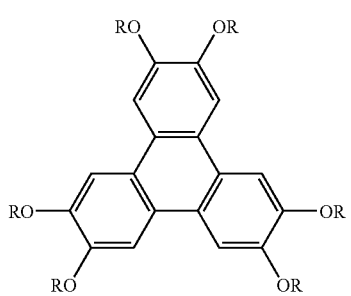
R = 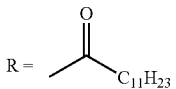
V-4
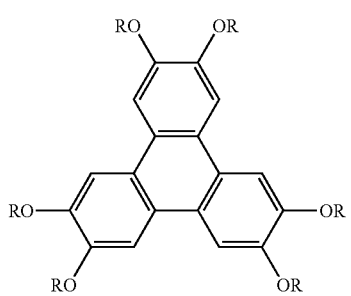
R = 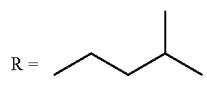
V-5
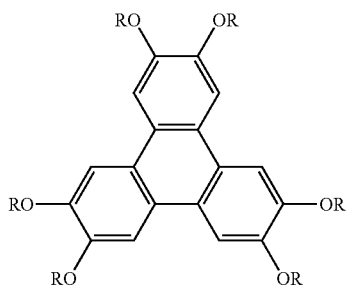
R = 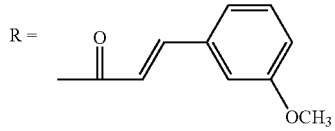
V-6
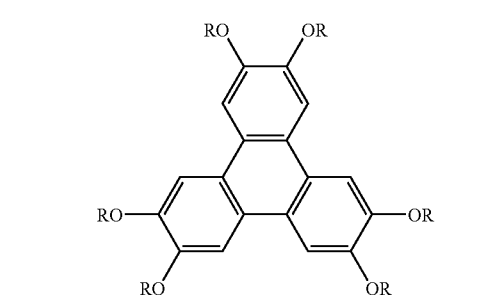
R = 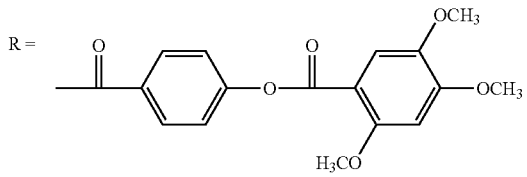
V-7
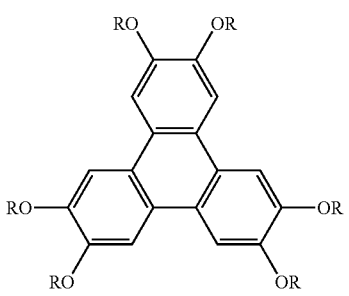
R = 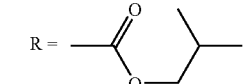
V-8
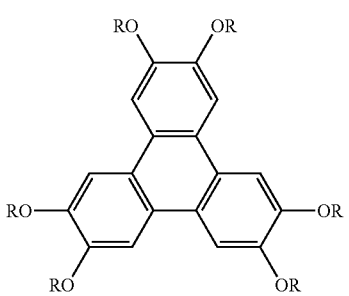
R = 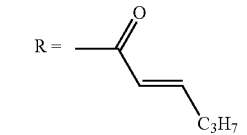
V-9
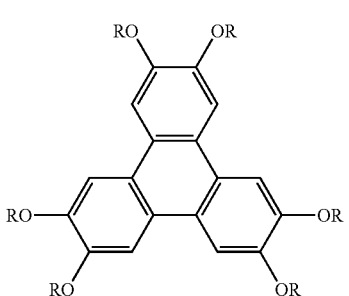
R = 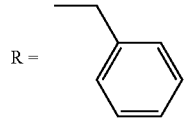
V-10
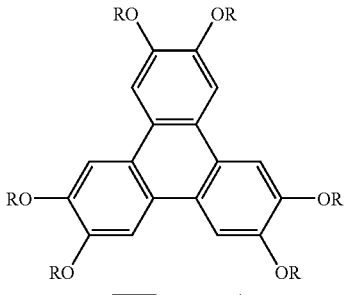
R = 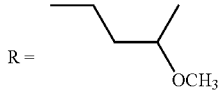
The compound represented by formula (I) can be produced by, for example, a method given in the JP-A 2003-344655 and the compound represented by formula (II) can be produced by, for example, a method given in JP-A 2005-134884. Both compounds may be produced by other well-known methods.

In the invention, rod-shaped compounds having a linear molecular structure are also usable preferably in addition to the discotic compound. "The linear molecular structure" means that molecular structure of a rod-shaped compound is linear in the thermodynamically stablest structure. The thermodynamically stablest structure can be obtained by crystal structure analysis or molecular orbital calculation. For example, molecular orbital calculation can be performed using a software for molecular orbital calculation (for example, WinMOPAC2000, manufactured by FUJITSU) to obtain the molecular structure for which heat of formation of the compound becomes least. "The linear molecular structure" means that the angle constituted by the primary chain of the molecular structure is 140 degrees or more in the thermodynamically stablest structure obtained according to the aforementioned calculation.

As the rod-shaped compound having at least two aromatic rings, compounds represented by formula (III) below are preferred.

$$Ar^1-L^1-Ar^2 \quad \text{Formula (III)}$$

wherein each of $Ar^1$ and $Ar^2$ represents an aromatic group independently from each other.

In the specification, the aromatic group includes an aryl group (aromatic hydrocarbon group), a substituted aryl group, an aromatic heteroring group and a substituted aromatic heteroring group.

An aryl group and a substituted aryl group are preferred to an aromatic heteroring group and a substituted aromatic heteroring group. A heteroring in the aromatic heteroring group is generally unsaturated. The aromatic heteroring is preferably a 5-membered ring, a 6-membered ring or a 7-membered ring, more preferably a 5-membered ring or a 6-membered ring. The aromatic heteroring generally has the largest number of double bonds. As for the hetero atom, a nitrogen atom, an oxygen atom or a sulfur atom is preferred, and a nitrogen atom or a sulfur atom is more preferred.

Preferable examples of the aromatic ring in the aromatic group include a benzene ring, a furan ring, a thiophene ring, a pyrrole ring, an oxazole ring, a thiazole ring, an imidazole ring, a triazole ring, a pyridine ring, a pyrimidine ring and a pyrazine ring. A benzene ring is particularly preferred.

Examples of the substituent of the substituted aryl group and substituted aromatic heteroring group include a halogen atom (F, Cl, Br, I), a hydroxyl group, a carboxyl group, a cyano group, an amino group, an alkylamino group (for example, a methylamino group, an ethylamino group, a butylamino group, a dimethylamino group), a nitro group, a sulfo group, a carbamoyl group, an alkylcarbamoyl group (for example, an N-methylcarbamoyl group, an N-ethylcarbamoyl group, an N,N-dimethylcarbamoyl group), a sulfamoyl group, an alkylsulfamoyl group (for example, an N-methylsulfamoyl group, an N-ethylsulfamoyl group, an N,N-dimethylsulfamoyl group), an ureido group, an alkylureide group (for example, an N-methylureide group, an N,N-dimethylureide group, an N,N,N'-trimethylureide group), an alkyl group (for example, a methyl group, an ethyl group, a propyl group, a butyl group, a pentyl group, a heptyl group, an octyl group, an isopropyl group, a s-butyl group, a tert-amyl group, a cyclohexyl group, a cyclopentyl group), an alkenyl group (for example, a vinyl group, an aryl group, a hexenyl group), an alkynyl group (for example, an ethynyl group, a butynyl group), an acyl group (for example, a formyl group, an acetyl group, a butyryl group, a hexanoyl group, a lauryl group), an acyloxy group (for example, an acetoxy group, a butylyloxy group, a hexanoyloxy group, a lauryloxy group), an alkoxy group (for example, a methoxy group, an ethoxy group, a propoxy group, a butoxy group, a pentyloxy group, a heptyloxy group, an octyloxy group), an aryloxy group (for example, a phenoxy group), an alkoxycarbonyl group (for example, a methoxycarbonyl group, an ethoxycarbonyl group, a propoxycarbonyl group, a butoxycarbonyl group, a pentyloxycarbonyl group, a heptyloxycarbonyl group), an aryloxycarbonyl group (for example, a phenoxycarbonyl group), an alkoxycarbonylamino group (for example, a butoxycarbonylamino group, a hexyloxycarbonylamino group), an alkylthio group (for example, a methylthio group, an ethylthio group, a propylthio group, a butylthio group, a pentylthio group, a heptylthio group, an octylthio group), an arylthio group (for example, phenylthio group), an alkylsulfonyl group (for example, a methylsulfonyl group, an ethylsulfonyl group, a propylsulfonyl group, a butylsulfonyl group, a pentylsulfonyl group, a heptylsulfonyl group, an octylsulfonyl group), an amide group (for example, an acetamide group, a butylamide group, a hexylamide group, a laurylamide group) and non-aromatic heterocyclic groups (for example, a morphoryl group, a pyrazinyl group).

Preferable examples of the substituent of the substituted aryl group and substituted aromatic heteroring group include a halogen atom, a cyano group, a carboxyl group, a hydroxyl group, an amino group, an alkyl-substituted amino group, an acyl group, an acyloxy group, an amide group, an alkoxycarbonyl group, an alkoxy group, an alkylthio group and an alkyl group.

An alkyl moiety in the alkylamino group, the alkoxycarbonyl group, the alkoxy group and the alkylthio group and the alkyl group may further have a substituent. Examples of the substituent in the alkyl moiety and the alkyl group include a halogen atom, a hydroxyl, carboxyl, cyano, amino and alkylamino groups, a nitro, sulfo, carbamoyl and alkylcarbamoyl groups, a sulfamoyl and alkylsulfamoyl groups, an ureide and alkylureide groups, an alkenyl group, an alkynyl group, an acyl group, an acyloxy group, an acylamino group, an alkoxy group, an aryloxy group, an alkoxycarbonyl group, an aryloxycarbonyl group, an alkoxycarbonylamino group, an alkylthio group, an arylthio group, an alkylsulfonyl group, an amide group and non-aromatic heterocyclic groups. As the substituent in the alkyl moiety and the alkyl group, a halogen atom, a hydroxyl, an amino and alkylamino groups, an acyl group, an acyloxy group, an acylamino group, an alkoxycarbonyl group and an alkoxy group are preferred.

In the formula (III), $L^1$ represents a divalent linking group selected from an alkylene group, an alkenylene group, an alkynylene group, —O—, —CO— and groups composed of combinations thereof.

The alkylene group may have a cyclic structure. As a cyclic alkylene group, cicrohexylene is preferred, and 1,4-cyclohexylene is particularly preferred. As a chain alkylene group, a straight-chain alkylene group is preferred to a branched alkylene group.

Number of carbon atoms of an alkylene group is preferably 1-20, more preferably 1-15, further preferably 1-10, furthermore preferably 1-8, most preferably 1-6.

The alkenylene group and the alkynylene group preferably have a chain structure compared with a cyclic structure, more preferably a straight chain structure compared with a branched chain structure.

Number of carbon atoms of the alkenylene group and the alkynylene group is preferably 2-10, more preferably 2-8, further preferably 2-6, furthermore preferably 2-4, most preferably 2 (that is, vinylene or ethynylene). Number of carbon atoms of the arylene group is preferably 6-20, more preferably 6-16, further preferably 6-12.

In the molecular structure of the formula (III), an angle formed by $Ar^1$ and $Ar^2$ across $L^1$ is preferably 140 degrees or more.

As the rod-shaped compound, compounds represented by formula (IV) below are more preferred.

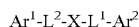

Formula (IV)

wherein each of $Ar^1$ and $Ar^2$ represents an aromatic group independently from each other. The definition and example for the aromatic group are the same as those for $Ar^1$ and $Ar^2$ of the formula (III).

In the formula (IV), each of $L^2$ and $L^3$ represents, independently from each other, a divalent linking group selected from an alkylene group, —O—, —CO— and groups composed of combinations thereof.

The alkylene group preferably has a chain structure compared with a cyclic structure, and more preferably has a straight chain structure compared with a branched chain structure.

Number of carbon atoms of the alkylene group is preferably 1-10, more preferably 1-8, further preferably 1-6, furthermore preferably 1-4, most preferably 1 or 2 (that is, methylene or ethylene).

Particularly preferably, $L^2$ and $L^3$ are —O—CO— or —CO—O—.

In the formula (IV), X is 1,4-cyclohexylene, vinylene or ethynylene.

As specific examples of the compounds of formula (III) or (IV), mentioned are the compounds of [Formula I] to [Formula II] in JP-A 2004-109657.

Two kinds or more of the rod-shaped compounds, which have a maximum absorption wavelength (λmax) of less than 250 nm in an ultraviolet spectrum of the solution, may be used simultaneously.

A rod-shaped compound can be synthesized according to methods described in references. As references, Mol. Cryst. Liq. Cryst., vol. 53, p 229 (1979); do. vol. 89, p 93 (1982); do. vol. 145, p 111 (1987); do. vol. 170, p 43 (1989); Journal of the American Chemical Society, vol. 113, p 1349 (1991); do. vol. 118, p 5346 (1996); do. vol. 92, p 1582 (1970); Journal of Organic Chemistry, vol. 40, p 420 (1975); and Tetrahedron, vol. 48, No. 16, p 3437 (1992) can be mentioned.

The rod-shaped aromatic compounds described in JP-A 2004-50516, pp. 11-14 may be used as the Re enhancer.

As the Re enhancer, one compound alone or two or more compounds as combined may be used. Using two or more different types of compounds as the Re enhancer is preferred, as the retardation regulation range may be broadened and the retardation may be regulated in a desired range with ease.

The amount of the Re enhancer to be added is preferably from 0.1 to 20% by mass to the cellulose acylate, more preferably from 0.5 to 10% by mass. In case where the cellulose acylate film is formed according to a solvent casting method, the Re enhancer may be added to the dope. Adding it may be effected in any timing, and for example, the Re enhancer is dissolved in an organic solvent such as alcohol, methylene chloride, dioxolane or the like, and the resulting solution may be added to the cellulose acylate solution (dope), or the Re enhancer may be directly added to the dope composition.

Especially preferably, the proportion of the discotic compound is from 10% to 90% relative to the total mass of the discotic compound and the rod-shaped compound, more preferably from 20% to 80%.

Preferred examples of other rod-shaped compounds than those shown in the above-mentioned patent publication are shown below.

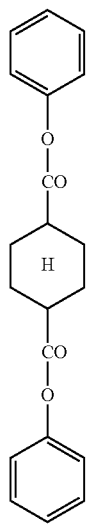

(1)

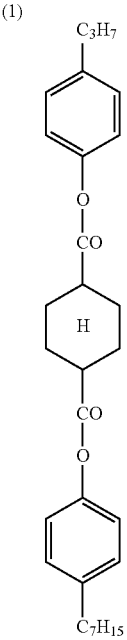

(2)

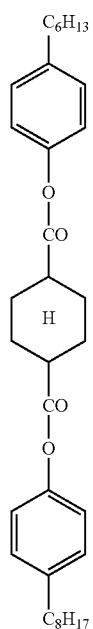 (3)
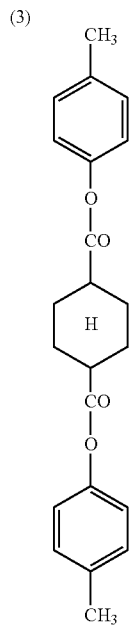 (4)
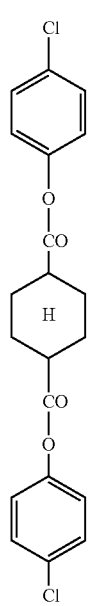 (5)
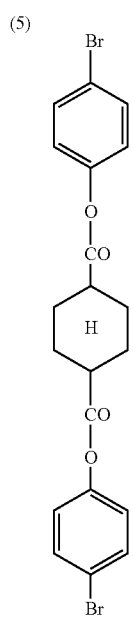 (6)

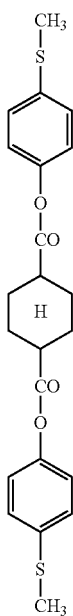 (7)
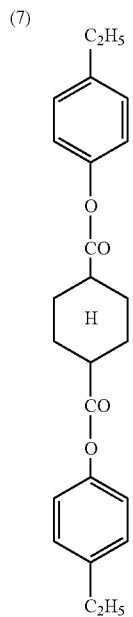 (8)
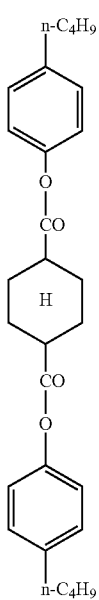 (9)
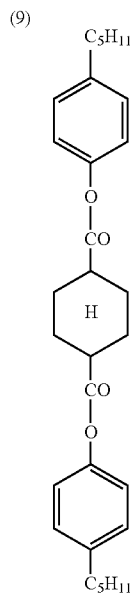 (10)

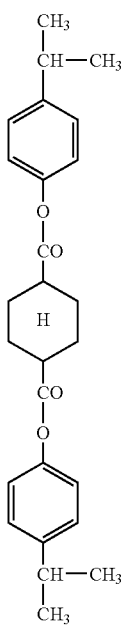
(11)
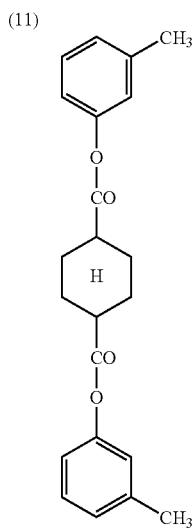
(12)
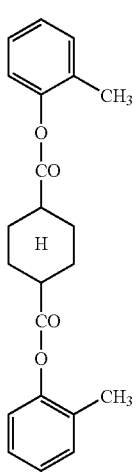
(13)
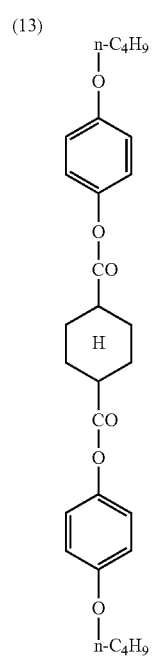
(14)

-continued
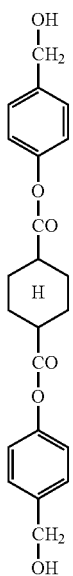 (15)
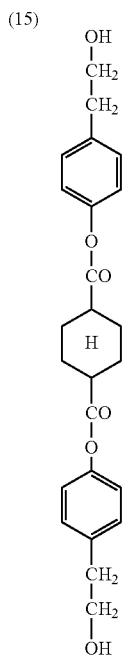 (16)
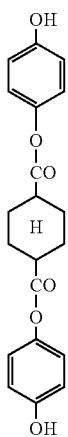 (17)
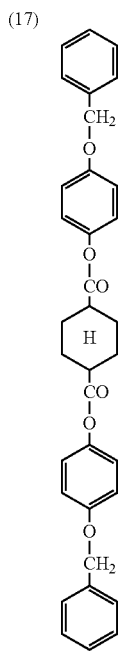 (18)
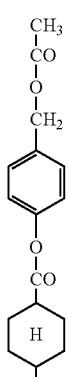 (19)
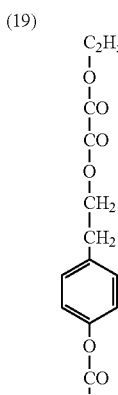 (20)

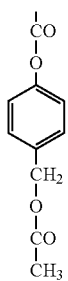
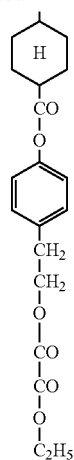
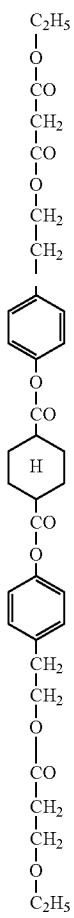
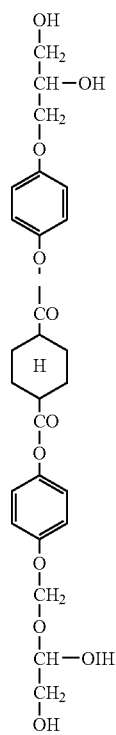

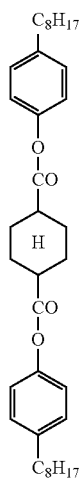
(23)
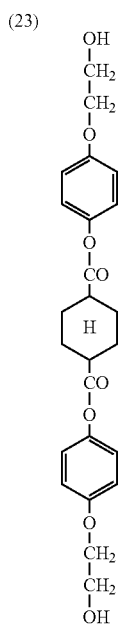
(24)
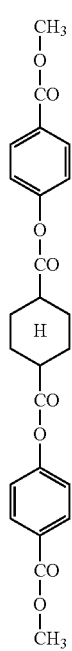
(25)
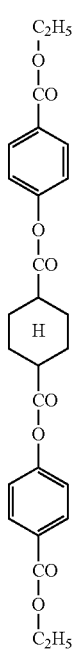
(26)

-continued
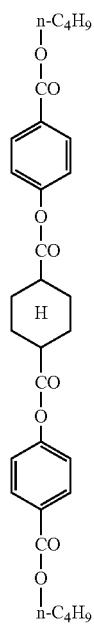
(27)
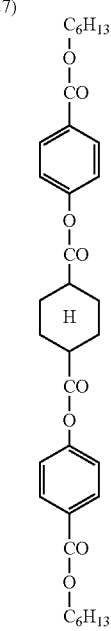
(28)
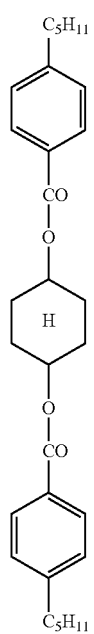
(29)
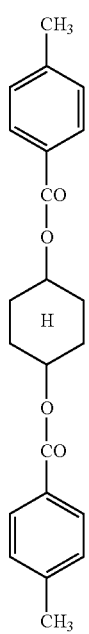
(30)

-continued
(31)
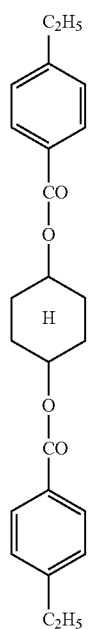
(32)
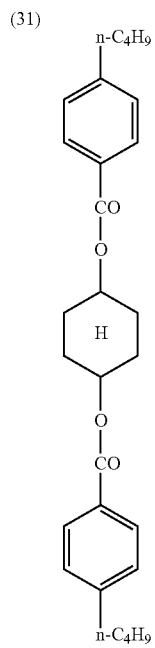
(33)
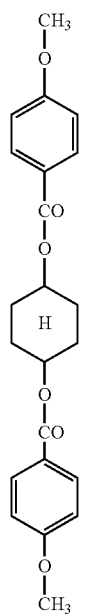
(34)
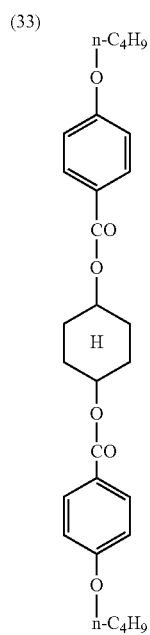

-continued
(35)
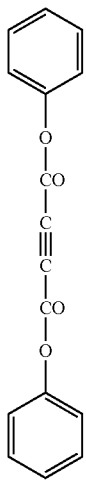
(36)
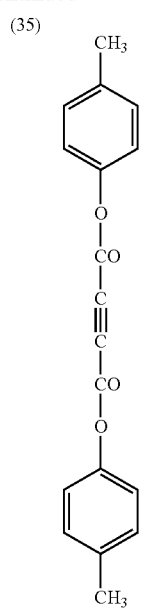
(37)
(38)
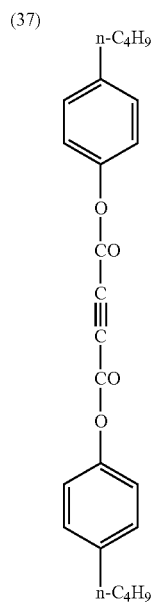

# (39)
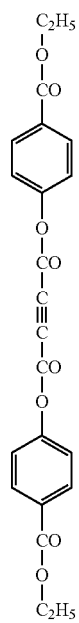# (40)
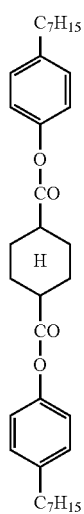# (41)
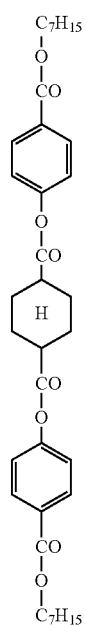# (42)

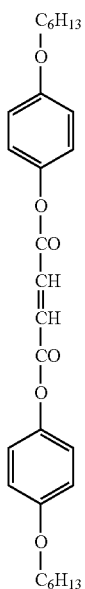 (43)
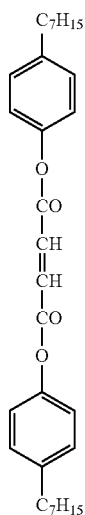 (44)
 (45)
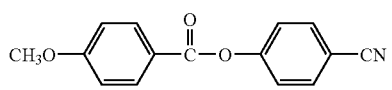 (46)
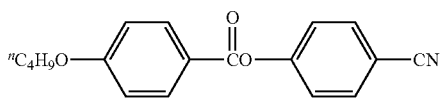 (47)
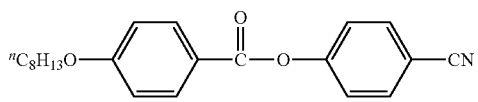 (48)
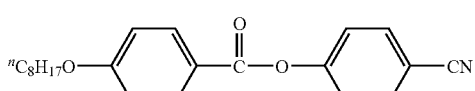 (49)
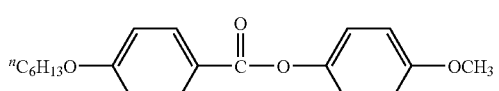 (50)
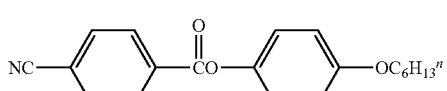 (51)
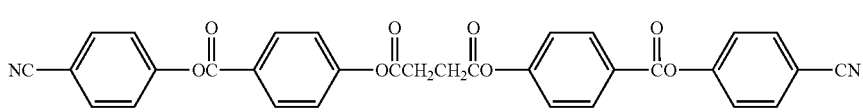 (52)

-continued
(53)
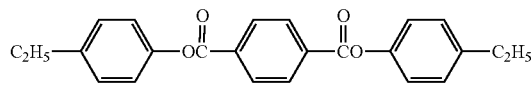
(54)
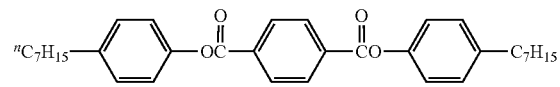
(55)
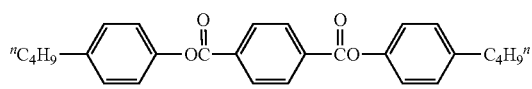
(56)
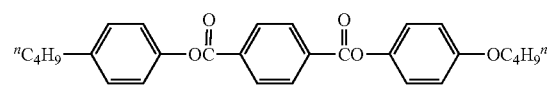
(57)
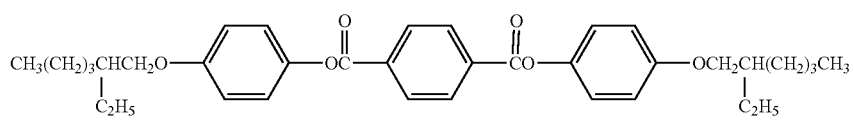
(58)
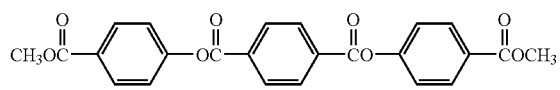
(59)
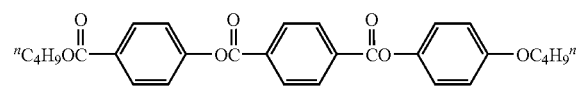
(60)
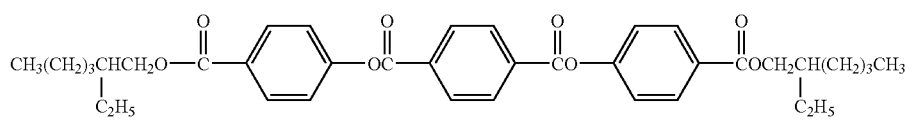
(61)
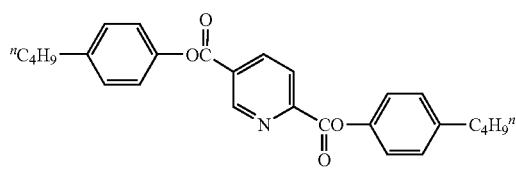
(62)
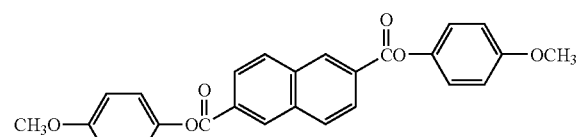
(63)
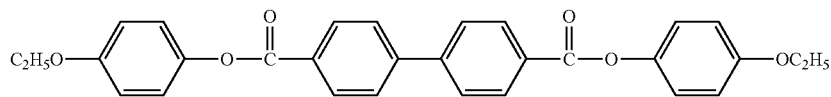

Specific examples (1)-(34), (41) and (42) have 2 asymmetric carbon atoms at 1- and 4-sites of the cyclohexane ring. However, since specific examples (1), (4)-(34), (41) and (42) have a symmetric molecular structure of meso form, there are no optical isomers (optical activity), and only geometric isomers (trans form and cis form) exist. The trans form (1-trans) and cis form (1-cis) of the specific example (1) are shown below.

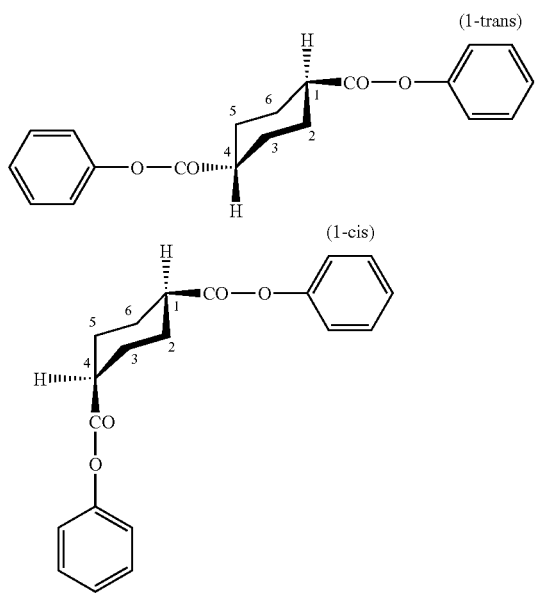

As described above, the rod-shaped compound preferably has a linear molecular structure. Therefore, a trans form is preferred to a cis form.

Specific examples (2) and (3) have optical isomers in addition to geometric isomers (4 kinds of isomers in total). As for the geometric isomers, similarly, the trans form is preferred to the cis form. There are no particular relative merits between the optical isomers, and any of D-, L- and racemic forms may be sufficient.

As for specific examples (43)-(45), there are the trans form and cis form due to the vinylene bond at the center. According to the same reason as described above, the trans form is preferred to the cis form.

(Release Promoter)

Preferably, a release promoter is added to the film of the invention. The release promoter may be added to the film, for example, in a proportion of from 0.001 to 1% by weight. As the release promoter, preferably used are the compounds described in JP-A 2006-45497, paragraphs [0048] to [0069].

(Matting Agent)

Addition of fine particles as a matting agent to the film of the invention is preferred. Examples of fine particles for use in the invention include silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate and calcium phosphate. Fine particles containing silicon are preferred because turbidity becomes low, and silicon dioxide is particularly preferred. Preferable fine particles of silicon dioxide have a primary average particle size of 20 nm or less, and an apparent specific gravity of 70 g/l or more. Those having the primary average particle size as small as 5-16 nm are more preferred because they can lower haze of the film. As for an apparent specific gravity, 90-200 g/l is preferred, and 100-200 g/l is more preferred. A greater apparent specific gravity makes it possible to manufacture a dispersion liquid having a high concentration to lead to better haze and aggregate, and thus is preferred.

These fine particles forms secondary particles usually having an average particle size of 0.1-3.0 μm and these fine particles exist as aggregates of the primary particles to form irregularity of 0.1-3.0 μm on the surface of the film. As for the secondary average particle size, 0.2 μm-1.5 μm is preferred, 0.4 μm-1.2 μm is more preferred, and 0.6 μm-1.1 μm is most preferred. The primary and secondary particle sizes are defined as the diameter of a circle circumscribing the particle, which is obtained by observing particles in the film under a scanning electron microscope. The average particle size is defined as an averaged value of the size of particles obtained by observing 200 particles at different positions.

As fine particles of silicon dioxide, marketed productions can be used, including, for example, AEROSIL R972, R972V, R974, R812, 200, 200V, 300, R202, OX50 and TT600 (all of them are manufactured by NIPPON AEROSIL CO., LTD.) etc. As fine particles of zirconium oxide, for example, those available in the market under trade names of AEROSIL R976 and R811 (manufactured by NIPPON AEROSIL CO., LTD.) can be used.

Among these, AEROSIL 200V and AEROSIL R972V are particularly preferred, because they are fine particles of silicon dioxide having a primary average particle size of 20 nm or less and an apparent specific gravity of 70 g/l to exert a large effect of lowering a friction coefficient while maintaining turbidity of an optical film at a low level.

In order to obtain a film having particles with a small secondary average particle size in the invention, several procedures are conceived upon preparing a dispersion liquid of fine particles. For example, there is such method that a dispersion liquid of fine particles is prepared in advance by stirring and mixing a solvent and fine particles, then the dispersion liquid of fine particles is added to a small amount of cellulose acylate solution having been prepared separately to be stirred and dissolved, which is further mixed with a main cellulose acylate dope liquid. This method is a preferable preparation method in that it results in a good dispersibility of silicon dioxide fine particles, hardly allowing the silicon dioxide fine particles to aggregate again. As an alternative, there is also such method that a solvent is added with a small amount of cellulose acylate to be stirred and dissolved, then fine particles are added to the solution to be dispersed by a dispersing apparatus to form a fine particles addition liquid, and the fine particles addition liquid is sufficiently mixed with a dope liquid by an in-line mixer. However, the invention is not restricted to these methods. When silicon dioxide fine particles are dispersed by mixing them with a solvent or the like, concentration of silicon dioxide is preferably 5-30% by mass, more preferably 10-25% by mass, most preferably 15-20% by mass. A higher dispersion concentration results in a lower liquid turbidity relative to the addition amount and better haze and aggregates, and thus is preferred. The final addition amount of a matting agent in a cellulose acylate dope solution is preferably 0.01-1.0 $g/m^2$, more preferably 0.03-0.3 $g/m^2$, and most preferably 0.08-0.16 $g/m^2$.

As for usable solvents, as lower alcohols, preferable examples include methyl alcohol, ethyl alcohol, propyl alcohol, isopropyl alcohol and butyl alcohol. Solvents other than lower alcohols are not particularly restricted, but use of a solvent that is used at a film-forming step of cellulose acylate is preferred.

(Ultraviolet Absorber)

The film of the present invention preferably contains ultraviolet absorbers. An ultraviolet absorber for a liquid crystal is preferably of the type having a high power of absorbing ultraviolet radiation with a wavelength of 370 nm or less for preventing the deterioration of the liquid crystal and absorbing little visible light with a wavelength of 400 nm or more for ensuring a good liquid crystal display. In particular, the transmittance at a wavelength of 370 nm is preferably at most 10%, more preferably at most 5%, even more preferably at most 2%. Examples are an oxybenzophenone compound, a benzotriazole compound, a salicylic acid ester, a triazine compound, a benzophenone compound, a cyanoacrylate compound and a complex nickel salt, however this invention is not limited by these. Two or more different types of UV absorbents may be used. Regarding the method of adding the UV absorbent to a dope (in the invention, the cellulose ester solution for use for solution casting may be referred to as a dope), the UV absorbent may be dissolved in an organic solvent such as alcohol, methylene chloride, dioxolane or the like and the resulting solution may be added to the dope, or it may be directly added to the dope composition. As the UV absorbent, an inorganic powder or the like not dissolving in an organic solvent may be dispersed in an organic solvent and a cellulose ester, using a dissolver or a sand mill, and then the resulting dispersion may be added to the dope. In the invention, the amount of the UV absorbent to be added may be from 0.1 to 5.0% by mass of the cellulose ester, preferably from 0.5 to 2.0% by mass, more preferably from 0.8 to 2.0% by mass.

(Water Content of Film)

The water content of the protective film of the invention is preferably 3% or less, more preferably 2.5% or less. The film having a water content of 3% or less is favorable because the stability of the film for humidity-variation tends to be improved.

The water content of the protective film of the invention may be determined as follows: A sample of the film, 7 mm×35 mm is analyzed using a water content meter and a sample drier (CA-03, VA-05, both by Mitsubishi Chemical Corp.), according to a Curl-Fisher method. The water content (g) is divided by the mass (g) of the sample to obtain the water content of the film.

(ΔRth)

In the invention, preferably, the difference between Rth of the protective film kept in an environment at 25° C. and 10% RH for 2 hours (Rth(10% RH)) and Rth of the protective film kept in an environment at 25° C. and 80% RH for 2 hours (Rth(80% RH)), (ΔRth) is at most 20 nm, more preferably at most 15 nm. Having the constitution, the liquid-crystal display device comprising the protective film may be free from the color shift in humidity change.

(Film Thickness)

The thickness of the protective film for polarizers of the invention may be suitably determined, depending on the type of the polarizers to which the protective film is applied, etc. Preferably, the thickness is from 30 to 60 µm, more preferably from 35 to 55 µm. Having a thickness of at most 60 µm, the production costs for the film may be reduced.

(Bright Dot Defects)

Bright dot defects are those having a diameter of from 1 to 100 µm and detectable with a polarizing microscope under cross-Nicol configuration; and preferably, the amount of such bright dot defects that the protective film may have is from 0 to 10 dots/mm$^2$, more preferably from 0 to 8 dots/mm$^2$, even more preferably from 0 to 5 dots/mm$^2$. The diameter as referred to herein means a circle-corresponding diameter. In other words, it means the diameter of the circle having the same area as the area of the dot defect. Bright dot defects that may be in the protective film are thus reduced, therefore reducing light leakage through the film and providing display devices not troubled by display failures.

(Haze)

Preferably, the haze of the film of the invention is at most 3%, more preferably at most 1.5%. Also preferably, the difference between the haze of the film and the haze of the unstretched film, Δhaze is at most 0.5. The haze difference in the film is thus reduced, and therefore, an ununiform structure may be reduced in the film and light leakage through the film may be reduced.

The film of the invention is stretched. Preferably, the film is stretched in line. If desired, however, after the film is once wound up and then it may be stretched in a separate step. Further, after in-line stretched, the film may be once wound up and may be further stretched in another step. Thus stretched in the manner, the film may have a reduced haze and may have a reduced Nz factor value.

(Polarizer)

The protective film for polarizers of the invention has a barrier property against water and has a low water content, and is therefore favorable for polarizers. As so mentioned in the above, a polarizer is formed by sticking a protective film to at least one surface of a polarizing element. The polarizing element may be any known one, and, for example, it may be produced by processing a hydrophilic polymer film such as a polyvinyl alcohol film with a dichroic dye such as iodine and then stretching it. Not specifically defined, the cellulose ester film of the protective film may be stuck to the polarizing element in any desired manner, for which, for example, usable is an adhesive of an aqueous solution of a water-soluble polymer. Preferably, the water-soluble polymer adhesive is an aqueous solution of a completely-saponified polyvinyl alcohol.

The protective film for polarizers of the invention is used preferably in a configuration of protective film for polarizer/polarizing element/protective film for polarizer/liquid-crystal cell/protective film for polarizer of the invention/polarizing element/protective film for polarizer, or in a configuration of protective film for polarizer/polarizing element/protective film for polarizer of the invention/liquid-crystal cell/protective film for polarizer of the invention/polarizing element/protective film for polarizer. In particular, the protective film is stuck to a TN-mode, VA-mode or OCB-mode liquid-crystal cell, thereby giving a display device excellent in the viewing angle characteristic and in the visibility not troubled by unfavorable coloration. In particular, the polarizer having the protective film of the invention is degraded little under high-temperature high-humidity condition and may exhibit a stable performance for a long period of time.

[Production of Film]

For producing the film of the invention, widely employable is any known method for producing an ordinary cellulose ester film. Preferably, the film is produced according to a solvent casting method.

Organic solvents are preferably selected from ethers having 3-12 carbon atoms, esters having 3-12 carbon atoms, ketones having 3-12 carbon atoms and halogenated hydrocarbons having 1-6 carbon atoms. The ethers, the ketones and the esters may have a cyclic structure. Compounds having two or more functional groups of ethers, esters and ketones (i.e., —O—, —CO— and —COO—) are also usable herein as the organic solvent; and they may have any other functional group such as an alcoholic hydroxyl group. In case where the organic solvent has two or more functional groups, the number of the carbon atoms constituting them may fall within a range of the number of carbon atoms that constitute the compound having any of those functional groups.

Examples of the ethers having 3-12 carbon atoms are diisopropyl ether, dimethoxymethane, dimethoxyethane, 1,4-dioxane, 1,3-dioxolane, tetrahydrofuran, anisole and phenetole.

Examples of the ketones having 3-12 carbon atoms are acetone, methyl ethyl ketone, diethyl ketone, diisobutyl ketone, cyclohexanone, methylcyclohexanone.

Examples of the esters having 3-12 carbon atoms are ethyl formate, propyl formate, pentyl formate, methyl acetate, ethyl acetate, pentyl acetate.

Examples of the organic solvents having plural functional groups are 2-ethoxyethyl acetate, 2-methoxyethanol and 2-butoxyethanol.

The number of the carbon atoms constituting the halogenohydrocarbon is preferably 1 or 2, most preferably 1. The halogen in the halogenohydrocarbon is preferably chlorine. The proportion of the hydrogen atoms in the halogenohydrocarbon substituted with a halogen is preferably from 25 to 75 mol %, more preferably from 30 to 70 mol %, even more preferably from 35 to 65 mol %, most preferably from 40 to 60 mol %. Methylene chloride is a typical halogenohydrocarbon.

Two or more different types of organic solvents may be mixed for use in the invention.

The cellulose acylate solution may be prepared according to an ordinary method. In one general method, the solution is processed at a temperature not lower than 0° C. (room temperature or high temperature). For preparing the solution, employable is a method and an apparatus for dope preparation according to an ordinary solvent casting method. In the ordinary method, preferably used is a halogenohydrocarbon (especially methylene chloride) as the organic solvent.

The amount of the cellulose acylate is so controlled that it may be in the solution in an amount of from 10 to 40% by mass. The amount of the cellulose acylate is preferably from 10 to 30% by mass. To the organic solvent (main solvent), desired additives to be mentioned below may be added.

The solution is prepared by stirring a cellulose acylate and an organic solvent at room temperature (0 to 40° C.). A high-concentration solution may be stirred under pressure and under heat. Concretely, a cellulose acylate and an organic solvent are put into a pressure chamber, then closed and stirred therein and under heat at a temperature within a range between the boiling point of the solvent at room temperature and the boiling point under the pressure. The heating temperature is generally 40° C. or higher, preferably from 60 to 200° C., more preferably from 80 to 110° C.

The ingredients may be put into the chamber after roughly premixed. They may be put into the chamber one after another. The chamber must be so planned that the contents therein could be stirred. An inert gas such as nitrogen gas or the like may be introduced into the chamber to pressurize it. The solvent vapor pressure may increase under heat, and this may be utilized in process. Alternatively, after the chamber is closed, the ingredients may be introduced thereinto under pressure.

Preferably, the contents in the chamber are heated in an external heating mode. For example, a jacket type heating unit may be used. A plate heater may be disposed outside the chamber, and a liquid may be circulated through the pipeline disposed in the heater to thereby heat the entire chamber.

Also preferably, a stirring blade may be disposed inside the chamber, with which the contents may be stirred. The stirring blade preferably has a length that reaches near the wall of the chamber. At the tip of the stirring blade, a scraper is preferably provided for renewing the liquid film formed on the wall of the chamber.

The chamber may be equipped with various meters such as a pressure gauge, a thermometer, etc. In the chamber, the ingredients are dissolved in the solvent. Thus prepared, the dope is taken out of the chamber after cooled, or after taken out of it, the dope may be cooled with a heat exchanger or the like.

The solution may also be prepared according to a cooling dissolution method. According to the cooling dissolution method, a cellulose acylate may be dissolved even in an organic solvent in which it can be hardly dissolved in an ordinary dissolution method. For the solvent in which a cellulose acylate can be dissolved in an ordinary dissolution method, the cooling dissolution method is advantageous in that a uniform solution can be prepared rapidly.

In the cooling dissolution method, first, a cellulose acylate is gradually added to an organic solvent at room temperature with stirring. The amount of the cellulose acylate is so controlled that the resulting mixture can contain it in an amount of from 10 to 40% by mass. The amount of the cellulose acylate is more preferably from 10 to 30% by mass. Further, any desired additives to be mentioned below may be added to the mixture.

Next, the mixture is cooled to −100 to −10° C. (preferably −80 to −10° C., more preferably −50 to −20° C., most preferably −50 to −30° C.). The cooling may be attained, for example, in a dry ice/methanol bath (−75° C.) or in a cooled diethylene glycol solution (−30 to −20° C.). Thus cooled, the mixture of cellulose acylate and organic solvent is solidified.

The cooling speed is preferably at least 4° C./min, more preferably at least 8° C./min, most preferably at least 12° C./min. The cooling speed is preferably higher, but its theoretical uppermost limit is 10000° C./sec, the technical uppermost limit is 1000° C./sec, and the practicable uppermost limit is 100° C./sec. The cooling speed is a value computed by dividing the difference between the temperature at the start of the cooling and the final cooling temperature by the time taken from the start of the cooling to the arrival to the final cooling temperature.

Further, this is heated at 0 to 200° C. (preferably 0 to 150° C., more preferably 0 to 120° C., most preferably 0 to 50° C.), and the cellulose acylate is thereby dissolved in the organic solvent. For the heating, the solid may be left at room temperature, or may be heated in a hot bath. The heating speed is preferably at least 4° C./min, more preferably at least 8° C./min, most preferably at least 12° C./min. The heating speed is preferably higher; but its theoretical uppermost limit is 10000° C./sec, the technical uppermost limit is 1000° C./sec, and the practicable uppermost limit is 100° C./sec. The cooling speed is a value computed by dividing the difference between the temperature at the start of the heating and the final heating temperature by the time taken from the start of the heating to the arrival to the final heating temperature.

As in the above, a uniform solution can be obtained. When the dissolution is insufficient, then the cooling and heating operation may be repeated. As to whether or not the dissolution is satisfactory may be determined merely by visually observing the outward appearance of the solution.

In the cooling dissolution method, preferably used is a closed container for the purpose of preventing the mixture from being contaminated with water from the dew formed in cooling. In the cooling and heating operation, preferably, the chamber is made under pressure in cooling and is made under reduced pressure in heating, to thereby shorten the dissolution time. For the mode under pressure and under reduced pressure, preferably used is a pressure chamber.

A 20 mas. % solution prepared by dissolving a cellulose acylate (having a degree of total acetyl substitution of 60.9%, and having a viscosity-average degree of polymerization of 299) in methyl acetate according to the cooling dissolution method has a pseudo-phase transition point between a sol state and a gel state at around 33° C., when analyzed through differential scanning calorimetry (DSC), and at a temperature lower than the point, the solution is in the form of a uniform gel. Accordingly, the solution must be stored at a temperature not lower than the pseudo-phase transition temperature, preferably at around a temperature of the gel-phase transition temperature plus 10° C. or so. However, the pseudo-phase transition temperature differs, depending on the degree of total acetyl substitution and the viscosity-average degree of polymerization of the cellulose acylate and on the solution concentration and the organic solvent used.

From the thus-prepared cellulose acylate solution (dope), a cellulose acylate film can be produced according to a solvent casting method.

The dope is cast on a drum or a band, on which the solvent is evaporated away to form a film. Before case, the concentration of the dope is preferably so planned that the solid content thereof is from 18 to 35% by mass. Preferably, the surface of the drum or the band is finished to be a mirror face. The casting and drying method in solvent casting is described in U.S. Pat. Nos. 2,336,310, 2,367,603, 2,492,078, 2,492,977, 2,492,978, 2,607,704, 2,739,069, 2,739,070, British Patents 640731, 736892, JP-B 45-4554, 49-5614, JP-A 60-176834, 60-203430, 62-115035.

Preferably, the dope is cast on a drum or a band at a surface temperature of not higher than 10° C. After thus cast, preferably, this is dried by exposing to air for at least 2 seconds. The formed film is peeled away from the drum or the band, and then it may be dried with high-temperature air of which the temperature is stepwise changed from 100° C. to 160° C. to thereby remove the residual solvent by vaporization. This method is described in JP-B 5-17844. According to the method, the time to be taken from the casting to the peeling may be shortened. In carrying out the method, the dope must be gelled at the surface temperature of the drum or the band on which it is cast.

For improving the mechanical properties of the cellulose ester film and for increasing the drying speed thereof, a plasticizer may be added to the film. As the plasticizer, usable are phosphates or carboxylates. Examples of the phosphates include triphenyl phosphate (TPP) and tricresyl phosphate (TCP). The carboxylates are typically phthalates and citrates. Examples of the phthalates include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrates include triethyl O-acetylcitrate (OACTE) and tributyl O-acetylcitrate (OACTB). Examples of other carboxylates include butyl oleate, methylacetyl ricinoleate, dibutyl sebacate, and various trimellitates. Preferred for use herein are phthalate plasticizers (DMP, DEP, DBP, DOP, DPP, DEHP). More preferred are DEP and DPP. The amount of the plasticizer to be added is preferably from 0.1 to 25% by mass of the cellulose acylate, more preferably from 1 to 20% by mass, most preferably from 3 to 15% by mass.

Aging inhibitors (e.g., antioxidant, peroxide decomposing agent, radical inhibitor, metal inactivator, acid scavenger, amine) may be added to the cellulose ester film. Aging inhibitors are described in JP-A 3-199201, 5-197073, 5-194789, 5-271471, 6-107854. The amount of the aging inhibitor to be added is preferably from 0.01 to 1% by mass of the prepared solution (dope), from the viewpoint that the aging inhibitor added can exhibit its effect and that the aging inhibitor added does not bleed out on the film surface, more preferably from 0.01 to 0.2% by mass. Especially preferred examples of the aging inhibitor for use herein are butylated hydroxytoluene (BHT) and tribenzylamine (TBA).

A method of drying the web that is dried on a drum or belt and is peeled away from it is described. The web peeled away at the peeling position just before one lap of the drum or the belt is conveyed according to a method where the web is led to pass alternately through rolls disposed like a houndstooth check, or according to a method where the peeled web is conveyed in a non-contact mode while both sides of the web are held by clips or the like. The drying may be attained according to a method where air at a predetermined temperature is given to both surfaces of the web (film) being conveyed, or according to a method of using a heating means such as microwaves, etc. Rapid drying may damage the surface smoothness of the formed film. Therefore, in the initial stage of drying, the web is dried at a temperature at which the solvent does not bubble, and after having gone on in some degree, the drying may be preferably attained at a high temperature. In the drying step after peeled away from the support, the film tends to shrink in the machine direction or in the cross direction owing to solvent evaporation. The shrinkage may be larger in drying at a higher temperature. Preferably, the shrinkage is inhibited as much as possible for bettering the surface condition of the film to be formed. From this viewpoint, for example, preferred is a method (tenter method) where the entire drying step or a part of the drying step is carried out with both sides of the web held with clips or pins so as to keep the width of the web, as in JP-A 62-46625. The drying temperature in the drying step is preferably from 100 to 145° C. The drying temperature, the drying air amount and the drying time may vary depending on the solvent used, and are therefore suitably selected in accordance with the type and the combination of the solvent to be used. In producing the film of the invention, the web (film) peeled away from the support is stretched preferably when the residual solvent amount in the web is less than 120% by mass.

The residual solvent amount may be represented by the following formula:

$$\text{Residual Solvent Amount (\% by mass)} = \{(M-N)/N\} \times 100$$

wherein M means the mass of the web at an undefined point, and N means the mass of the web having the mass M, dried at 110° C. for 3 hours. When the residual solvent amount in the web is too much, then the web could not enjoy the effect of its stretching; but when too small, stretching the web is extremely difficult, and the web may be broken. More preferably, the residual solvent amount in the web is at most 70% by mass, even more preferably from 10% by mass to 50% by mass, still more preferably from 12% by mass to 35% by mass. In case where the draw ratio in stretching is too small, the film could not have a sufficient retardation; but when too large, the film could not be stretched and would be broken.

The draw ratio in stretching is preferably from 1.1 to 1.5, more preferably from 1.15 to 1.4. The stretching may be attained in the machine direction, or in the cross direction or in both directions. Preferably, the film is stretched at least in the machine direction. When the draw ratio in stretching is at least 10%, Re may be expressed more suitably in the film, and the film may be well bowed. On the other hand, when the draw ratio in stretching is at most 50%, then the haze of the film may be reduced.

In the invention, the film produced according to a solution casting method and having a residual solvent amount falling within a specific range can be stretched, not heated at a high temperature; however, preferably, the film is stretched while dried, as the processing process may be shortened. However, when the temperature of the web is too high, then the plasticizer may evaporate away, and therefore, the temperature range is preferably from room temperature (15° C.) to 145° C. A method of stretching the film in two directions perpendicular to each other is effective for controlling the film refractivity, Nx, Ny and Nz to fall within the range of the invention. For example, when the film is stretched in the casting direction and when the shrinkage in the cross direction is too large, then the value Nz may increase too much. In this case, the problem may be solved by reducing the cross shrinkage of the film and by stretching the film in the cross direction. In case where the film is stretched in the cross direction, the film may have a refractivity distribution in the cross direction. This often occurs, for example, when a tenter method is employed for film stretching. This is a phenomenon to be caused by the generation of the shrinking force in the center part of the film while the edges of the film are kept fixed, and this may be considered as a so-called bowing phenomenon. Also in this case, the bowing phenomenon can be prevented by stretching the film in the casting direction, whereby the retardation distribution in the cross direction can be reduced. Further, by stretching the film in two directions perpendicular to each other, the film thickness fluctuation may be reduced. When the film thickness fluctuation of an optical film is too large, then the distribution fluctuation thereof may also be large. The film thickness fluctuation of the optical film is preferably within a range of ±3%, more preferably within a range of ±1%. For the above-mentioned objects, the method of stretching the film in two directions perpendicular to each other is effective, and the draw ratio in stretching in two directions perpendicular to each other is preferably from 1.2 to 2.0 times in one direction and from 0.7 to 1.0 time in the other direction. The mode of stretching the film by from 1.2 to 2.0 times in one direction and by from 0.7 to 1.0 time in the other direction means that the distance between the clips and the pins supporting the film is made to be from 0.7 to 1.0 times the distance therebetween before the stretching.

In general, in case where the film is stretched in the cross direction by 1.2 to 2.0 times, using a biaxial stretching tenter, a shrinking force acts on the perpendicular direction thereof, or that is, on the machine direction of the film.

Accordingly, when the film is stretched while a force is kept applied only in one direction, then the width of the film in the other direction perpendicular to that one direction may shrink. The method means that the shrinking degree is controlled without control of the width of the film, or that is, this means that the distance between the clips or the pins for width control is defined to be from 0.7 to 1.0 time the distance therebetween before stretching. In this case, a force of shrinking the film in the machine direction acts on the film owing to the stretching in the cross direction. The distance kept between the clips or the pins in the machine direction makes it possible to prevent any unnecessary tension from being given to the film in the machine direction thereof. The method of stretching the web is not specifically defined. For example, there are mentioned a method of providing plural rolls each running at a different peripheral speed and stretching the film in the machine direction based on the peripheral speed difference between the rolls, a method of holding both sides of the web with clips or pins and expanding the distance between the clips or pins in the machine direction to thereby stretch the film in the machine direction, or expanding the distance therebetween in the cross direction to thereby stretch the film in the cross direction, and a method of expanding the distance both in the machine direction and in the cross direction to thereby stretch film in both the machine and cross directions. Needless-to-say, these methods may be combined. In the so-called tenter method, preferably, the clip parts are driven according to a linear driving system, by which the film may be smoothly stretched with little risk of breaking, etc.

[Method for Producing Film of the Invention]

The film of the invention may be efficiently produced according to the production method of the invention to be described in detail hereinunder.

The film production method of the invention generally comprises a film formation step of casting a dope onto a support and then vaporizing the solvent to form a cellulose ester film, a stretching step of stretching the film, and a drying step of drying the film, and further comprises a step of heat treatment of the film at a temperature of from 150 to 200° C. for at least 1 minute after the drying step.

(Film Formation Step, Stretching Step, Drying Step)

The film formation step, the stretching step and the drying step are as described hereinabove.

In the production method of the invention, the draw ratio in stretching the film (this may be referred to as "draw ratio in stretching") in the stretching step is preferably from 1.2 to 2.0 times, more preferably from 1.3 to 1.5 times.

(Heat Treatment Step)

Preferably, the film production method of the invention comprises the above-mentioned heat treatment step after the drying step. The heat treatment in the heat treatment step may be attained after the drying step, and it may be attained just after the stretching/drying step, or after the drying step, the film may be once wound up according to the method to be mentioned below, and may be heat-treated in the next heat treatment step provided separately. Preferably in the invention, after the drying step, the film is once cooled to room temperature to 100° C. or lower, and then it is processed in the heat treatment step separately provided. This is advantageous in that a film having more excellent thermal dimensional stability can be obtained. For the same reason, preferably, the film just before the heat treatment step is dried to such a degree that the residual solvent amount in the film could be less than 2% by mass, more preferably less than 0.4% by mass.

Though not clear, the reason why the shrinkage of the film could be reduced through the treatment may be because, in the film stretched in the stretching step has a large residual stress in the stretching direction, and the residual stress may be removed by the heat treatment and therefore the shrinking force in the region below the heat treatment temperature may be thereby reduced.

The heat treatment may be attained according to method where air at a predetermined temperature is given to the film being conveyed, or according to a method of using a heating means such as microwaves, etc.

Preferably, the heat treatment is at a temperature of from 150 to 200° C., more preferably from 160 to 180° C. Also preferably, the heat treatment is for 1 to 20 minutes, more preferably from 5 to 10 minutes.

When the heat treatment temperature is higher than 200° C. and when the film is heated at such a temperature for a long period of time, this it may be problematic in that the plasticizer in the film may much evaporate away and scatter.

In the heat treatment step, the film shrinks in the machine direction or in the cross direction. Preferably, during the heat treatment, the shrinkage is prevented as much as possible in order that the produced film could have a good surface smoothness. For this, preferred is a method where both sides of the film are held by clips or pins so as to keep the width of the film as such (tenter method). Also preferably, the film is heat-treated while stretched in the cross direction and in the machine direction by from 0.9 times to 1.5 times each.

As the machine of winding up the formed film, usable is an ordinary winding machine. The film may be wound up according to various winding methods, for example, a constant tension method, a constant torque method, a tapered tension method, a programmed tension control method where the inner stress is kept constant, etc. The optical film roll thus produced in the manner as above is preferably such that the slow axis direction of the film is within a range of ±2 degrees relative to the winding direction (machine direction of the film), more preferably within a range of ±1 degree. Also preferably, the slow axis direction of the film is within ±2 degrees relative to the perpendicular direction to the winding direction (cross direction of the film), more preferably within a range of ±1 degree. Even more preferably, the slow axis direction of the film is within a range of ±0.1 degrees relative to the winding direction (machine direction of the film). Also preferably, it is within a range of ±0.1 degrees relative to the cross direction of the film.

EXAMPLES

The invention is described more concretely with reference to the following Examples. In the following Examples, the amount and the ratio of the material, the reagent and the substance used, and the operation may be suitably modified or changed not overstepping the sprit and the scope of the invention. Accordingly, the scope of the invention should not be limited to the following Examples.

In the invention, each property was evaluated as follows.
(Evaluation of Re and Rth)
Re and Rth of the film were evaluated in above mentioned definition.
(Contribution of Cellulose Acetate Resin to Re Expression)

A protective film for polarizers having a thickness of 80 μm is produced, this is stretched by 20% at 180° C., and Re and the thickness of the film are measured. On the other hand, a protective film for polarizers having a thickness of 80 μm is produced with no addition of an additive contributing toward optical expression thereto, this is stretched by 20% at 180° C., and Re and the thickness of the film are measured. According to the following formula, the contribution to Re expression is computed.

Contribution to expression (%)=$(Re_2/d_2)/(Re_1/d_1) \times 100$ wherein $Re_1$ and $d_1$ each mean Re and the thickness, respectively, of the protective film as produced to have a thickness of 80 μm and stretched by 20% at 180° C.; $Re_2$ and $d_2$ each mean Re and the thickness, respectively, of the protective film as produced to have a thickness of 80 μm with no addition of an additive contributing to optical expression thereto and stretched by 20% at 180° C.
(Water Content)

The water content of a film is determined as follows: A film is kept in a humidity-controlled atmosphere at 25° C. and 80% RH for at least 24 hours, and after its humidity has reached an equilibrium state, the sample (7 mm×35 mm) is analyzed with a water content meter and a sample drier (CA-03, VA-05, both by Mitsubishi Chemical), according to a Karl-Fischer method at 25° C. and 80% RH. The water amount (g) is divided by the sample mass (g) to give the water content of the film.

(ΔRth)

ΔRth is a difference between Rth of a film kept in an environment at 25° C. and 10% RH for 2 hours (Rth(10% RH)) and Rth of the film kept in an environment at 25° C. and 80% RH for 2 hours (Rth(80% RH)).
(Haze of Film)

A sample (40 mm×80 mm) is analyzed with a haze meter (HGM-2DP, by Suga Test Instruments) at 25° C. and 60% RH according to JIS K-6714.
(Surface Condition)

The surface condition of the obtained film is visually checked under a polarizer cross-Nicol configuration and evaluated as follows:
⊚: No unevenness found.
◯: Unevenness found but a little.
Δ: Unevenness found.
X: Unevenness found in the entire surface.
(Determination of Peeling Load)

A cellulose acylate solution is cast onto a stainless plate (SUS plate) kept at 20° C., and the solvent is evaporated away with time to form a cellulose acylate film on the SUS plate. Then, the cellulose acylate film is peeled from the SUS plate at a speed of 200 mm/sec, whereupon the load taken for the peeling is measured with a load cell. The residual solvent amount in the cellulose acylate film is computed from the mass of the peeled film and the mass of the film after dried at 120° C. for 3 hours.
Heavy: peeling load, at least 100 gf/cm.
Relatively heavy: peeling load, from 70 to 100 gf/cm.
Relatively light: peeling load, from 40 to 70 gf/cm.
Light: Conveying tension in peeling, at most 40 gf/cm.
(Stability of Film)

After kept at 60° C. and 90% RH for 24 hours, the optical characteristic of a film is measured. The difference between the optical characteristic of the film before kept under the wet heat condition and that of the film after kept under the wet heat condition is determined. The results are shown as follows:
⊚: |ΔRth| was 15 nm or less.
◯: |ΔRth| was 20 nm or less.
Δ: |ΔRth| was 25 nm or less.
X: |ΔRth| was over 25 nm.

Example A

Cellulose Acylate Film Formation (1) Cellulose Acylate

As listed in Table 3-5, various kinds of cellulose acylate differing in substitution degree of acyl group were prepared according to the following procedure.

To cellulose 100 parts by mass, sulfuric acid 7.8 parts by mass was added as a catalyst, and then a carboxylic acid was added followed by acylation reaction at 40° C. Next, the degree of total substitution and the degree of 6-position substitution were controlled by changing the sulfuric catalyst amount, the water amount and the ripening time. The ripening temperature was 40° C. Low molecular weight contents of cellulose acylate in the obtained mixture were removed by washing with acetone.
(2) Preparation of Dope
<1-1> Cellulose Acylate Solution A following composition was thrown into a mixing tank, stirred to dissolve respective components, further heated at 90° C. for about 10 minutes, and then filtered on a filter paper having an average pore size of 34 μm and a sintered metal filter having an average pore size of 10 μm to prepare a cellulose acylate solution.

| Cellulose acylate solution | |
|---|---|
| Cellulose triacetate in Table 3-5 | 100.0 parts by mass |
| Triphenyl phosphate | 8.0 parts by mass |
| Biphenyl diphenyl phosphate | 4.0 parts by mass |
| Methylene chloride | 403.0 parts by mass |
| Methanol | 60.2 parts by mass |

<1-2> Preparation of a Matting Agent Dispersion Liquid

A following composition containing the cellulose acylate solution prepared by the aforementioned method was thrown into a dispersing machine to prepare a matting agent dispersion liquid.

| Matting agent dispersion liquid | |
|---|---|
| Silica particles having an average particle size of 16 nm (AEROSIL R972, manufactured by NIPPON AEROSIL CO., LTD.) | 2.0 parts by mass |
| Methylene chloride | 72.4 parts by mass |
| Methanol | 10.8 parts by mass |
| Cellulose acylate solution | 10.3 parts by mass |

<1-3> Preparation of a Retardation Enhancer Solution

A following composition containing a cellulose acylate solution prepared by the aforementioned method was thrown into a mixing tank to be stirred with heating to dissolve components, thereby prepare a retardation enhancer solution. The amount (mass %) of Rth regulator and Re enhancer with respect to the amount of the cellulose acylate are shown in Table 3-5. As a Rth regulator in Table 3-5, A represents TPP/BDP plasticizer, and P-1, P-6, P-20, P-32, P-38, P-47, P-52, P-53, P-54, P-55, P-60, P-64 and P-65 represent example polymers shown in above Tables 1 and 2 as a high-molecular additives.

| Retardation enhancer solution Rth regulators in Table 3-5 Retardation (Re) enhancers AA-AC shown below | |
|---|---|
| Methylene chloride | 58.3 parts by mass |
| Methanol | 8.7 parts by mass |
| Cellulose acylate solution | 12.8 parts by mass |

100 parts by mass of the above cellulose acylate solution and 1.35 parts by mass of the matting agent dispersion were mixed so that the amount of the matting agent could be 300 ppm relative to the cellulose acylate resin, thereby preparing a dope for film formation. The amount of the retardation enhancer added is in terms of "part by mass" relative to 100 parts by mass of the amount of the cellulose acylate.

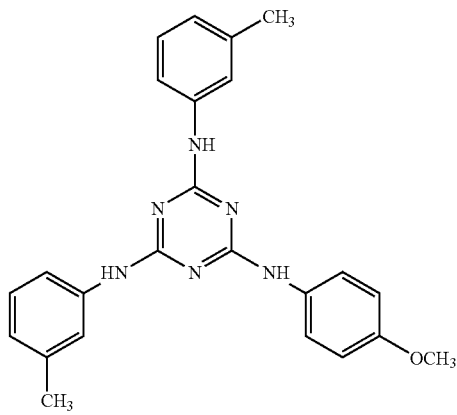

Re enhancer AA

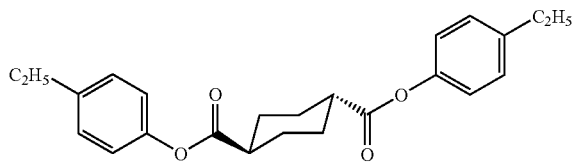

Re enhancer AB

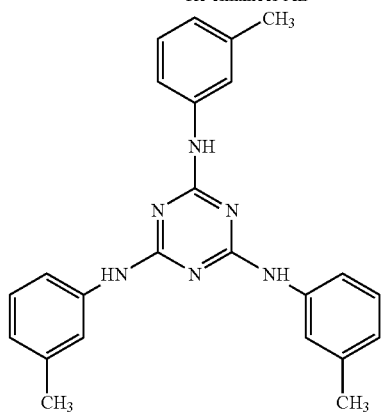

Re enhancer AC (Casting)

The dope was cast, using a band caster. This was dried at an aeration temperature on the band of from 80° C. to 130° C. (the exhaust temperature was from 75° C. to 120° C.), and then the film having a residual solvent amount of from 25 to 35% by mass was peeled away from the band, and stretched in the cross direction by a draw ratio of from 10% to 50% in a tenter zone where the aeration temperature was 140° C. (the exhaust temperature was from 90° C. to 125° C.) to produce a cellulose acylate film. In this, the casting film thickness was so controlled that the thickness of the stretched film could be as in Tables 3 to 5 (unit, μm). The films having the composition as in Tables 3 to 5 were produced. For checking the production performance of the films, at least 24 rolls of each film were produced under the condition as above, each having a roll width of 1280 mm and a roll length of 2600 mm. One roll of those 24 rolls thus produced continuously was cut at intervals of 100 m to give samples having a size of a length of 1 m and a width of 1280 mm, and these samples were tested.

TABLE 5

| | Degree of Acyl Substitution | Type of Rth Regulator | Amount of Rth Regulator (mass. pts.) | Type of Re Enhancer | Amount of Re Enhancer (mass. pts.) | Release Agent | Draw Ratio in Stretching (%) |
|---|---|---|---|---|---|---|---|
| Example 12 | 2.43 | P-6 | 10 | — | — | 0.03% | 30 |
| Example 13 | 2.43 | P-1 | 10 | — | — | 0.03% | 30 |
| Example 14 | 2.43 | P-38 | 10 | — | — | 0.03% | 30 |
| Example 15 | 2.43 | P-60 | 10 | — | — | 0.03% | 30 |
| Example 16 | 2.43 | P-6 | 20 | — | — | 0.03% | 30 |
| Example 17 | 2.43 | P-6 | 10 | AA | 2 | 0.03% | 30 |
| Example 18 | 2.43 | P-1 | 10 | AA | 2 | 0.03% | 30 |
| Example 19 | 2.43 | P-52 | 10 | AA | 2 | 0.03% | 30 |
| Example 20 | 2.43 | P-53 | 10 | AA | 2 | 0.03% | 30 |
| Example 21 | 2.43 | P-54 | 10 | AA | 2 | 0.03% | 30 |
| Example 22 | 2.43 | P-55 | 10 | AA | 2 | 0.03% | 30 |
| Example 23 | 2.43 | P-56 | 10 | AA | 2 | 0.03% | 30 |
| Example 24 | 2.43 | P-57 | 10 | AC | 2 | 0.03% | 30 |
| Example 25 | 2.43 | P-58 | 10 | AC | 2 | 0.03% | 30 |
| Example 26 | 2.43 | P-60 | 10 | AA | 2 | 0.03% | 30 |
| Example 27 | 2.43 | P-64 | 10 | AA | 2 | 0.03% | 30 |
| Example 28 | 2.43 | P-65 | 10 | AA | 2 | 0.03% | 30 |
| Example 29 | 2.43 | P-6 | 20 | AA | 4 | 0.03% | 30 |
| Example 30 | 2.43 | P-1 | 20 | AA | 4 | 0.03% | 30 |
| Example 31 | 2.43 | P-20 | 20 | AA | 4 | 0.03% | 30 |
| Example 32 | 2.43 | P-32 | 20 | AA | 4 | 0.03% | 30 |
| Example 33 | 2.43 | P-47 | 20 | AA | 4 | 0.03% | 30 |
| Example 34 | 2.43 | P-52 | 20 | AA | 4 | 0.03% | 30 |
| Example 35 | 2.43 | P-53 | 20 | AA | 4 | 0.03% | 30 |
| Example 36 | 2.43 | P-54 | 20 | AA | 4 | 0.03% | 30 |
| Example 37 | 2.43 | P-55 | 20 | AA | 4 | 0.03% | 30 |
| Example 38 | 2.43 | P-60 | 20 | AA | 4 | 0.03% | 30 |
| Example 39 | 2.43 | P-64 | 20 | AA | 4 | 0.03% | 30 |
| Example 40 | 2.43 | P-65 | 20 | AA | 4 | 0.03% | 30 |
| Example 41 | 2.43 | P-38 | 20 | AA | 4 | 0.03% | 30 |
| Example 42 | 2.43 | P-38 | 20 | AB | 4 | 0.03% | 30 |
| Example 43 | 2.43 | P-38 | 20 | None | 0 | 0.03% | 30 |
| Example 44 | 2.43 | P-38 | 20 | None | 0 | 0.03% | 30 |
| Example 45 | 2.43 | P-38 | 20 | None | 0 | 0.03% | 30 |
| Example 46 | 2.43 | P-6 | 20 | AA | 4 | 0.03% | 30 |
| Comp. Example 1 | 2.05 | P-6 | 30 | AA | 2 | 0.03% | 50 |
| Example 47 | 2.15 | P-6 | 30 | AA | 3 | 0.03% | 30 |
| Example 48 | 2.35 | P-6 | 30 | AA | 3 | 0.03% | 30 |
| Example 49 | 2.59 | P-6 | 30 | AA | 3 | 0.03% | 30 |
| Comp. Example 2 | 2.71 | P-6 | 11.3 | AA | 4.6 | 0.03% | 30 |

| | Film Thickness (μm) | Re (nm) | Rth (nm) | Contribution to expression of Re of Cellulose Acetate Resin | Haze (%) | ΔHaze (%) | Stability of Film |
|---|---|---|---|---|---|---|---|
| Example 12 | 45 | 40 | 102 | 61% | 0.2 | 0.1 | ◎ |
| Example 13 | 44 | 38 | 103 | 58% | 0.2 | 0.1 | ◎ |
| Example 14 | 46 | 39 | 100 | 59% | 0.2 | 0.1 | ◎ |
| Example 15 | 41 | 39 | 108 | 59% | 0.2 | 0.1 | ◎ |
| Example 16 | 45 | 39 | 82 | 65% | 0.3 | 0 | ◎ |
| Example 17 | 45 | 51 | 132 | 57% | 0.2 | 0.1 | ◎ |
| Example 18 | 49 | 50 | 124 | 56% | 0.2 | 0.1 | ◎ |
| Example 19 | 44 | 51 | 124 | 57% | 0.2 | 0.1 | ◎ |
| Example 20 | 46 | 52 | 121 | 58% | 0.2 | 0.1 | ◎ |
| Example 21 | 44 | 53 | 123 | 59% | 0.2 | 0.1 | ◎ |
| Example 22 | 41 | 48 | 119 | 54% | 0.2 | 0.1 | ◎ |
| Example 23 | 44 | 47 | 124 | 53% | 0.2 | 0.1 | ◎ |
| Example 24 | 45 | 50 | 134 | 56% | 0.2 | 0.1 | ◎ |
| Example 25 | 44 | 46 | 131 | 51% | 0.2 | 0.1 | ◎ |
| Example 26 | 46 | 52 | 128 | 58% | 0.2 | 0.1 | ◎ |
| Example 27 | 44 | 47 | 123 | 53% | 0.2 | 0.1 | ◎ |
| Example 28 | 46 | 55 | 121 | 61% | 0.2 | 0.1 | ◎ |
| Example 29 | 55 | 60 | 145 | 43% | 0.3 | 0 | ○ |
| Example 30 | 45 | 58 | 114 | 44% | 0.3 | 0 | ○ |
| Example 31 | 44 | 61 | 115 | 46% | 0.3 | 0 | ○ |
| Example 32 | 51 | 62 | 116 | 47% | 0.3 | 0 | ◎ |
| Example 33 | 47 | 68 | 117 | 52% | 0.3 | 0.1 | ◎ |
| Example 34 | 46 | 70 | 124 | 53% | 0.2 | 0 | ◎ |
| Example 35 | 44 | 55 | 132 | 42% | 0.3 | 0.1 | ◎ |
| Example 36 | 44 | 54 | 121 | 41% | 0.2 | 0 | ◎ |
| Example 37 | 44 | 56 | 121 | 42% | 0.2 | 0 | ◎ |
| Example 38 | 46 | 59 | 122 | 45% | 0.3 | 0.1 | ◎ |
| Example 39 | 44 | 58 | 132 | 44% | 0.2 | 0 | ◎ |
| Example 40 | 47 | 53 | 121 | 40% | 0.3 | 0 | ◎ |
| Example 41 | 47 | 55 | 123 | 42% | 0.3 | 0 | ◎ |

TABLE 5-continued

|  | | | | | | | |
|---|---|---|---|---|---|---|---|
| Example 42 | 47 | 54 | 119 | 41% | 0.3 | 0 | ◉ |
| Example 43 | 60 | 45 | 101 | 76% | 0.3 | 0 | ◉ |
| Example 44 | 80 | 54 | 120 | 77% | 0.3 | 0 | ◉ |
| Example 45 | 100 | 60 | 135 | 75% | 0.3 | 0 | ◉ |
| Example 46 | 45 | 55 | 120 | 46% | 0.3 | 0 | ◉ |
| Comp. Example 1 | 25 | 55 | 119 | 75% | 0.8 | 0.6 | X |
| Example 47 | 30 | 55 | 118 | 68% | 0.6 | 0.3 | Δ |
| Example 48 | 30 | 55 | 118 | 55% | 0.3 | 0 | ○ |
| Example 49 | 30 | 55 | 118 | 47% | 0.3 | 0 | ○ |
| Comp. Example 2 | 80 | 55 | 119 | 38% | 0.3 | 0 | X |

TABLE 3

|  | Degree of Acyl Substitution | Type of Rth Regulator | Amount of Rth Regulator (mass. pts.) | Type of Re Enchancer | Amount of Re Enhancer (mass. pts.) | Release Agent | Draw Ratio in Stretching (%) | Film Thickness (μm) |
|---|---|---|---|---|---|---|---|---|
| Example 1 | 2.43 | — | — | — | — | — | 9 | 75 |
| Example 2 | 2.43 | — | — | — | — | — | 20 | 70 |
| Example 4 | 2.43 | A | 10 | — | — | — | 20 | 60 |
| Example 5 | 2.43 | A | 20 | — | — | — | 20 | 60 |
| Example 6 | 2.43 | A | 10 | AA | 2 | — | 20 | 60 |

|  | Re (nm) | Rth (nm) | Contribution to Re of Cellulose Acetate Resin | Water content (%) | ΔRth (nm) | Haze (%) | ΔHaze (%) | Surface property | Stability of Film |
|---|---|---|---|---|---|---|---|---|---|
| Example 1 | 30 | 190 | 100% | 4.7 | 30 | 0.3 | 0 | ○ | ◉ |
| Example 2 | 60 | 180 | 100% | 4.7 | 35 | 0.3 | 0 | ○ | ◉ |
| Example 4 | 33 | 120 | 59% | 3.2 | 26.1 | 0.3 | 0 | ○ | ◉ |
| Example 5 | 33 | 91 | 56% | 2.5 | 17.8 | 0.3 | 0 | ○ | ◉ |
| Example 6 | 55 | 164 | 46% | 2.9 | 21 | 0.3 | 0 | ○ | ◉ |

TABLE 4

|  | Degree of Acyl Substitution | Type of Rth Regulator | Amount of Rth Regulator (mass. pts.) | Type of Re Enchancer | Amount of Re Enhancer (mass. pts.) | Release Agent | Draw Ratio in Stretching (%) | Film Thickness (μm) |
|---|---|---|---|---|---|---|---|---|
| Example 7 | 2.43 | A | 20 | AA | 4 | — | 0 | 60 |
| Example 8 | 2.43 | A | 20 | AA | 4 | 0.03% | 0 | 60 |
| Example 9 | 2.43 | A | 20 | AA | 4 | 0.09% | 0 | 60 |
| Example 10 | 2.43 | A | 20 | AA | 4 | 0.90% | 0 | 60 |
| Example 11 | 2.43 | A | 20 | AA | 4 | 1.20% | 0 | 60 |

|  | Re (nm) | Rth (nm) | Contribution to Re of Cellulose Acetate Resin | Water content (%) | ΔRth (nm) | Haze (%) | ΔHaze (%) | Peeling load | Surface property | Stability of Film |
|---|---|---|---|---|---|---|---|---|---|---|
| Example 7 | 42 | 109 | 45% | 2.3 | 17 | 0.3 | 0 | Heavy | ○ | ◉ |
| Example 8 | 42 | 109 | 45% | 2.3 | 17 | 0.3 | 0 | Relatively heavy | ◉ | ◉ |
| Example 9 | 42 | 109 | 45% | 2.3 | 17 | 0.3 | 0 | Light | ◉ | ◉ |
| Example 10 | 42 | 109 | 45% | 2.3 | 17 | 0.3 | 0 | Light | ◉ | ◉ |
| Example 11 | 42 | 109 | 45% | 2.3 | 17 | 0.3 | 0.6 | Light | Δ | ◉ |

In Tables 3 to 5, Δhaze means a difference between the haze of the protective film for polarizers and the haze of the unstretched film. The films were checked for bright dot defects therein, using a polarizing microscope in a cross-Nicol configuration, and in all the films, the number of bright dot defects was not more than 10 dots/mm².

Example B

Polarizer (Production of Polarizer)

Iodine was adsorbed by the stretched polyvinyl alcohol film to prepare a polarizing element. The cellulose acylate film produced in Example A was stuck to one surface of the polarizing element, using a polyvinyl alcohol adhesive. The saponification condition was as follows:

An aqueous sodium hydroxide solution (1.5 mol/L) was prepared and kept at 55° C. An aqueous dilute sulfuric acid (0.005 mol/L) was prepared and kept at 35° C. The cellulose acylate film produced in Example A was dipped in the above aqueous sodium hydroxide solution for 2 minutes, and then dipped in water to fully remove the aqueous sodium hydroxide solution. Next, this was dipped in the above aqueous dilute sulfuric acid solution for 1 minute and then dipped in water to fully remove the aqueous dilute sulfuric acid solution. Finally, the sample was fully dried at 120° C.

A commercial cellulose triacylate film (Fujitac TD80UF, by FUJIFILM) was saponified, and stuck to the other side of the polarizing element, using a polyvinyl alcohol adhesive, and dried at 70° C. for at least 10 minutes.

The films were so stuck to the polarizing element that the transmission axis of the polarizing element could be parallel to the slow axis of the cellulose acylate film produced in Example A and that the transmission axis of the polarizing element could be perpendicular to the slow axis of the commercial cellulose triacylate film.

Thus produced, a part of the polarizers were directly put in a moisture-proof bag and stored as such, while the other part thereof were conditioned at 25° C. and a relative humidity of 60% for 2 hours, then put in a moisture-proof bag and stored. The moisture-proof bag is a packing bag having a laminate structure of polyethylene terephthalate/aluminium/polyethylene and its moisture permeability was at most 0.01 mg/m² (24 hrs).

Using the thus-produced polarizer, liquid-crystal display devices were produced according to the description of Example in JP-A 2006-111842, and it was confirmed that the liquid-crystal display devices were all good.

The present disclosure relates to the subject matter contained in Japanese Patent Application No. 90131/2008 filed on Mar. 31, 2008 and Japanese Patent Application No. 238457/2008 filed on Sep. 17, 2008, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A protective film for polarizers, comprising a cellulose acetate resin having a degree of acetyl substitution of from 2.1 to 2.5,
which satisfies 25<Re<100 and 50<Rth<300 wherein Re means retardation in the plane of the film and Rth means retardation in the thickness direction of the film, and
in which the cellulose acetate resin contributes to optical expression of from 40% to 61% of the Re in the film,
wherein the protective film further comprises a polyester of an aromatic dicarboxylic acid selected from the group consisting of phthalic acid, terephthalic acid and isophthalic acid, and an aliphatic diol having 2 to 20 carbon atoms, and
wherein the cellulose acetate resin has an acetyl group only as an acyl group of the cellulose acetate resin.

2. The protective film for polarizers according to claim 1, wherein the degree of acetyl substitution is from 2.4 to 2.5.

3. The protective film for polarizers according to claim 1, which satisfies the following formula:

$$Re_2/d_2 \geq Re_1/d_1 \times 0.4$$

wherein $Re_1$ and $d_1$ each mean Re and the thickness, respectively, of the protective film as produced to have a thickness of 80 μm and stretched by 20% at 180° C.; $Re_2$ and $d_2$ each mean Re and the thickness, respectively, of the film as produced to have a thickness of 80μm with no addition of an additive contributing to optical expression thereto and stretched by 20% at 180° C.; and $d_1$ and $d_2$ satisfy 20μm $\leq d_1 \leq$ 120 μm and 20 μm $\leq d_2 \leq$ 120μm.

4. The protective film for polarizers according to claim 1, which contains from 5 to 25% by weight of at least one Rth regulator.

5. The protective film for polarizers according to claim 4, wherein the Rth regulator is an ester plasticizer.

6. The protective film for polarizers according to claim 4, wherein the Rth regulator is at least one selected from the group consisting of phosphate plasticizers, phthalate plasticizers and glycol ester plasticizers.

7. The protective film for polarizers according to claim 1, which contains at least one Re enhancer in an amount of from 0.5% by weight to 10% by weight.

8. The protective film for polarizers according to claim 1, which has a water content of at most 3%.

9. The protective film for polarizers according to claim 1, having a ΔRth of at most 20 nm in which ΔRth means difference between Rth (10%RH) and Rth (80%RH), Rth (10%RH) means Rth of the film kept in an environment at 25° C. and 10% RH for 2 hours, and Rth (80%RH) means Rth of the film kept in an environment at 25° C. and 80% RH for 2 hours.

10. The protective film for polarizers according to claim 1, which contains a release promoter in an amount of from 0.001 to 1% by weight.

11. The protective film for polarizers according to claim 1, which has a thickness of from 30 to 60 μm.

12. The protective film for polarizers according to claim 1, which further contains a matting agent.

13. The protective film for polarizers according to claim 1, wherein the amount of bright dot defects is at most 10 dots/m².

14. The protective film for polarizers according to claim 1, wherein the residual solvent amount is less than 70% by mass.

15. The protective film for polarizers according to claim 1, wherein the draw ratio in stretching the film is from 1.1 to 1.5 times.

16. The protective film for polarizers according to claim 1, wherein the difference between the haze of the film and the haze of the unstretched film is at most 0.5.

17. The protective film for polarizers according to claim 1, which is produced by once winding up the unstretched film and then stretching it in a separate step.

18. The protective film for polarizers according to claim 1, wherein the draw ratio in stretching the film is from 1.15 to 1.4.

* * * * *